United States Patent [19]
Ito et al.

[11] Patent Number: 5,183,128
[45] Date of Patent: Feb. 2, 1993

[54] APPARATUS FOR CONTROLLING THE OUTPUT OF A VEHICLE EQUIPPED WITH AN INTERNAL COMBUSTION ENGINE

[75] Inventors: Masayoshi Ito, Okazaki; Kiichi Yamada; Katsunori Otake, both of Nagoya; Yasunobu Miyata, Komaki; Tomohiro Narita; Susumu Nishikawa, both of Okazaki, all of Japan

[73] Assignee: Mitsubishi Jidosha Kogyo Kabushiki Kaisha, Tokyo, Japan

[21] Appl. No.: 661,295

[22] Filed: Feb. 27, 1991

[30] Foreign Application Priority Data

Feb. 27, 1990 [JP] Japan .................... 2-44466
May 18, 1990 [JP] Japan .................. 2-127008
May 18, 1990 [JP] Japan .................. 2-127015

[51] Int. Cl.⁵ ............................................. B60K 28/16
[52] U.S. Cl. ................................. 180/197; 364/426.01
[58] Field of Search ................ 180/197; 364/426.01, 364/426.03

[56] References Cited

U.S. PATENT DOCUMENTS

| | | | |
|---|---|---|---|
| 4,637,487 | 1/1987 | Nakamura et al. | 180/197 |
| 4,768,608 | 9/1988 | Hrovat | 180/197 |
| 4,884,651 | 12/1989 | Harada et al. | 180/197 X |
| 4,953,093 | 8/1990 | Etoh | 180/197 X |
| 4,970,650 | 11/1990 | Hashiguchi et al. | 180/197 X |
| 4,985,836 | 1/1991 | Hashiguchi et al. | 180/197 X |
| 4,985,837 | 1/1991 | Togai et al. | 180/197 X |
| 4,985,838 | 1/1991 | Hashiguchi et al. | 180/197 X |
| 4,999,778 | 3/1991 | Ruhl et al. | 180/197 X |
| 5,022,483 | 6/1991 | Tsuyama et al. | 180/197 |
| 5,025,882 | 6/1991 | Ghoneim et al. | 180/197 |
| 5,070,960 | 12/1991 | Nobumoto et al. | 180/197 X |

FOREIGN PATENT DOCUMENTS

0240174A1 10/1987 European Pat. Off. .
0349993A3 1/1990 European Pat. Off. .
1-271620 10/1989 Japan .

Primary Examiner—Margaret A. Focarino
Assistant Examiner—Kevin Hurley

[57] ABSTRACT

A control apparatus for controlling the output of a vehicle equipped with an internal combustion engine. The control apparatus includes a torque control unit and an electronic control unit, is electrically connected to various sensors for detecting the running conditions of the vehicle, and is capable of controlling, e.g., the operations of a throttle valve and an ignition plug, to thereby control the driving torque of the engine. The control apparatus calculates a reference driving torque of the engine on the basis of the vehicle speed, and also calculates a slippage of the driving wheels on the basis of a deviation of peripheral speed between the driving and driven wheels. A correction torque for the reference driving torque, which is calculated by the control apparatus on the basis of the detected slippage, is subjected to restriction in accordance with the vehicle running conditions, and the reference driving torque is corrected in accordance with the restricted correction torque, to obtain a target driving torque. Thus, the control apparatus controls the operations of the throttle valve and ignition plug such that the actual driving torque of the engine coincides with the target driving torque.

12 Claims, 49 Drawing Sheets

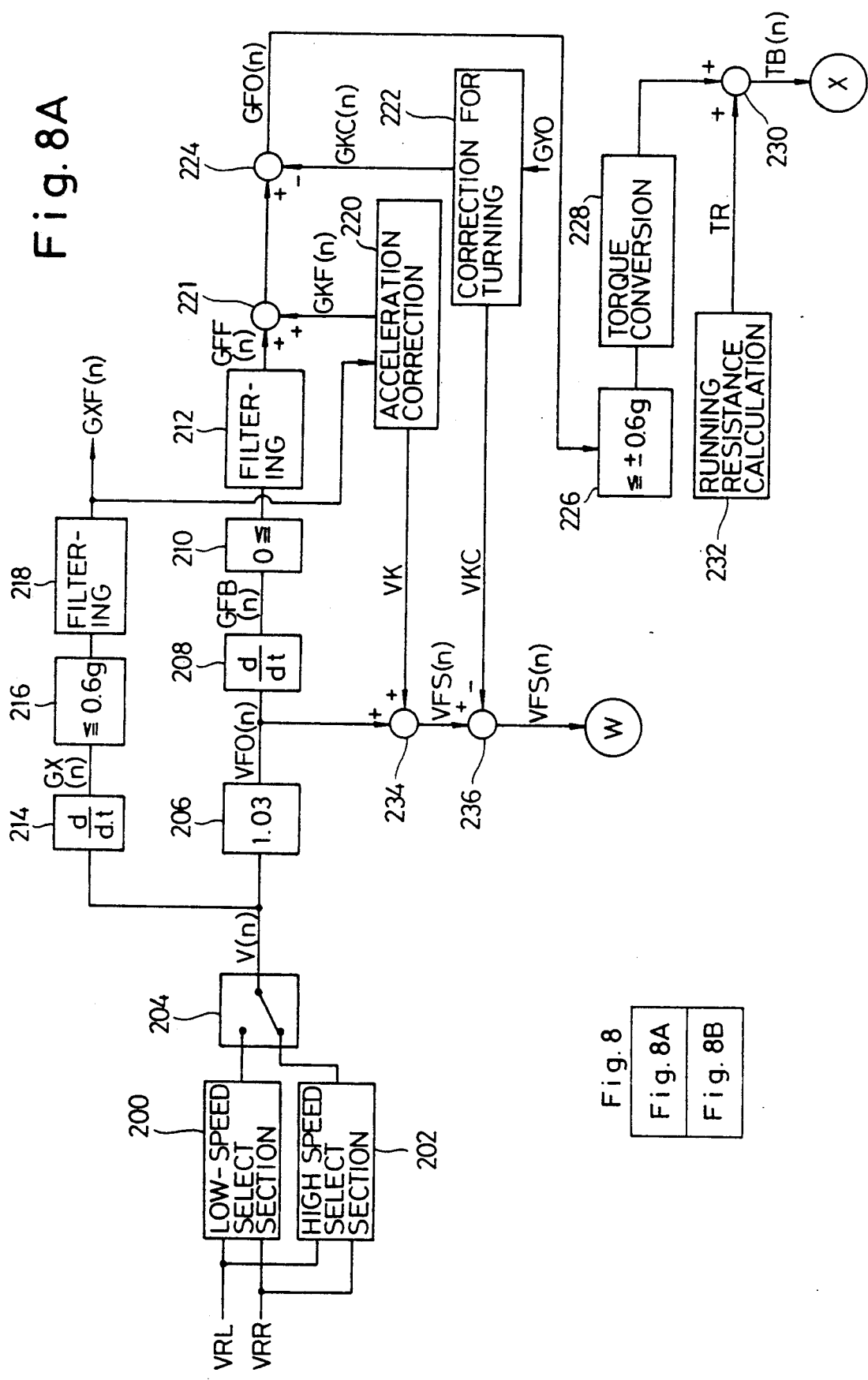

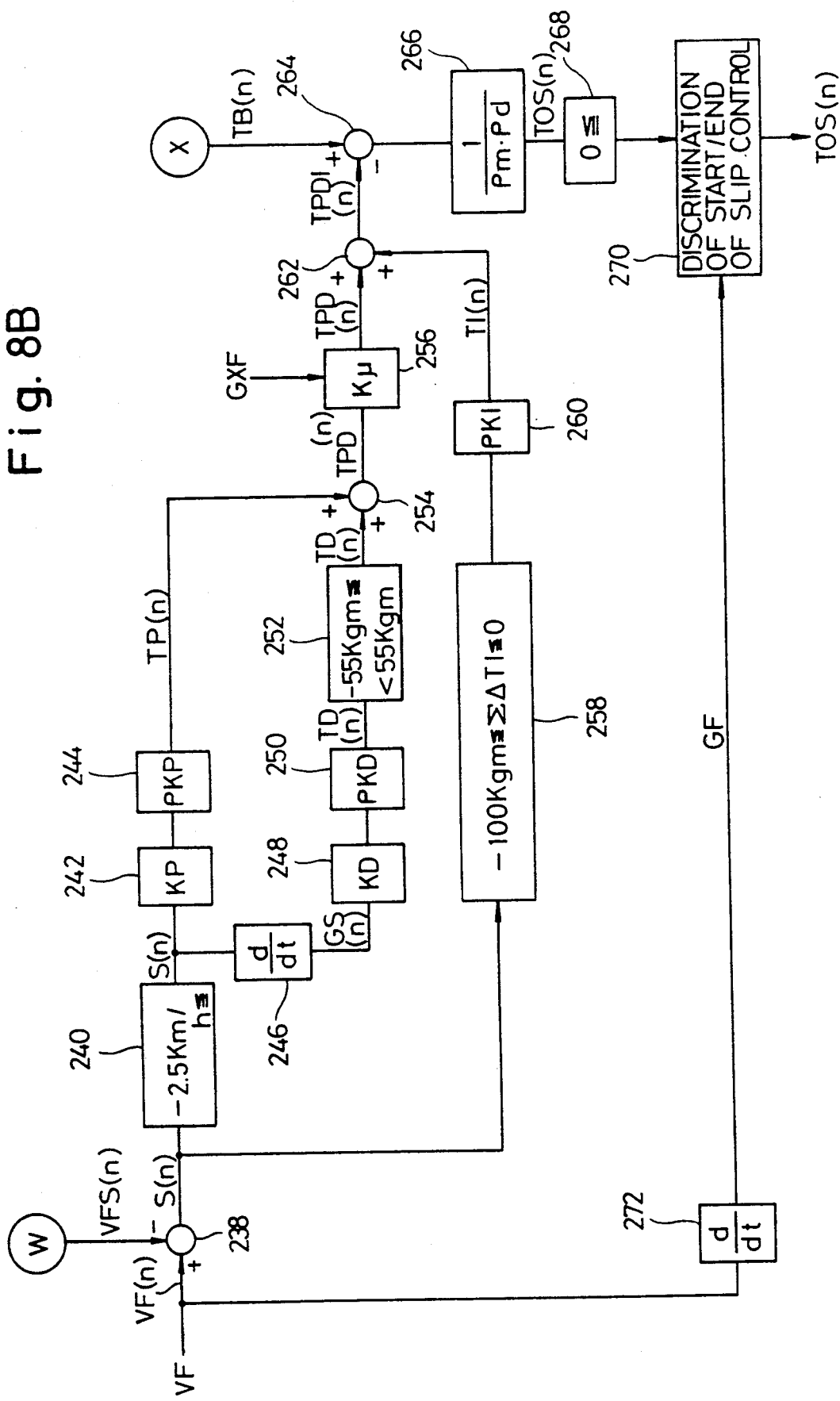

| SPEED REDUCTION RATIO | PKI | PKP | PKD |
|---|---|---|---|
| FIRST SPEED | 1 | 1 | 1 |
| SECOND SPEED | 0.5 | 0.4 | 0.4 |
| THIRD SPEED | 0.5 | 0.2 | 0.2 |
| FOURTH SPEED | 0.5 | 0.2 | 0.2 |
| REVERSE | 1 | 0.8 | 0.8 |

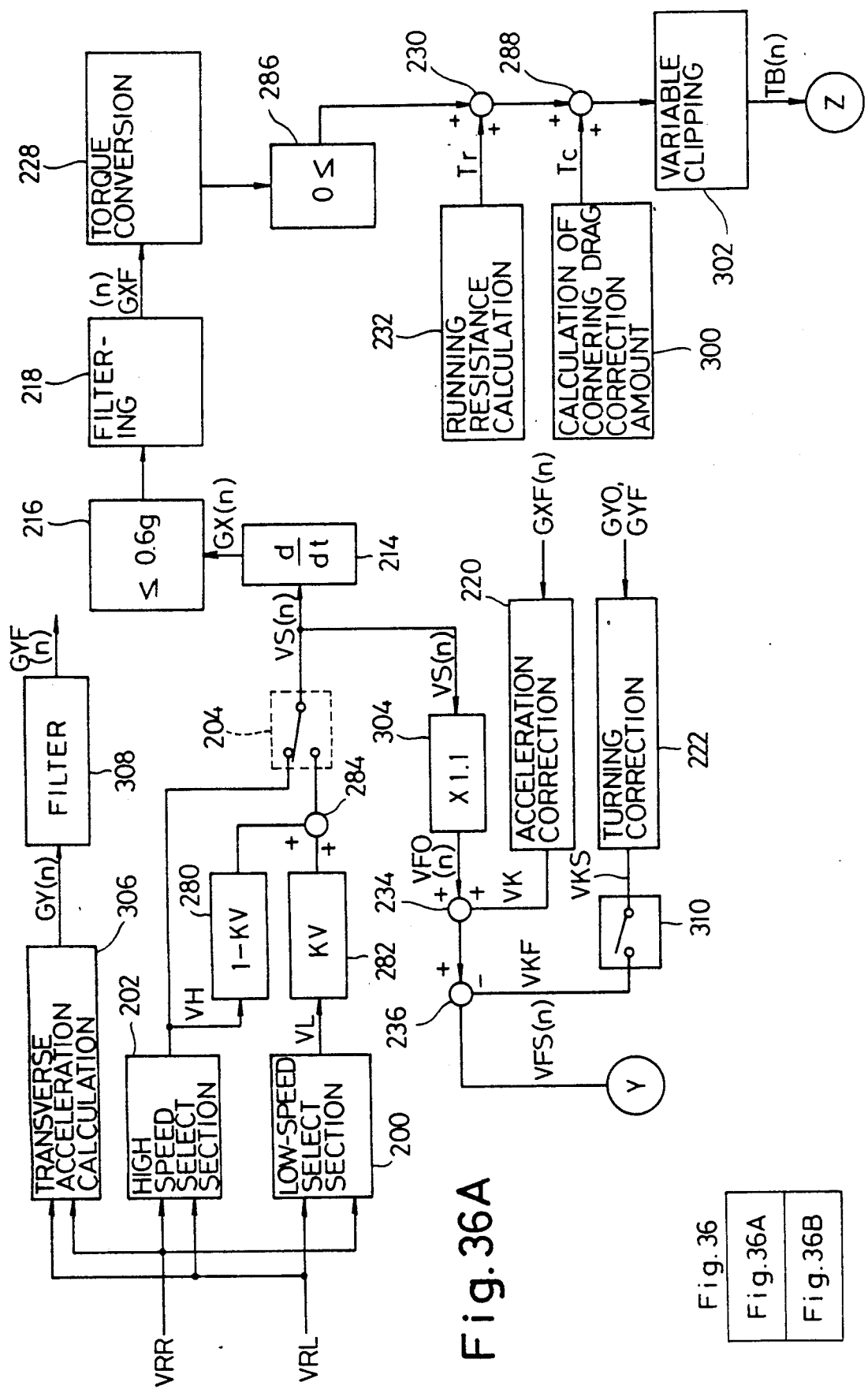

| SPEED REDUCTION RATIO | PKI | PKP | PT |
|---|---|---|---|
| FIRST SPEED | 1.0 | 1.0 | 1.0 |
| SECOND SPEED | 0.7 | 0.7 | 1.5 |
| THIRD SPEED | 0.7 | 0.7 | 1.5 |
| FOURTH SPEED | 0.7 | 0.7 | 1.5 |
| REVERSE | 1.0 | 1.0 | 1.0 |

APPARATUS FOR CONTROLLING THE OUTPUT OF A VEHICLE EQUIPPED WITH AN INTERNAL COMBUSTION ENGINE

BACKGROUND OF THE INVENTION

1. Field of the Invention

The present invention relates to an apparatus for promptly reducing the driving torque of a vehicle, i.e., the output of an internal combustion engine provided in the vehicle, in accordance with the amount of slip when driving wheels of the vehicle slip during an acceleration, to thereby ensure stable running of the vehicle.

2. Description of the Related Art

If the condition of the road surface on which a vehicle is running suddenly changes, for example, if the road changes from a dry road having a large friction coefficient into a wet, snow-covered, or frozen road having a small friction coefficient, the amount of slip, or slippage, of the driving wheels increases. In such a situation, therefore, it is extremely difficult to ensure stable running of the vehicle.

When the slip of the driving wheels is large, the driver adjusts the depth of depression of the accelerator pedal to reduce the output of the internal combustion engine provided in the vehicle. It is, however, very hard even for a skilled driver to minutely control the engine output through the accelerator pedal.

Under the circumstances, an output control apparatus has already been developed which forcibly reduces the engine output and thus the vehicle output when the slippage of the driving wheels becomes greater than a predetermined value, regardless of the depth to which the driver depresses the accelerator. This output control apparatus is operated at the request of the driver, for example, when an operation switch thereof is turned on by the driver. Accordingly, if the operation switch is left in an off state, the function of the output control apparatus cannot be enjoyed, and thus the engine output is controlled in accordance solely with the depth of depression of the accelerator pedal, as in ordinary engines.

In conventional output control apparatuses of this type, the slippage of the vehicle driving wheels is represented by a deviation in rotation number between the driving wheels and driven wheels, and the output control apparatus controls the engine output, i.e., the driving torque, so as to reduce this deviation or the slip. This will be explained in detail. In conventional output control apparatuses, first, a reference driving torque of the engine is set according to road surface conditions, on the assumption that the road surface conditions can be estimated from changes in the rotation of the driven wheels. The reference driving torque is then corrected by the deviation in rotation number between the driving and driven wheels, i.e., the slippage of the driving wheels, to derive a target driving torque for the internal combustion engine. The output control apparatus controls, for example, the throttle valve of the engine, so as to bring the actual driving torque of the engine to the target driving torque.

In the above-described conventional output control apparatus, however, the reference driving torque is corrected. Namely, the target driving torque is calculated based solely on the magnitude of slip of the driving wheels. Accordingly, even if the actual driving torque of the engine is controlled in accordance with the target driving torque calculated in this manner, slips of the driving wheels cannot be effectively suppressed. Thus, response of the slip control is lowered.

SUMMARY OF THE INVENTION

The present invention has been created in view of the above circumstances. An object thereof is to provide an output control apparatus for a vehicle which is capable of optimally suppressing a slip of the driving wheels in accordance with running conditions of the vehicle and also is to improve in the response of the slip control.

The above object is achieved by an output control apparatus for a vehicle according to this invention, which comprises: means for calculating a reference driving torque of the internal combustion engine on the basis of a vehicle speed; means for calculating a slippage of driving wheels of the vehicle; correction means for calculating a correction torque, which serves to reduce the reference driving torque, on the basis of the slippage; limiter means for restricting the correction torque in accordance with running conditions of the vehicle; determination means for correcting the reference driving torque in accordance with the correction torque which has been restricted by the limiter means, to thereby determine a target driving torque of the internal combustion engine; and control means for controlling an actual driving torque of the internal combustion engine in accordance with the target driving torque.

In the output control apparatus described above, a correction torque is calculated based on the slippage of the driving wheels, and is further restricted by the limiter means in accordance with the running conditions of the vehicle. Thus, the output control apparatus of this invention derives a target driving torque of the internal combustion engine by correcting the reference torque in accordance with the restricted correction torque. The target driving torque is derived by correcting the reference driving torque in accordance with not only the slippage of the driving wheels, but also the vehicle running conditions. Thus the slip of the driving wheels can be effectively suppressed with good responsiveness, by controlling the actual driving torque of the engine in accordance with the target driving torque.

In calculating the correction torque, an integral correction torque corresponding to an integral value of slippage is calculated as one correction torque. Preferably, the integral correction torque is restricted by the limiter means to within a limited range defined by an upper limit of zero and a lower limit which varies with the vehicle speed.

If the integral correction torque is restricted to to the above limit range, it takes a negative value, the magnitude of which is varied in accordance with the vehicle speed. Namely, the limit value of the restricted negative integral correction torque can be reduced when the vehicle speed is in a high-speed region, and be increased when the vehicle speed is in a low-speed region. Accordingly, when the vehicle is in a low-speed region, such as at the start thereof, the target driving torque is derived by subtracting an integral correction torque, which has a large negative value at a time, from the reference driving torque. Thus, the target driving torque is corrected largely in a positive direction with respect to the reference driving torque. As a result, a large target driving torque of the engine is ensured particularly when the vehicle is started on an uphill road, and thus the acceleration performance of the vehicle is improved. On the other hand, when the vehicle is in a high-speed region, the limit value of the negative integral correction torque is reduced. Accordingly, the reference driving torque is not corrected much by the integral correction torque, and the target driving torque takes a value close to the reference driving torque. Thus, when the driving torque of the engine is controlled in accordance with the target driving torque, that is, when the slip control of the driving wheels is carried out, the stability of the slip control can be ensured.

In addition to the above integral correction torque, a proportional correction torque proportional to the slippage may be calculated as a correction torque, and may preferably be clipped by the limiter means such that it is not smaller than a predetermined value. Unlike the integral correction torque, the proportional correction torque naturally takes a positive value whose minimum value is determined, and thus the target driving torque obtained by correcting the reference driving torque in accordance with the proportional correction torque cannot be excessively large. Accordingly, by controlling the actual driving torque of the engine toward the target driving torque obtained based on the proportional correction torque, excessive slip control and hunting of the target driving torque can be prevented.

The correction torque may be obtained by adding together the aforesaid integral correction torque and the proportional correction torque. In this case, before deriving the correction torque, the integral correction torque is preferably restricted to within a limited range such that it takes a value of, at most, zero.

The aforesaid integral correction torque may be obtained through an addition of a predetermined positive value when the slippage takes a positive value, and obtained through a subtraction of the predetermined value when the slippage takes a negative value. By doing this, the integral correction torque is varied linearly with time, regardless of the magnitude of slippage. This can be compared with the case in which the integral correction torque is obtained by directly integrating the slippage. Thus, the target driving torque may be derived by correcting the reference driving torque in accordance with the correction torque comprising the proportional correction torque and the integral correction torque, whereby the convergence of the slip control effected in accordance with the target driving torque can be improved.

For the correction torque, a derivative correction torque which is calculated based on the rate of change of the slippage and always takes a positive value may be taken into account, in addition to the aforesaid proportional correction torque and integral correction torque. In this case, the correction torque is derived by adding together the proportional correction torque, the integral correction torque, and the derivative correction torque. Preferably, when obtaining the correction torque, the proportional correction torque and/or the derivative correction torque is previously restricted in accordance with the friction coefficient of a road surface on which the vehicle is running. The restriction of the correction torque in accordance with the friction coefficient of the road surface permits the target driving torque to be calculated in accordance with the road surface conditions. For example, for a slippery road surface having a small friction coefficient, slip of the driving wheels can be effectively suppressed by regulating the change of target driving torque obtained based on the correction torque.

Specifically, the slippage may be calculated on the basis of a deviation between the target peripheral speed and actual peripheral speed of the driving wheels.

The reference driving torque may be derived from the longitudinal acceleration of the vehicle speed, or from a target peripheral speed of the driving wheels calculated based on the vehicle speed.

When calculating the target driving torque, the running resistance acting on the vehicle from the road surface on which the vehicle is running is preferably taken into account.

The above and other objects, features, and advantages of the invention will be more apparent from the ensuing detailed description of illustrative embodiments thereof taken in connection with the accompanying drawings. It is to be understood that the drawings are for purpose of illustration only, and are not intended as a definition of the limits of the invention.

BRIEF DESCRIPTION OF THE DRAWINGS

FIGS. 8A and 8B are block diagrams showing a calculation procedure for a first target torque;

FIGS. 36A and 36B are block diagrams showing a modification of the calculation procedure of FIGS. 8A and 8B;

DETAILED DESCRIPTION OF THE PREFERRED EMBODIMENTS

Figure 1:
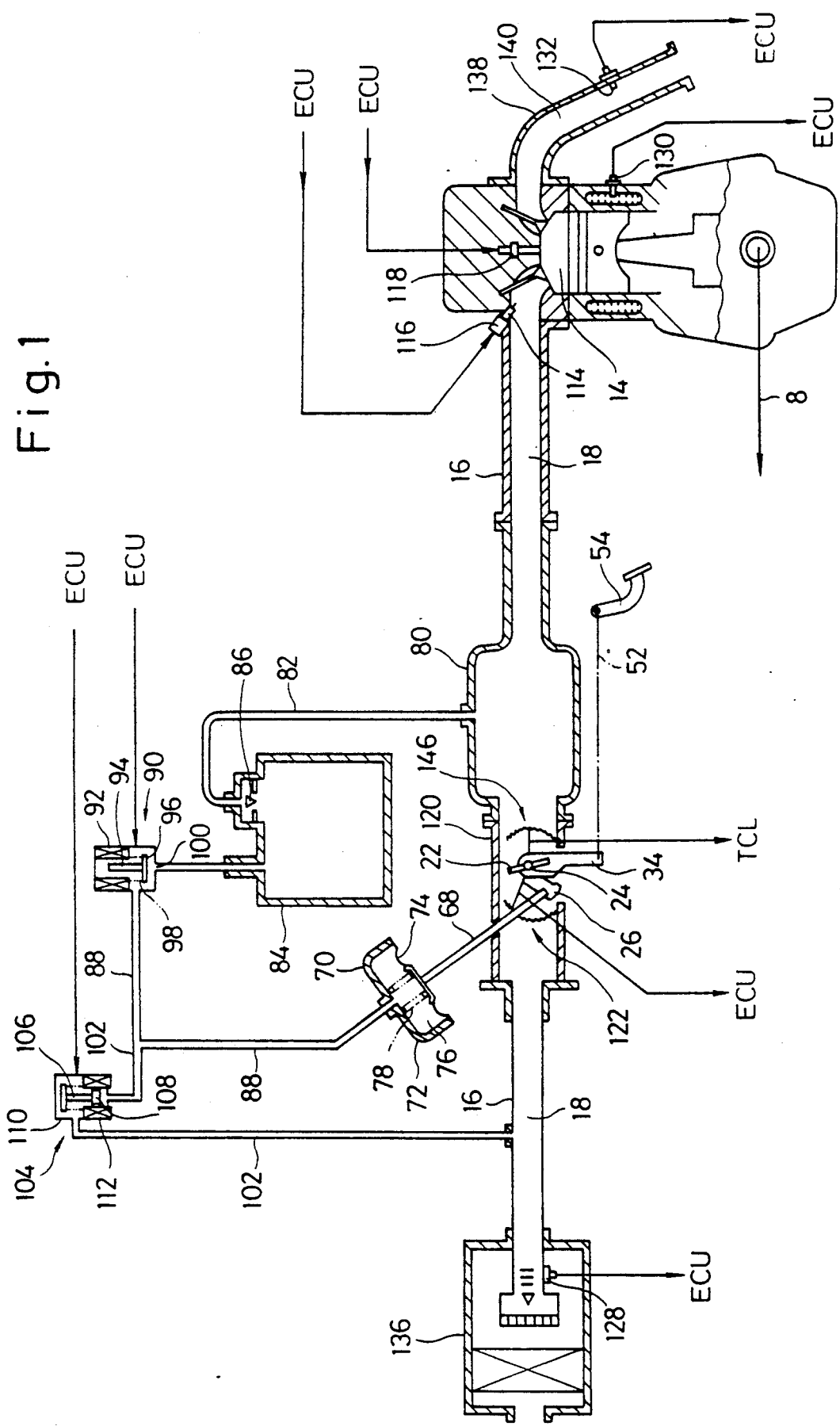
FIG. 1 is a schematic view showing a part of an internal combustion.
Figure 2:
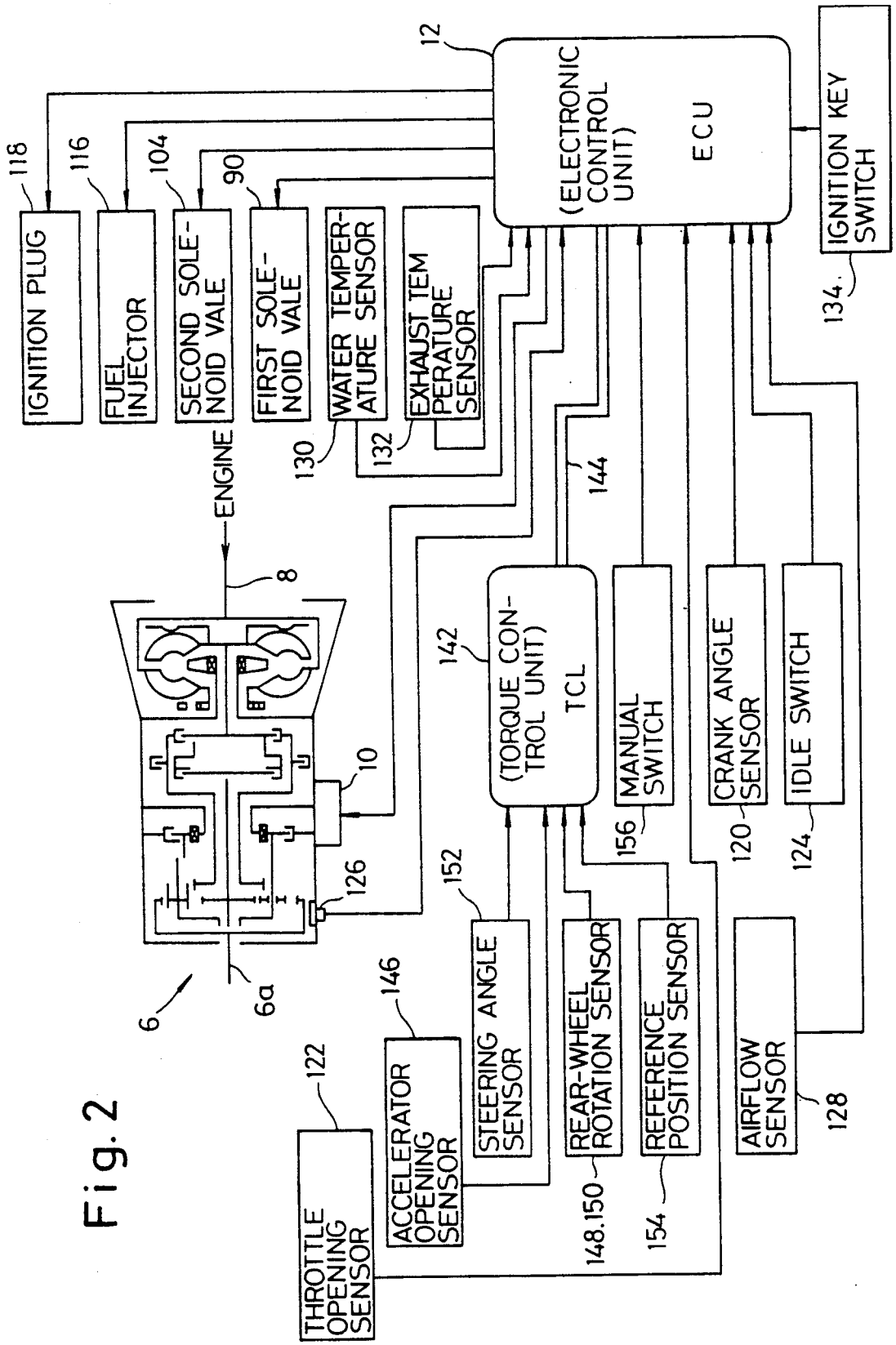
FIG. 2 is a block diagram schematically showing a control apparatus for controlling the output of the internal combustion engine of FIG. 1.

Referring to FIGS. 1 and 2, there are shown part of an internal combustion engine 2 and a control system for controlling the operation of the engine 2, respectively. The engine 2 has an output shaft 4 which is connected to an input shaft 8 of an automatic transmission 6 of hydraulic type, shown in FIG. 2.

The hydraulic automatic transmission 6 has four forward gear ratios and one reverse gear ratio, for example, and has a hydraulic control device 10 for switching between the gear ratios. The hydraulic control device 10 is electrically connected to an electronic control unit (hereinafter merely referred to as ECU) 12. The ECU 12 outputs a command signal to the hydraulic control device 10 in accordance with the position of a select lever (not shown), operated by the driver, and the operating state of the vehicle, and the hydraulic control device 10 affects a gear ratio switching in the automatic transmission 6 in accordance with the command signal.

The construction of the automatic transmission 6 is specifically disclosed, e.g., in Unexamined Japanese Patent Publications No. 58-54240 and No. 61-31749. As shown in these publications, the hydraulic control device 10 includes a pair of solenoid valves for switching between gear ratios. The solenoid valves cause a plurality of frictional engagement elements, incorporated in the automatic transmission 6, to be selectively engaged or disengaged in accordance with on/off signals supplied from the ECU 12, whereby the automatic transmission 6 smoothly switches to a desired gear ratio.

As shown in FIG. 1, the engine 2 has a combustion chamber 14. A suction pipe 16 extends from the combustion chamber 14 and defines a suction passage 18 connected to the combustion chamber 14. A cylindrical throttle body 20 is provided in the middle of the suction passage 18. The interior of the throttle body 20 defines part of the suction passage 18.

Figure 3:
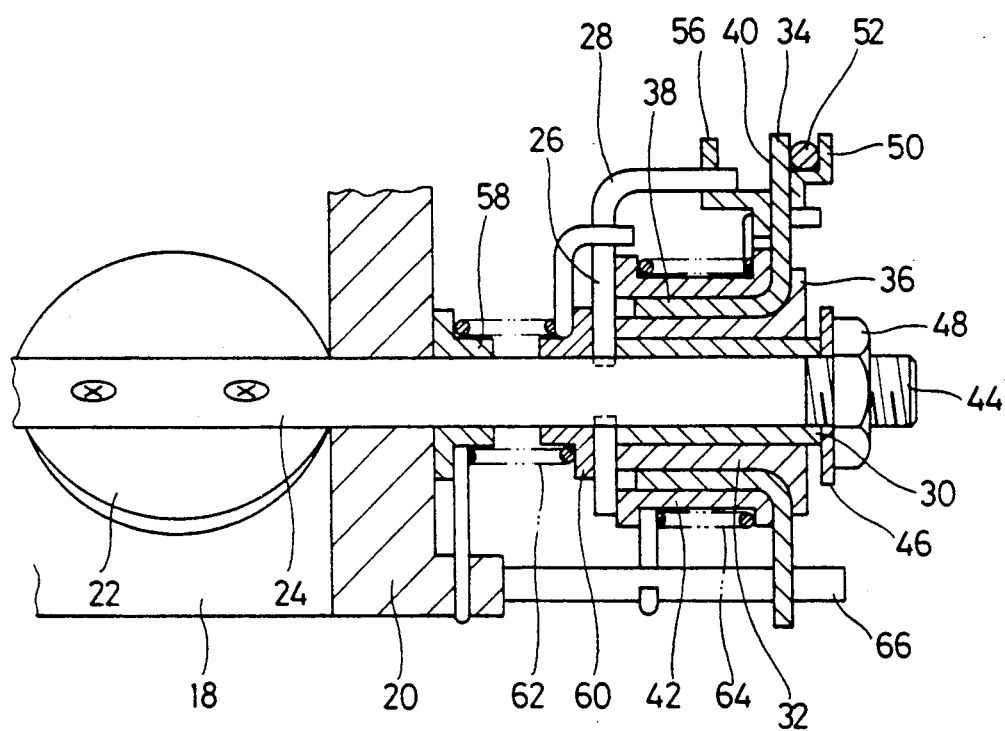
FIG. 3 is a sectional view of a drive mechanism for a throttle valve of the engine.

As shown in detail in FIG. 3, a throttle valve 22 is disposed in the throttle body 20. This valve 22 adjusts the intake air introduced into the combustion chamber 14 in accordance with its opening, i.e., throttle opening. The throttle valve 22 has a valve spindle 24, both ends of which are rotatably supported on the throttle body 20. One end of the spindle 24 projects outside the throttle body 20.

A throttle lever 26 is fixedly mounted on the projecting portion of the valve spindle 24. Thus, the throttle lever 26 rotates integrally with the valve spindle 24. As seen from FIG. 3, the throttle lever 26 extends in the radial direction of the throttle spindle 24, and its distal end portion constitutes a stopper 28 which is bent toward the distal end of the spindle 24.

Further, a bushing 30 is mounted on the outer peripheral surface of the valve spindle 24 so as to be situated nearer to the distal end of the spindle 24 than the proximal end of the throttle lever 26 is. A spacer 32 and an accelerator lever 34 are successively mounted on the outer peripheral surface of the bushing 30. A flange 36 is formed integrally on that end portion of the spacer 32 which is situated on the distal end side of the valve spindle 24. The flange 36 projects outward in the radial direction of the spacer 32.

An accelerator lever 34 includes a pipe portion 38, a lever portion 40 formed integrally on the pipe portion 38, and a collar portion 42 securely attached to the outer peripheral surface of the pipe portion 38. The pipe portion 38 of the accelerator lever 34 is rotatably mounted on the outer peripheral surface of the spacer 32. The lever portion 40 of the accelerator lever 34 extends radially outward beyond the flange 36, from the flange-side end portion of the spacer 32. Thus, the pipe portion 38 of the accelerator lever 34 is located between the throttle lever 26 and the flange 36 of the spacer 32.

A screw portion 44 is formed at the distal end portion of the valve spindle 24, and a nut 48 is mounted on the screw portion 44 by means of a washer 46. The washer 46, which has a greater diameter than the bushing 30, is pressed against the bushing 30 by means of the nut 48. In the state shown in FIG. 3, the bushing 30 projects slightly from the flange 36 of the spacer 32, so that a predetermined gap is defined between the flange 36 and the washer 46. Thus, the spacer 32 or the accelerator lever 34 is prevented from slipping off the valve spindle 24 by the washer 46 and the nut 48.

A wire guide 50 is mounted on the distal end portion of the lever portion 40 of the accelerator lever 34. The wire guide 50 is connected to one end of an accelerator wire 52. The wire 52 extends toward an accelerator pedal 54, as shown in FIG. 1, after being guided along the wire guide 50. The other end of the wire 52 is connected to the pedal 54. Accordingly, when the accelerator pedal 54 is pushed down by the driver, the accelerator wire 52 is pulled, and thus the accelerator lever 34 is rocked around the valve spindle 24 to the extent determined by the depth of depression of the pedal 54.

The collar portion 42 of the accelerator lever 34 is sandwiched between the lever portion 40 of the lever 34 and the throttle lever 26, and a flange is formed on each end of the collar portion 42. A pawl 56 extends outward in the radial direction of the collar portion 42 from that flange which is situated on the side of the accelerator lever 34. The pawl 56 can engage the stopper 28 of the throttle lever 26 as the accelerator lever 34 and the throttle lever 26 rock relative to each other. More specifically, the engagement between the pawl 56 and the stopper 28 is achieved when the throttle lever 26 is rocked in the direction to open the throttle valve 22 or when the accelerator lever 34 is rocked in the direction to close the valve 22.

A pair of spring seats 58 and 60 are mounted on the projecting portion of the valve spindle 24 so as to be situated between the throttle body 20 and the throttle lever 26. A torsion coil spring 62 is disposed between these spring seats so as to surround the projecting portion of the spindle 24. One end of the spring 62 is anchored to the throttle body 20, while the other end is retained on the throttle body 20. In this case, the torsion coil spring 62 urges the throttle lever 26 to rock it in a direction such that the stopper 28 of the lever 26 abuts against the pawl 56 of the accelerator lever 34, that is, in the direction to open the throttle valve 22.

A torsion coil spring 64 is also mounted on the collar portion 42 of the accelerator lever 34 so as to surround same. One end of the spring 64 is anchored to a stopper pin 66; while the other end is anchored to the accelerator lever 34. The stopper pin 66 extends parallel to the projecting portion of the valve spindle 24 from the throttle body 20. In this case, the torsion coil spring 64 urges the accelerator lever 34 to rock it in a direction such that the pawl 56 of the lever 34 abuts against the stopper 28 of the throttle lever 26, that is, in the direction to close the throttle valve 22. Thus, the urging force of the spring 64 serves as a resistance to the depression of the accelerator pedal 54, whereby the driver can enjoy a so-called detent feeling when he or she steps on the pedal.

As shown in FIG. 1, one end of a control rod 68 is rockably connected to the distal end of the throttle lever 26. The other end of the rod 68 is connected to a pneumatic actuator 70. More specifically, the actuator 70 is provided with a flat cylindrical shell 72 open at one end thereof. The open end of the shell 72 is closed by a diaphragm or bellowphragm 74. Thus, one side of the bellowphragm 74 is exposed to the outside, and the other end of the control rod 68 is rockably connected to the outer surface of the bellowphragm 74.

The shell 72 and the bellowphragm 74 define a pressure chamber 76 in cooperation with each other. A compression coil spring 78 is housed in the pressure chamber 76. Like the aforesaid torsion coil spring 62 (see FIG. 3), the spring 78 urges the throttle lever 26 through the medium of the control rod 68 to rock the lever 26 in the direction to open the throttle valve 22. Accordingly, the throttle lever 26, that is, the throttle valve 22, is urged in the valve opening direction by the resultant force of the torsion and compression coil springs 62 and 78. The resultant force of the springs 62 and 78 is set to a value smaller than the force of the aforesaid torsion coil spring 64, and thus the throttle valve 22 is closed when the accelerator pedal 64 is not depressed.

As shown in FIG. 1, that part of the suction pipe 16 which is situated on the lower-course side of the throttle body 20 is formed as a surge tank 80. The tank 80 is connected to a negative-pressure tank 84 through a connecting line 82. A check valve 86, which is disposed between the line 82 and the tank 84, allows air to flow only from the tank 84 toward the tank 80. Thus, the negative-pressure tank 84 is kept at a negative pressure equal to the lowest pressure in the surge tank 80.

The negative-pressure tank 84 and the pressure chamber 76 of the pneumatic actuator 70 are connected via a connecting line 88. A first solenoid valve 90 is disposed in the middle of the line 88. The valve 90 is a normally-closed valve which is closed when its solenoid 92 is not energized. More specifically, the first solenoid valve 90 includes a plunger 94 which has a valve plug 96 at an end portion thereof and is driven by the solenoid 92. When the solenoid 92 is not energized, the plunger 94 is moved downward (FIG. 1) by the urging force of a valve spring 98, and the plug 96 rests on a valve seat 100. In FIG. 1, the valve plug 96 is disengaged from the seat 100.

A branch line 102 extends from that part of the connecting line 88 which is situated between the first solenoid valve 90 and the pneumatic actuator 70. The line 102 is connected to that prior of the suction pipe 16 which is situated on the upper-course side of the throttle valve 22. A second solenoid valve 104, which is a normally-open valve, is disposed in the middle of the branch line 102. More specifically, a plunger 106 of the valve 104 is urged by a valve spring 110 so that its valve plug 108 is disengaged from its corresponding valve seat. Reference numeral 112 denotes the solenoid of the second solenoid valve 104.

The first and second solenoid valves 90 and 104 are individually connected to the aforesaid ECU 12 for controlling the operating conditions of the engine 2. The ECU 12 performs on-off control of the solenoids 92 and 112 of the first and second solenoid valves 90 and 104 on the basis of duty control. When the respective duty factors of the solenoid valves 90 and 104 are 0%, for example, the first valve 90 is closed, while the second valve 104 is open. Accordingly, the pressure chamber 76 of the pneumatic actuator 70 communicates with that part of the suction pipe 16 which is situated on the upper-course side of the throttle valve 22, and thus the pressure in the chamber 76 is substantially equal to the atmospheric pressure. Therefore, if the accelerator pedal 54 is depressed in this situation, the opening of the throttle valve 22 changes corresponding to the depth of depression of the pedal 54. If, on the other hand, the respective duty factors of the first and second solenoid valves 90 and 104 are 100%, the first valve 90 is open, while the second valve 104 is closed. In this case, therefore, the pressure chamber 76 of the pneumatic actuator 70 communicates with the negative-pressure tank 84, and thus the pressure in the chamber 76 is a negative pressure substantially equal to the negative pressure in the tank 84. Since the negative pressure in the pressure chamber 76 acts to deform the bellowphragm 74 so as to reduce the capacity of the chamber 76, the control rod 68 is pulled diagonally to the upper left in FIG. 1. Accordingly, the throttle lever 26 is rocked in the direction to close the throttle valve 22 by means of the control rod 68. Thus, the throttle valve 22 is closed, regardless of the depressed state of the accelerator pedal 54, whereby the driving torque of the engine 2 is forced to be reduced.

As is evident from the above description, the opening of the throttle valve 22 can be varied without regard to the depth of depression of the accelerator pedal 54, by properly controlling the duty factors of the first and second solenoid valves 90 and 104, whereby the driving torque of the engine 2 can be adjusted to any desired value.

In this embodiment, the opening of the suction passage 18 is determined by the single throttle valve 22 of which the operation is controlled by the accelerator pedal 54 and the pneumatic actuator 70. Alternatively, two throttle valves may be disposed in series along the suction passage 18 to adjust the opening of the suction passage 18. In this case, one throttle valve is driven by the accelerator pedal 54, while the other is driven by the pneumatic actuator 70, and thus these valves are independently controlled.

A fuel injector 114 projects into the suction pipe 16 in the vicinity of the combustion chamber 14 of the engine 2, for injecting fuel toward the combustion chamber 14. Specifically, the fuel injector 114 includes a built-in solenoid valve 116, which is electrically connected to the ECU 12 to be subjected to duty control. Thus, the quantity of fuel supplied from the injection nozzle of the fuel injector 114 toward the combustion chamber 14 can be adjusted by controlling the time for which the solenoid valve 116 is opened. The fuel injected toward the combustion chamber 14 in this manner is mixed with air to form an air-fuel mixture having a predetermined air-fuel ratio and the mixture is then ignited in the combustion chamber 14 by an ignition plug 118. The ignition plug 118 is also electrically connected to the ECU 12, so that the ignition timing thereof is controlled by the ECU 12. Where the engine 2 is a multiple cylinder engine, the fuel injector 116 is arranged in each of the branch pipes of an intake manifold connected to the combustion chambers of the respective cylinders, though not illustrated.

As shown in FIG. 2, a crank angle sensor 120 is connected to the ECU 12. The sensor 120, which is attached to the engine 2, supplies the ECU 12 with a detection signal corresponding to the engine rotation speed NE. Further, a throttle opening sensor 122 and an idle switch 124 are connected to the ECU 12. The throttle opening sensor 122, which is attached to the throttle body 20, supplies the ECU 12 with a detection signal corresponding to the throttle opening. The idle switch 124 detects the fully-closed state of the throttle valve 22, and supplies the ECU 12 with its detection signal.

Further, the ECU 12 is connected to a front-wheel rotation sensor 126 for calculating an average peripheral speed of a pair of front wheels FWL and FWR. In this embodiment, the front wheels FWL and FWR are the driving wheels, and accordingly, the front-wheel rotation sensor 126 detects the number of rotations of the output shaft 6a of the automatic transmission 6, as seen from FIG. 2.

The ECU 12 is connected to an airflow sensor 128, a water temperature sensor 130, an exhaust temperature sensor 132, and an ignition key switch 134, in addition to the aforementioned sensors, and are supplied with detection signals from these sensors and the switch. The airflow sensor 128 is, e.g., a Karman vortex-type flow meter, and is arranged at the distal end portion of the suction pipe 16. The distal end portion of the suction pipe 16 is surrounded by an air cleaner 136. The water temperature sensor 130 is mounted to the water jacket of the engine 2, to detect the temperature of the cooling water of the engine 2. The exhaust temperature sensor 132 is attached to an exhaust pipe 138 extending from the combustion chamber 14 of the engine 2, and detects the temperature of the exhaust gas passing through the exhaust pipe 138, i.e., exhaust passage 140.

Furthermore, the ECU 12 is connected to a torque control unit (hereinafter merely referred to as TCL) 142 for calculating a final target driving torque TO of the engine 2, through a communication cable 144. An accelerator opening sensor 146 is connected to the TCL 142. The sensor 146, like the throttle opening sensor 122 and the idle switch 124, is attached to the throttle body 20. This sensor 146 detects the opening or rocking angle of the accelerator lever 34, and supplies the TCL 142 with its detection signal. The detection signal output from the accelerator opening sensor 146 corresponds to the depth of depression of the accelerator pedal 54.

The TCL 142 is also connected to rear-wheel rotation sensors 148 and 150, a steering angle sensor 152, a reference position sensor 154, and a manual switch 156. The rear-wheel rotation sensors 148 and 150 detect the respective rotating speeds of left and right rear wheels RWL and RWR for use as driven wheels, and supply the TCL 142 with their detection signals. The steering angle sensor 152 detects the rotational angle of a steering shaft 158 (see FIG. 4) of a steering wheel, with respect to the state of straight drive of the vehicle as a reference, and supplies the TCL 142 with its detection signal. In other words, the sensor 152 detects the rotational angle of the steering shaft 158 with respect to its neutral position $\delta M$.

The reference position sensor 154 detects the position taken by the steering wheel 160 integral with the steering shaft 158 when the wheel 160 is not rotated, and a position taken by the steering wheel when it is rotated in either direction by 360° from the above position, as reference positions of the steering wheel, and supplies the TCL 142 with its detection signal. The TCL 142 is supplied with information on the operating conditions of the engine 2 through the communication cable 144, in addition to the data supplied from the ECU 12, such as the engine speed NE, the rotation speed of the output shaft 6a of the automatic transmission 6, and the detection signal from the idle switch 110. The ECU 12 is supplied with information on the final target driving torque TO, obtained in the TCL 142, the retard angle for the ignition timing, etc., through the communication cable 144.

Figure 4:
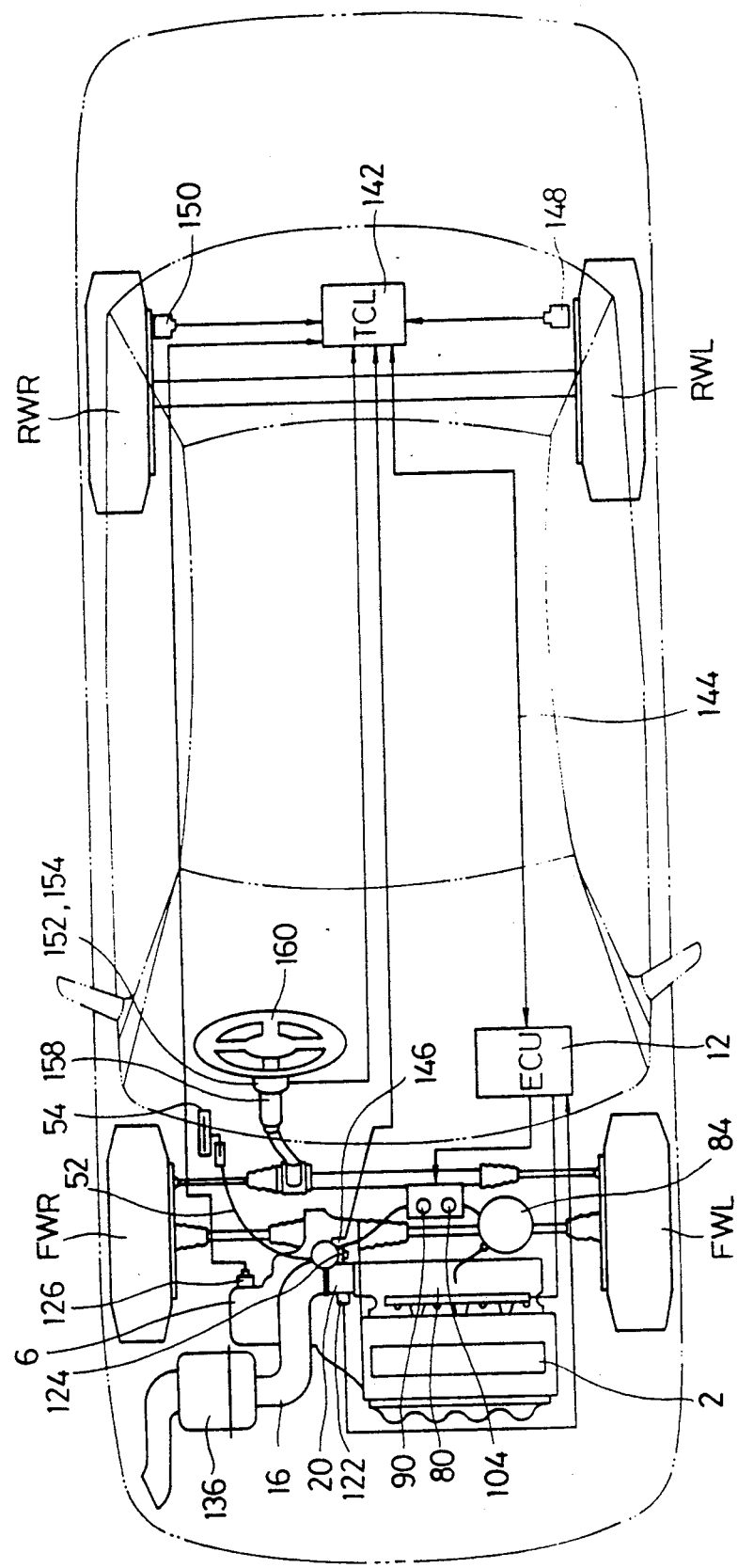
FIG. 4 is a diagram showing the arrangement of various parts appearing in FIGS. 1 and 2.

The arrangement of the aforementioned TCL 142, various sensors and switches, and the ECU 12 will be understood from FIG. 4.

The TCL 142 first calculates a first target torque TOS for a slip control of the vehicle and a second target torque TOC for a turning control, and then selects a suitable one from the first and second target torques TOS and TOC and outputs same as the final target driving torque TO.

The first target torque TOS is used to reduce the driving torque of the engine 2 when the amount of a slip (slippage) of the front wheels or driving wheels FW in the running direction becomes greater than a predetermined value. By reducing the driving torque of the engine 2 in accordance with the first target torque TOS, the drivability of the vehicle is ensured and the energy loss is eliminated. The second target torque TOC is used to reduce the driving torque of the engine 2 when the transverse or lateral acceleration acting on the vehicle in a direction at right angles to the running direction while the vehicle is turning becomes greater than a predetermined value. If the driving torque of the engine 2 is reduced in accordance with the second target torque TOC, the problem that the course of turn of the vehicle is deviated from the intended course can be effectively eliminated.

Further, the TCL 142 calculates a correction amount for retarding the ignition timing, and then outputs the same. The reason of calculating the ignition timing-retarding correction amount by the TCL 142 is as follows. The driving torque of the engine 2 may not be reduced to a desired level even if the throttle valve 22 is fully closed by the pneumatic actuator 70 in accordance with the final target driving torque TO and thus the driving torque of the engine 2 is reduced. In such a case, the driving torque of the engine 2 can be promptly reduced by retarding the ignition timing.

Figure 5:
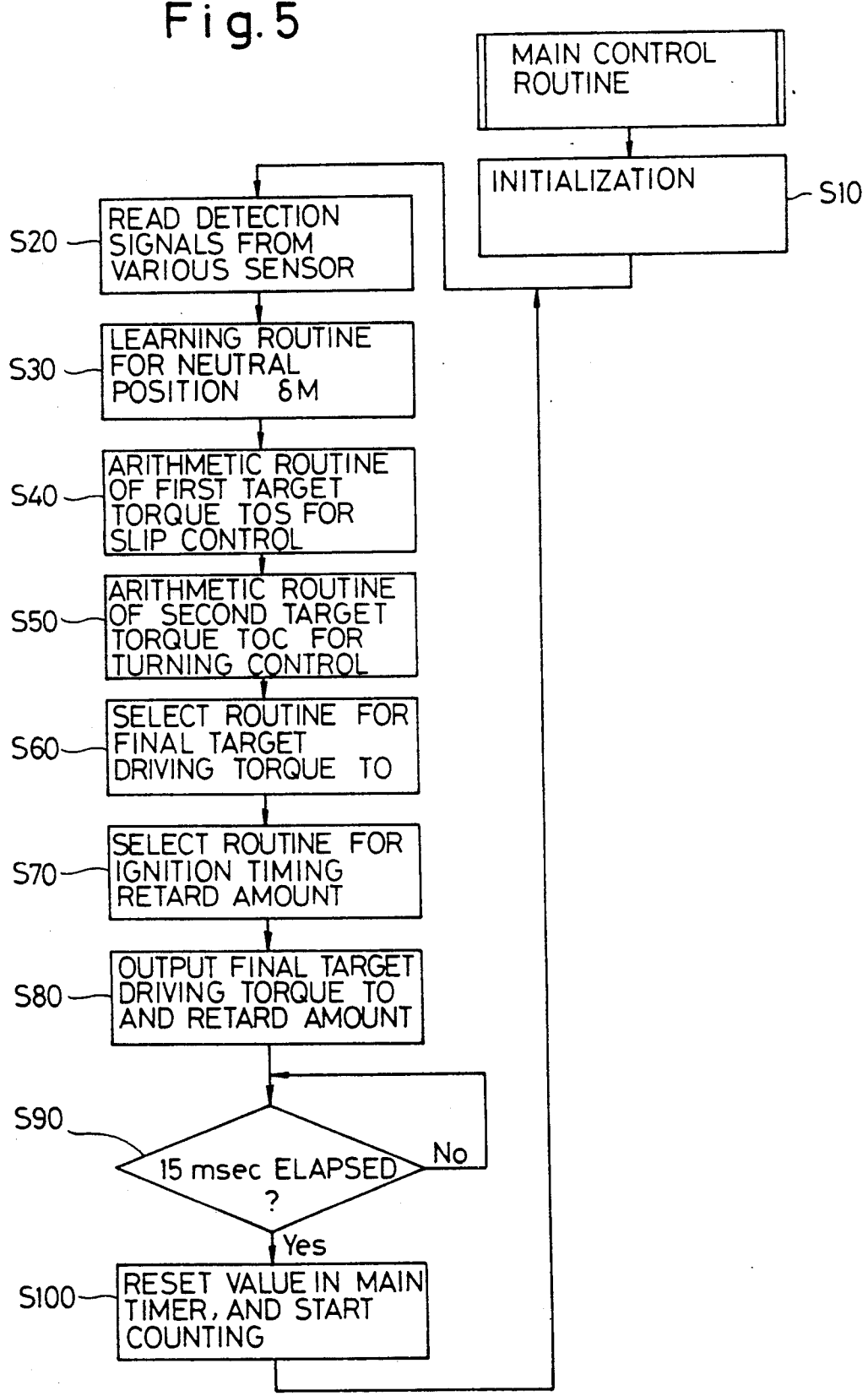
FIG. 5 is a flowchart of a main control routine executed in a traction control unit of the control apparatus of FIG. 2.

FIG. 5 shows a main control routine executed by the above-described TCL 142, and this routine will be described first.

MAIN CONTROL ROUTINE

The main control routine is started when an ignition key (not shown) of the engine 2 is turned on, and an initialization is effected in Step S10. In this initialization process, a main timer starts to measure time simultaneously with the resetting of various flags. The main timer is a subtraction timer whose initial value is 15 msec as the sampling period for the main control routine.

In Step S20, the TCL 142 reads the detection signals from the various sensors. At this time, the rotational angle $\delta H$ of the steering shaft 158 of the steering wheel is fetched from the steering angle sensor 152, and this rotational angle $\delta H$, or $\delta m(0)$, is set as the neutral position $\delta M$ of the steering shaft 158 and stored in a memory (not shown) in the TCL 142. Namely, immediately after the ignition key is turned on, the neutral position $\delta M$ of the steering shaft 158 is not stored in any of the memories in the TCL 142 or ECU 12, and accordingly, the rotational angle $\delta m(0)$ of the steering shaft 158 detected for the first time by the steering angle sensor 152 is used as the estimated neutral position $\delta M$ every time the ignition key is turned on.

In Step S30, the neutral position $\delta M$ of the steering shaft 158 is corrected by learning. The neutral position $\delta M$ is corrected when the vehicle fulfills requirements for stable straight drive, on the basis of a learning control mentioned later. This learning correction is continued until the ignition key is turned off.

In Step S40, a first target torque TOS for slip control is calculated. The first target torque TOS is calculated based on the detection signals from the front-wheel rotation sensor 126 and rear-wheel rotation sensors 148 and 150, and is used to regulate the driving torque of the engine 2. In Step S50, a second target torque TOC for turning control is calculated. The second target torque TOC is calculated based on the detection signals from the rear-wheel rotation sensors 148 and 150 and steering angle sensor 152.

After the first and second target torques TOS and TOC are calculated, a final target driving torque TO is selected from these torques TOS and TOC, in Step S60. Fundamentally, when selecting the target driving torque TO, the smaller of the first and second target torques TOS and TOC is selected for a stable drive of the vehicle.

In Step S70, a rate of correction with respect to a basic retard amount PB of the ignition timing, i.e., a retard amount for the igniting timing, is selected based on the rate GS of change in slip amount or slippage s of the front wheels FWL and FWR. The basic retard amount PB is set in accordance with the conditions under which the engine 2 is then operated. Selecting the retard amount for the ignition timing in this manner is effective in quickly reducing the driving torque of the engine 2, as compared to only reduce the driving torque of the engine 2 by controlling the opening of the throttle valve 22 to be reduced by the pneumatic actuator 70, in accordance with the target driving torque TO.

In Step S80, data on the final target driving torque TO, selected in Step S60, and data on the rate of retard with respect to the basic retard angle PB, selected in Step S70, are output from the TCL 142 to the ECU 12 through the communication cable 144.

In Step S90, it is determined whether or not the value in the main timer is 0, that is, whether or not 15 msec, the initial value of the main timer, has passed. If the determination in Step S90 is NO, the process of Step S90 is repeatedly executed. When the determination in Step S90 becomes YES, the program proceeds to Step S100, whereupon the value in the main timer is reset to the initial value and then the main timer starts counting. Thereafter, the processes of Steps S20 to S100 are repeatedly executed until the ignition key is turned off.

When the target driving torque TO and the rate of retardation for the basic retard angle PB of the ignition timing are supplied from the TCL 142 to the ECU 12, the ECU 12 performs a duty-factor control on the throttle valve 22, i.e., the first and second solenoid valves 90 and 104, such that the driving torque of the engine 2 coincides with the target driving torque TO, if the slip control and the turning control are then needed by the driver, that is, the manual switch 156 shown in FIG. 2 is turned on. Simultaneously, the ECU 12 calculates a target retard angle PO in accordance with the rate of retardation with respect to the basic retard angle PB, and thus the ignition timing P is retarded by the target retard angle PO when required. The control of the throttle opening and the ignition timing P described above ensures an optimum control of the driving torque of the engine 2 and thus permits a stable drive of the vehicle.

On the other hand, when the aforesaid manual switch 156 is not turned on, i.e., the slip control and the turning control are not needed by the driver, the ECU 12 sets the duty factors of the first and second solenoid valves 90 and 104 to a predetermined value on the 0% side. Accordingly, the driving torque of the engine 2 is controlled in accordance with the depth of depression of the accelerator pedal 54, whereby the vehicle is driven by an ordinary operation.

In the aforesaid Step S50, a target transverse acceleration GYO, acting on the vehicle in a direction at right angles to the running direction, is calculated based on the vehicle speed V, derived from the detection signals from the rear-wheel rotation sensors 148 and 150, and the steering angle δ of the front wheels FW, derived from the detection signals from the steering angle sensor 152, and the second target torque TOC is calculated based on the target transverse acceleration GYO, as described later. Therefore, the steering angle δ of the front wheels FW must be accurately calculated in order to permit an accurate calculation of the second target torque TOC. For obtaining an accurate steering angle δ, the aforesaid neutral position δM of the steering shaft 158 must be accurate. The neutral position δM, however, varies when a toe-in adjustment of the front wheels FW is effected at the time of maintenance, or due to wear of the steering gear caused by long use, for example. Therefore, if the neutral position δM of the steering shaft 158 changes, the steering angle δ and thus the value of the second target torque TOC becomes inaccurate.

Accordingly, in this embodiment, the neutral position δM of the steering shaft 158 is corrected by learning in Step S30 so that the value thereof is always accurate.

Moreover, in this embodiment, the target transverse acceleration GYO is used in the calculation of the first target torque TOS in Step S40, as will be described later, and accordingly, the value of the first target torque TOS can be advantageously made accurate.

The aforementioned vehicle speed V, steering angle δ, and target transverse acceleration GYO can be derived from the following equations $$V = (VRL + VRR)/2 \quad (1)$$

$$\delta = \delta H/\rho H \quad (2)$$

$$GYO = \delta/(L \cdot (A + (1/V^2))) \quad (3)$$

where VRL and VRR represent the peripheral speeds (hereinafter referred to as rear-wheel speeds) of a pair of rear wheels RWL and RWR, δH represents the angle of rotation of the steering shaft 158 detected by the steering angle sensor 152, ρH represents the speed reduction ratio of the steering gear, L represents the wheel base of the vehicle, and A represents the stability factor of the vehicle.

Figure 6:
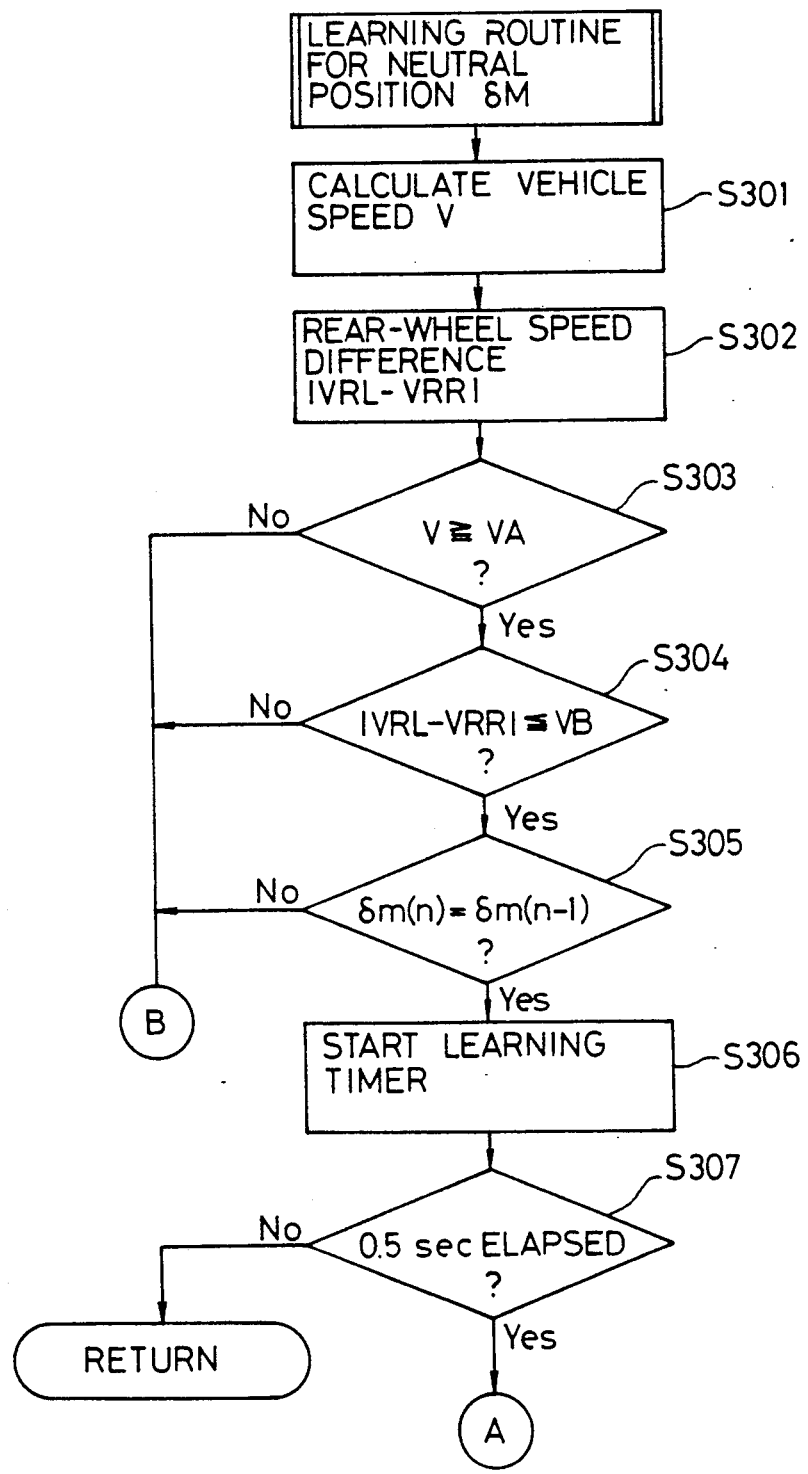
FIGS. 6 and 7 are flowcharts illustrating a learning routine for the neutral position of a steering shaft.

The learning routine for the neutral position δM executed in the aforesaid Step S30 is shown in detail in FIGS. 6 and 7, and this learning routine will be described below.

LEARNING ROUTINE

In this learning routine, the vehicle speed V is first calculated in Step S301. More specifically, the vehicle speed V is calculated according to the aforesaid equation (1).

In Step S302, a deviation between the respective peripheral speeds of the rear wheels RWL and RWR (hereinafter referred to as rear-wheel speed difference), i.e., |VRL−VRR|, is calculated.

In Step S303, it is determined whether or not the vehicle speed V is higher than a preset threshold value VA. The determination in this step is necessary because the rear-wheel speed difference |VRL−VRR|, which is produced by the vehicle steering, cannot be detected unless the vehicle speed V reaches some high-speed zone. The threshold value VA, which is experimentally set in accordance with the running characteristics of the vehicle or the like, is adjusted to 10 km/h in this embodiment.

When the determination in Step S303 becomes YES as the vehicle speed V reaches the threshold value VA or a higher level, it is determined in Step S304 whether or not the rear-wheel speed difference |VRL−VRR| is smaller than a preset threshold value VB. The threshold value VB is set at 0.3 km/h, for example. If the result of determination in Step S304 is YES, it can be concluded that the vehicle is advancing straight. If the threshold value VB is set at 0 km/h, the rear-wheel speed difference may occur due to the difference in air pressure between the left and right rear wheels RWL and RWR even though the vehicle is advancing straight, thus making the result of determination in Step S304 inevitably NO.

If the determination in Step S304 is YES, that is, if it is concluded that the vehicle is advancing straight, it is determined in Step S305 whether or not the rotational angle δH or a rotational angle δm(n) of the steering shaft 158, read this time in Step S20 of the main control routine, is coincident with the rotational angle δm(n−1) read in the preceding cycle. When making the determination in Step S305, the detection resolution of the steering angle sensor 152 is preferably set at, e.g., 5° or thereabouts, in terms of the rotational angle of the steering shaft 158, lest the decision be influenced by vibratory motion of the steering wheel due to idle motion of the driver's hands or the like.

If the determination in Step S305 is YES, a built-in timer for the learning routine in the TCL 142 is actuated in Step S306, and it is then determined in Step S307 whether or not 0.5 sec is attained by the value in the learning timer. In this case, the determination in Step S307 is NO, immediately after the execution of Step S306, and thus the program returns to the main control routine of FIG. 5.

Figure 7:
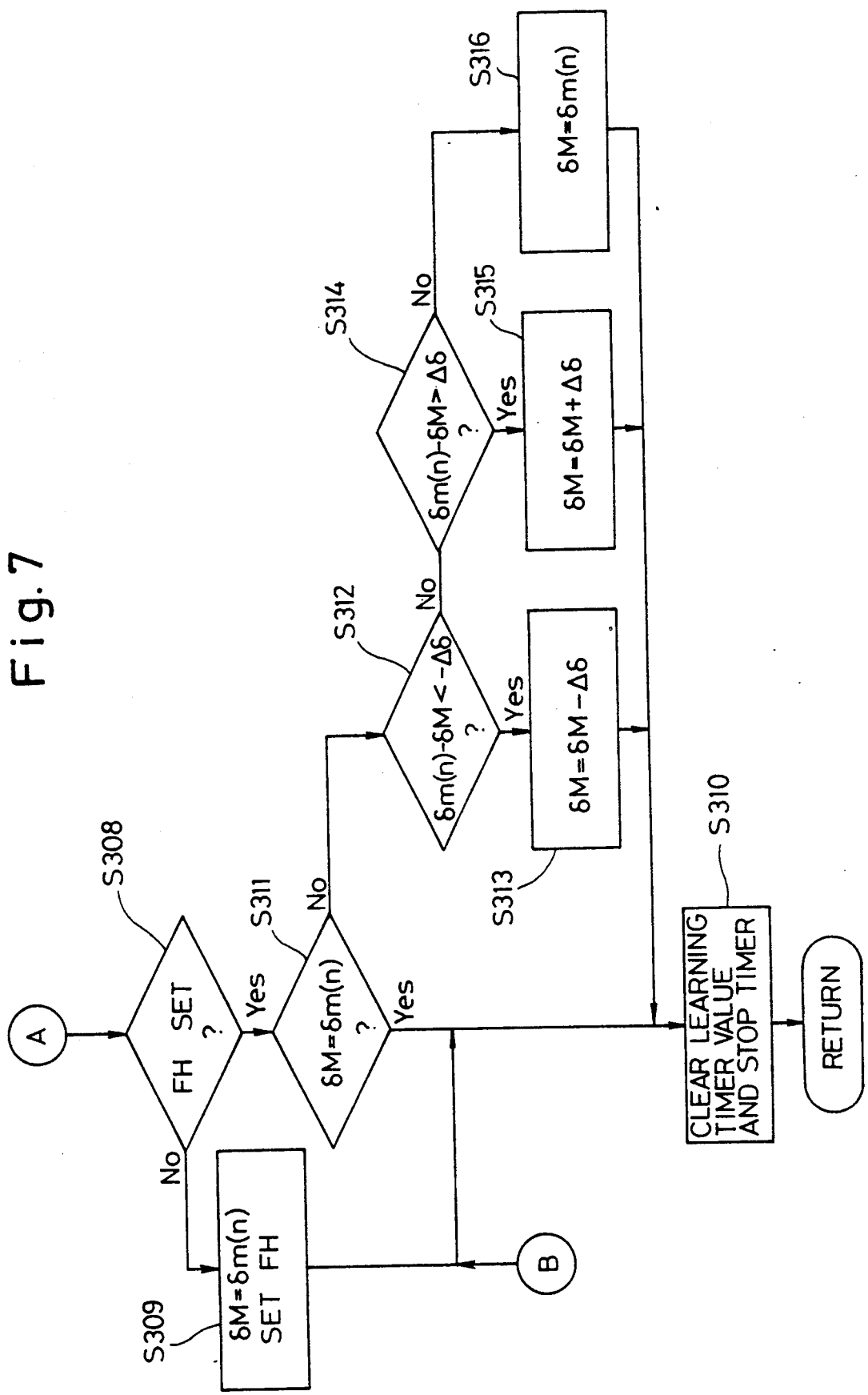

However, if the determination in Step S307 becomes YES as the main control routine or the learning routine is repeatedly executed, that is, if a state in which the results of determination in Steps S303 to S305 are all YES continues for 0.5 sec, the program proceeds to Step S308 shown in FIG. 7. In Step S308, it is determined whether or not a learning flag FH is set. This learning flag FH is used to indicate whether or not the learning control has already been executed. Since the learning flag FH is left reset by the initialization in Step S10 of the main control routine of FIG. 5, the determination in Step S308 is NO at this point of time, and thus the program proceeds to Step S309. In Step S309, the neutral position δM previously stored in the memory is replaced with the rotational angle δm(n) of the steering shaft 158 for the present point of time, whereby a new neutral position is established, and the learning flag FH is set.

Thereafter, the program proceeds to Step S310, whereupon the value in the learning timer is cleared, and the operation of this timer is stopped. Then, the program returns to the main control routine of FIG. 5.

If a state is thereafter established in which the program proceeds again from the main control routine to the learning routine and Step S308 is executed, the result of the determination in Step S308 is YES, in which case it is concluded that the learning control has already been executed. The program then proceeds to Step S311. In Step S311, it is determined whether or not the rotational angle δm(n) of the steering shaft 158 for the present point of time is coincident with the previously set neutral position δM, that is, whether or not the following equation holds.

$$\delta M = \delta m(n).$$

If the determination in Step S311 is YES, Step S310 is executed, whereupon the program returns to the main control routine. If, however, the determination in Step S311 is NO, due to some play of various parts of the steering system, the program proceeds to Step S312, whereupon the processes of Step S312 and the subsequent steps are executed. Even if the result of determination in Step S311 is NO, in this case, the present rotational angle δm(n) cannot be directly set as the neutral position δM of the steering shaft 158. Namely, a value obtained by adding or subtracting a preset limit value Δδ to or from the neutral position δM is set as a new neutral position only when the absolute value of the deviation between the rotational angle δm(n) and the neutral position δM is considerably different from the limit value Δδ. The new neutral position thus obtained by the learning correction replaces the neutral position δM stored in the memory in the TCL 142.

More specifically, in the learning correction of the neutral position δM, it is determined whether or not the following relationship holds is first determined in Step S312.

$$\delta m(n) - \delta M < -\Delta\delta.$$

If the determination in Step S312 is YES, a new neutral position δM is calculated according to the following equation in Step S313.

$$\delta M = \delta M - \Delta\delta.$$

When obtaining the new neutral position by correcting the previously set neutral position δM, the correction amount for each cycle is limited to −Δδ, as seen from this equation, and thus the value of the new neutral position cannot greatly vary from the pre-correction neutral position δM. Accordingly, even if the detection signal from the steering angle sensor 152 suffers noise and thus becomes an abnormal signal, for example, the neutral position δM of the steering shaft 158 for the reference can never drastically change. Thus, adverse effects of noise on the calculation of the neutral position δM can be reduced.

If the determination in Step S312 is NO, on the other hand, it is determined in Step S314 whether or not the following relationship holds.

$$\delta m(n) - \delta M > \Delta\delta.$$

If the determination in Step S314 is YES, the previously set neutral position δM is replaced with a new neutral position in Step S315, in accordance with the following equation.

$$\delta M = \delta M + \Delta\delta.$$

It is to be understood that the neutral position δM of the steering shaft 158 can never drastically change, and thus adverse effects of noise on the calculation of the neutral position δM can be reduced also in this case.

If the determination in Step S314 is NO, that is, if the deviation between the rotational angle δm(n) and the neutral position δM is within ±Δδ, the previously set neutral position δM is replaced with the present rotational angle δm(n) in Step S316.

Any of Step S313, S315 and S316 returns to the main control routine of FIG. 5 via Step S310, whereupon Step S40 is executed. In Step S40, the first target torque TOS is calculated, as mentioned before, and this arithmetic routine is illustrated in the block diagrams of FIGS. 8A and 8B. The following is a description of the diagrams.

An outline of the way the first target torque TOS(n) is calculated will be first described. A target peripheral speed of the front wheels (hereinafter referred to as target front-wheel speed) VFO is calculated based on the detection signals from the rear-wheel rotation sensors 148 and 150, and a rate of change of the target front-wheel speed (hereinafter referred to as target front-wheel acceleration) GFO is calculated. Subsequently, a reference driving torque TB of the engine 2 corresponding to the target front-wheel acceleration GFO is calculated, and corrected on the basis of a deviation between the actual front-wheel speed VF derived by the front-wheel rotation sensor 126 and the target front-wheel speed VFO, to obtain a first target torque TOS for the present point of time. The deviation between the front-wheel speed VF and the target front-wheel speed VFO represents the slippage s of the front wheels FW.

As shown in FIG. 8A, the peripheral speeds of the rear wheels RWL and RWR, i.e., the rear-wheel speeds VRL and VRR, are supplied to both a low-speed select section 200 and a high-speed select section 202. The low-speed select section 200 selects the smaller of the rear-wheel speeds VRL and VRR and outputs the selected speed to a changeover switch 204, while the high-speed select section 202 selects the higher of the speeds VRL and VRR and supplies the selected speed to the changeover switch 204. The changeover switch 204 is connected to one of the low- and high-speed select sections 200 and 202, and outputs the rear-wheel speed supplied from the select section then connected, as a vehicle speed V(n) for this point of time. The operation of the changeover switch 204 will be described in more detail. When the driving torque of the engine 2 is actually reduced by the slip control, i.e., when a control flag FS mentioned later is set, the changeover switch 204 is connected to the low-speed select section 200, whereby the smaller of the rear-wheel speeds VRL and VRR is selected as the vehicle speed V(n). On the other hand, if the driving torque of the engine 2 is not reduced though the driver needs the slip control, i.e., when the control flag FS is left reset, the changeover switch 204 is connected to the high-speed select section 202 and thus the higher of the rear-wheel speeds VRL and VRR is selected as the vehicle speed V(n).

The above-described operation of the changeover switch 204 serves to prevent an undesirable frequent changeover between a control state in which the driving torque of the engine 2 is reduced and a non-control state in which the driving torque is not reduced. For example, if the smaller of the rear-wheel speeds VRL and VRR is selected as the vehicle speed V while the vehicle is turning, the driving torque of the engine 2 may be reduced, although the front wheels FWL and FWR do not in fact undergo a slip. Such a drawback can be eliminated by the function of the changeover switch 204. Further, while the driving torque of the engine 2 is reduced, this state can be maintained by the function of the changeover switch 204, thereby ensuring a stable drive of the vehicle.

The vehicle speed V(n) output from the changeover switch 204 is supplied to a multiplier 206, in which a target front-wheel speed VFO(n) for the present point of time is calculated. Specifically, the target front-wheel speed VFO(n) is calculated according to the following equation.

$$VFO(n) = 1.03 \cdot V(n) \qquad (4)$$

The constant 1.03 is used, considering that a slip of about 3% usually occurs between the road surface and the front wheels FW used as the driving wheels when the vehicle is running.

The target front-wheel speed VFO is supplied to a differentiating section 208, whereupon a reference front-wheel acceleration GFB(n) is calculated. Specifically, the reference front-wheel acceleration, GFB(n) is derived according to the following equation.

$$GFB(n) = (VFO(n) - VFO(n-1)) \; 3.6 \cdot \Delta t \cdot g \qquad (5)$$

where VFO(n−1) represents the target front-wheel speed calculated in the previous cycle, Δt represents the sampling period of the main timer, i.e., 15 msec., and g represents the gravitational acceleration.

The formula (5) may give a negative value for the reference front-wheel acceleration GFB(n), but it is a fundamental principle that the slip control is carried out during an acceleration of the vehicle. Thus, when the value of the reference front-wheel acceleration GFB(n) is smaller than 0, it is disregarded in a clipping section 210. The reference front-wheel acceleration GFB(n) derived through the clipping section 210 is then subjected to a filtering process in a filter section 212 to remove noise, thereby obtaining a modified reference front-wheel acceleration GFF.

Figure 9:
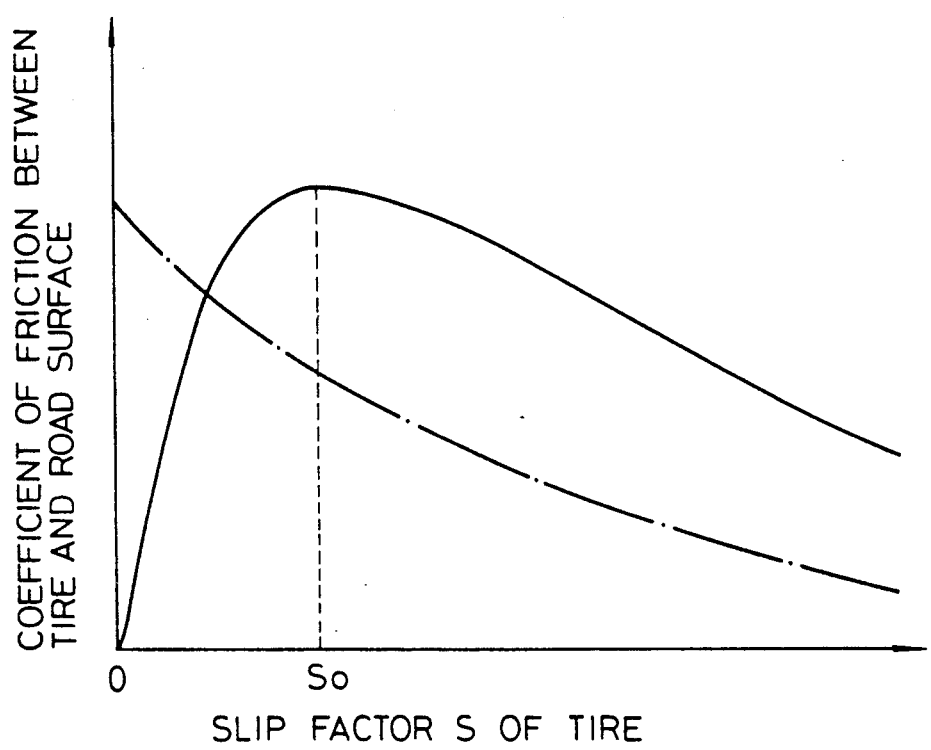
FIG. 9 is a graph showing the relationship between the slip factor of vehicle tires and the coefficient of friction between the road surface and tires.

To effectively utilize the driving torque of the engine 2 during acceleration of the vehicle, a slip factor S of the front wheels FW must be proper. The relationship between the slip factor S and the coefficient of friction between the tires and the road surface is shown in FIG. 9. As seen from the figure, the friction coefficient is a maximum when the slip factor S is equal or close to a target slip factor So. Therefore, if the slip factor S is controlled to the target slip factor So or thereabouts, the energy loss can be prevented and the drivability and acceleration performance of the vehicle cannot be lowered.

It is known that the target slip factor So varies within a range of about 0.1 to 0.25, depending the road surface conditions. The coefficient of friction between the tires and the road surface, on the other hand, can be regarded as equivalent to a longitudinal acceleration GX acting in the running direction of the vehicle. Accordingly, the reference front-wheel acceleration GFF can be accurately calculated by correcting the aforesaid postmodification reference front-wheel acceleration GFF on the basis of the longitudinal acceleration GX.

To this end, the vehicle speed V(n) at the present point of time, output from the changeover switch 204, is supplied to a differentiating/multiplying section 214, in addition to the multiplier 206. This section 214 calculates a longitudinal acceleration GX(n) at this point of time, according to the following equation.

$$GX(n) = (V(n) - V(n-1))/(3.6 \cdot \Delta t \cdot g) \qquad (6)$$

where V(n−1) represents the vehicle speed calculated in the preceding cycle.

The calculated longitudinal acceleration GX(n) is then supplied to a clipping section 216, wherein the value of the longitudinal acceleration GX(n) is restricted to 0.6 g or smaller. Since the longitudinal acceleration GX(n) is restricted to 0.6 g or less by clipping, the reference front-wheel acceleration GFF(n) is moderately varied when corrected. The longitudinal acceleration GX(n) derived through the clipping section 216 is subjected to a filtering process in a filter section 218, to obtain a modified longitudinal acceleration GXF(n).

The filtering process in the section 218 is executed as the longitudinal acceleration GX(n) of the vehicle is equivalent to the coefficient of friction between the tires and the road surface. Namely, even when the maximum value of the longitudinal acceleration GX(n) varies and thus the slip factor S of the tires is deviated considerably from the target slip factor So, the longitudinal acceleration GX(n) can be modified in the filter section 218 such that the slip factor S is maintained at a value equal to or close to and smaller than the target slip factor So.

More specifically, when the longitudinal acceleration GX(n) of the present cycle is larger than the longitudinal acceleration GXF(n−1) obtained by the preceding filtering process, i.e., when the vehicle continues accelerating, the equation given below is used to obtain the post-modification longitudinal acceleration GXF(n) for this point of time.

$$GXF(n) = (28/256) \cdot \Sigma(GX(n) - GXF(n-1)).$$

The use of the above equation serves to remove the noise from the longitudinal acceleration GX(n) by a delay process, and accordingly, the modified longitudinal acceleration GXF(n) relatively quickly follows the longitudinal acceleration GX(n).

On the other hand, when the longitudinal acceleration GX(n) is smaller than the modified longitudinal acceleration GXF(n−1), i.e., when the degree of acceleration of the vehicle is not very high, the below-described process is executed at each sampling period Δt of the main timer.

When the control flag FS is not set during the slip control, i.e., when the driving torque of the engine 2 is not reduced by the slip control, which means that the vehicle is decelerating, the post-modification longitudinal acceleration GXF(n) is calculated according to the following equation.

$$GXF(n) = GXF(n-1) - 0.002.$$

As seen from this equation, the reduction of the post-modification longitudinal acceleration GXF(n) is restricted to 0.002. Accordingly, when an acceleration of the vehicle is thereafter required by the driver, satisfactory response to the acceleration requirement is ensured.

Even when the driving torque of the engine 2 is reduced and the slippage s takes a positive value, i.e., the front wheels FW slip in some degree, while the slip control is executed, the degree of the vehicle acceleration at this time is small. Accordingly stable drive of the vehicle can be ensured even if the amount of reduction of the post-modification longitudinal acceleration GXF(n) is restricted. Therefore, even in such a case, the post-modification longitudinal acceleration GXF(n) is calculated according to the following equation:

$$GXF(n) = GXF(n-1) - 0.002.$$

Also in this case, when an acceleration of the vehicle is thereafter required by the driver, satisfactory response to the acceleration requirement is ensured.

While the slip control is executed and the driving torque of the engine 2 is reduced, if the slippage s of the front wheels FW takes a negative value, i.e., if the vehicle is decelerating, the post-modification longitudinal acceleration GXF is maintained at a maximum value of that point of time. Also in this case, when an acceleration of the vehicle is thereafter required by the driver, satisfactory response to the acceleration requirement is ensured.

Figure 10:
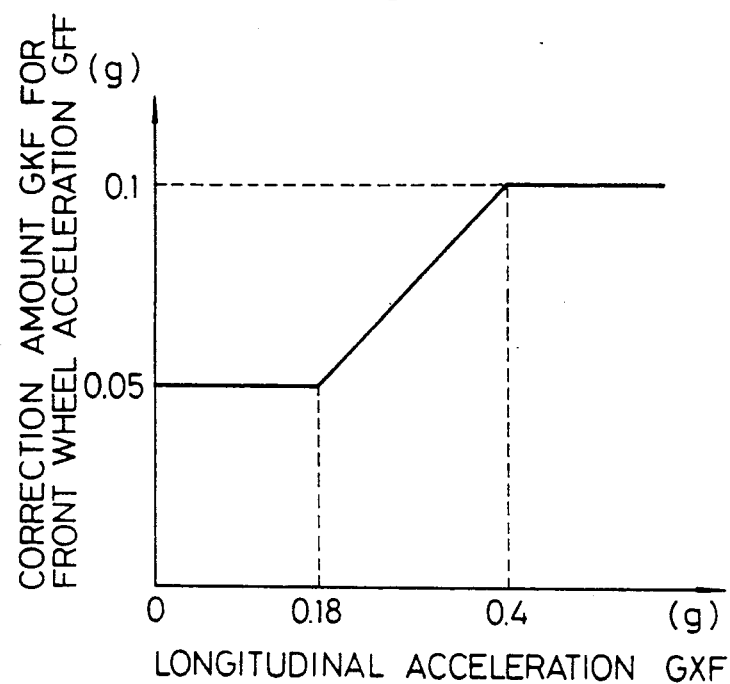
FIG. 10 is a graph showing the correction amount for the front-wheel acceleration, employed in accordance with a longitudinal acceleration of the vehicle.

After the post-modification longitudinal acceleration GXF(n) is calculated in the above-described manner, it is supplied to an acceleration correction section 212, whereupon a correction amount GKF(n) for the reference front-wheel acceleration GFF corresponding to the longitudinal acceleration GXF(n) is read from a map shown in FIG. 10. The correction amount GKF(n) and the modified reference front-wheel acceleration GFF(n), supplied from the filter section 212, are added together in an adder 221, to obtain a corrected front-wheel acceleration GFF(n).

The value of the correction amount GKF(n) may be increased stepwise with an increase in the value of the longitudinal acceleration GXF(n). In this embodiment, as seen from the map of FIG. 10, the correction amount GKF(n) is increased progressively as the longitudinal acceleration GXF(n) increases from 0.18. The map shown in FIG. 10 is obtained through vehicle running tests.

The one-dot-chain line in FIG. 9 indicates the relationship between the slip factor S of the tires and the coefficient of friction between the tires and the road surface when the vehicle is turning. The characteristics indicated by the line reveal that a target slip factor at which the friction coefficient takes a maximum value is significantly small, compared with the target slip factor So during a straight drive of the vehicle. Accordingly, when the vehicle is turning, the reference front-wheel acceleration GFF(n) is preferably set to a value smaller than the reference front-wheel acceleration applied during straight drive, in order to ensure stable turning of the vehicle.

Figure 11:
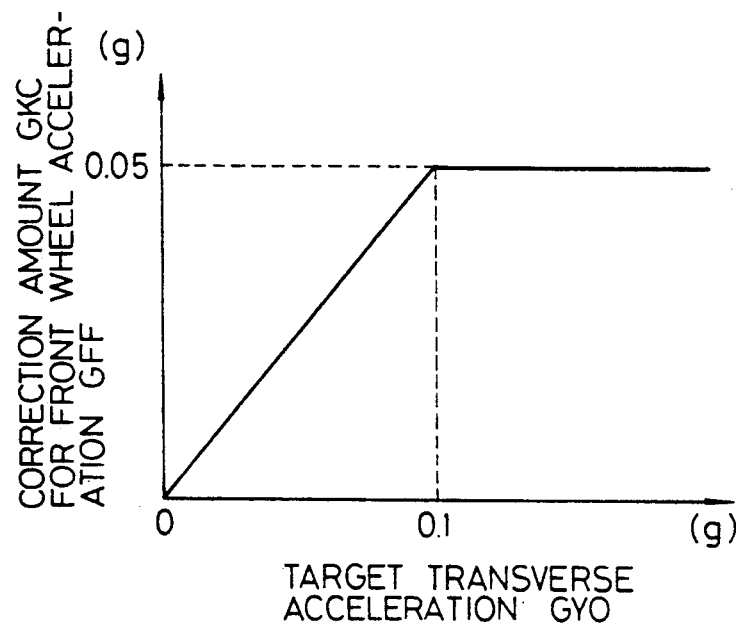
FIG. 11 is a graph showing the correction amount for the front-wheel acceleration, employed in accordance with a target transverse acceleration of the vehicle.

To this end, a turning correction section 222 is supplied with the target transverse acceleration GYO calculated according to the aforesaid equation (3), and obtains a correction amount GKC(n) for the reference front-wheel acceleration GFF(n) during turning, on the basis of the target transverse acceleration GYO. Specifically, the correction amount GKC(n) is read from a map shown in FIG. 11, in accordance with the target transverse acceleration GYO. The correction amount GKC(n) is supplied to a subtracter 224, whereupon the correction amount GKC(n) is subtracted from the reference front-wheel acceleration GFF(n) supplied from the adder 221, to obtain a target front-wheel acceleration GFO(n) for the present point of time. The target front-wheel acceleration GFO(n) is calculated according to the following equation, which collectively represents the operations of the adder 221 and subtracter 244:

$$GFO(n) = GFF(n) + GKF(n) - GKC(n).$$

The target front-wheel acceleration GFO(n) is supplied to a clipping section 226. When the value of the target front-wheel acceleration GFO(n) is smaller than −0.6 g or larger than 0.6 g, it is restricted to within the range of −0.6 g to 0.6 g in the clipping section 226. By thus restricting the value of the target front-wheel acceleration GFO(n), stable drive of the vehicle is ensured.

The target front-wheel acceleration GFO(n) from the clipping section 226 is supplied to a torque converting section 228, whereupon it is converted into a driving torque of the engine 2. The converted torque is then supplied to an adder 230, in which it is added to a running resistance TR(n) supplied from a running resistance calculation section 232, to obtain a reference driving torque TB(n) for the engine 2.

The following equation collectively represents the operations executed in the converting section 228 and the calculation section 232:

$$TB(n) = GFO(n) \cdot Wb \cdot r + TR$$

where Wb represents the weight of the vehicle body, and r represents the effective radius of the front wheels FW.

Figure 12:
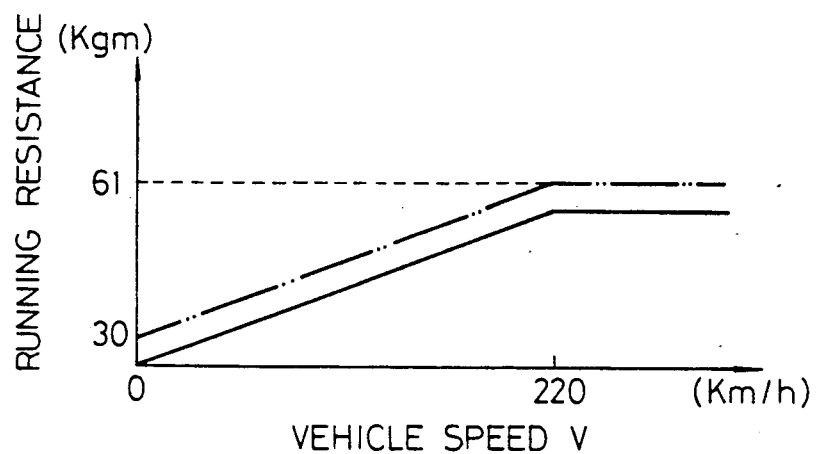
FIG. 12 is a graph showing the relationship between the vehicle speed and running resistance.

The running resistance TR may either be calculated as a function of the vehicle speed V, or read from a map shown in FIG. 12 corresponding to the vehicle speed V. The running resistance varies depending on whether the vehicle is running on a flat road or uphill road. Therefore, a flat-surface running resistance (solid line) and an uphill running resistance (two-dot-chain line) are set in the map of FIG. 12, in association with the vehicle speed V. When reading a running resistance TR from the map of FIG. 12 on the basis of the vehicle speed V, therefore, it is necessary that one of the two running resistance characteristics (indicated by the solid line and the two-dot-chain line) be selected. In this embodiment, a required running resistance characteristic is selected on the basis of the detection signal from a slope sensor (not shown), for example. Although the map of FIG. 12 shows only two running resistance characteristics, one for flat road and the other for uphill road, another running resistance characteristic for a downhill road may further be provided. In this case, the running resistance TR can be set minutely in accordance with the road surface conditions. In the meantime, the reference driving torque TB(n) may be calculated directly based on the speed of the driven wheels or rear wheels RW, i.e., the vehicle speed V.

The target front-wheel acceleration GFO(n) is obtained by correcting the reference front-wheel acceleration GFF(n) by the correction amounts GKF(n) and GKC(n) supplied from the correction sections 220 and 222, as described above. Therefore, when calculating the slippage s, the target front-wheel speed VFO(n) used for the calculation of the reference driving torque may be preferably corrected in a like manner, to obtain a target front-wheel speed VFS(n) for use in the calculation of a correction torque.

Figure 13:
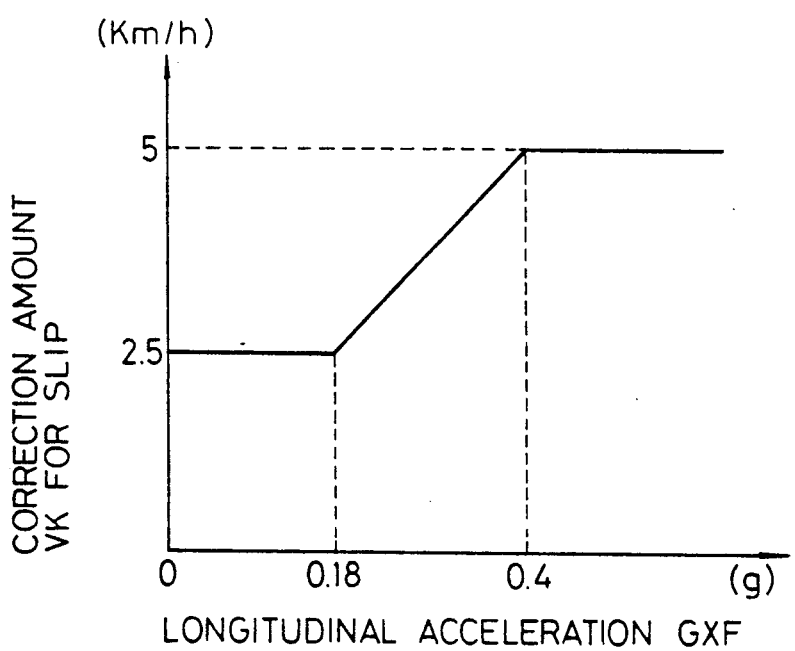
FIG. 13 is a graph showing the correction amount for a slip, applied in accordance with the longitudinal acceleration of the vehicle.

To this end, in this embodiment, the target front-wheel speed VFO(n) is supplied to an adder 234, in addition to the above differentiating section 208, and this adder 234 is also supplied with a slip correction amount VK from the correction section 220. The adder 234 adds together the target front-wheel speed VFO(n) and the correction amount VK, to obtain a target front-wheel speed VFS(n). The correction amount VK is read from a map shown in FIG. 13, in accordance with the longitudinal acceleration GXF(n), and the value thereof is increased with an increase of the longitudinal acceleration GXF(n) when the acceleration GXF(n) falls within a range of 0.18 g to 0.4 g. Accordingly, when the vehicle is accelerating, the target front-wheel speed VFO(n), which is calculated in the adder 234, is increased as the longitudinal acceleration GXF(n) increases. Since the longitudinal acceleration GXF(n) is equivalent to the coefficient of friction between the tires and the road surface in the graph shown in FIG. 9, as mentioned earlier, the slip factor S is set to the target slip factor So, indicated by the solid line in FIG. 9, or to a value close to and smaller than the factor So.

Figure 14:
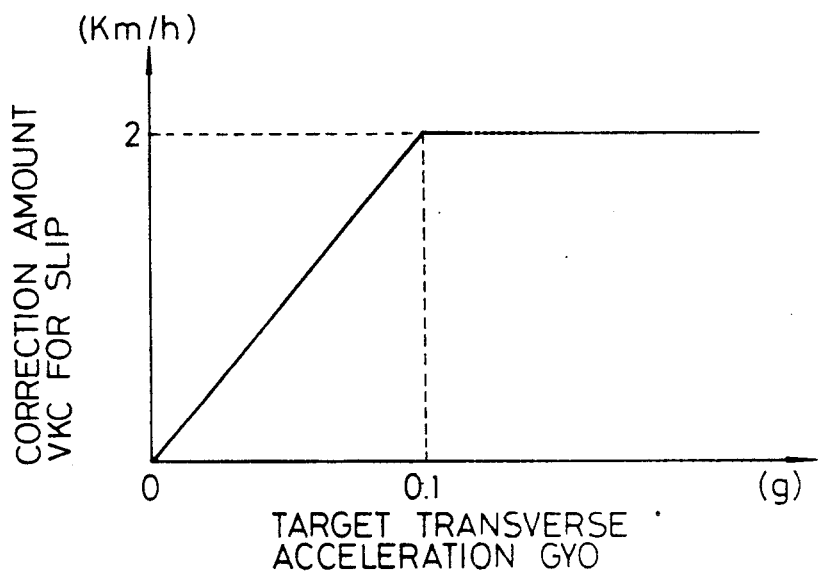
FIG. 14 is a graph showing the correction amount for a slip, applied in accordance with the target transverse acceleration of the vehicle.

In the correction section 222, a slip correction amount VKC corresponding to the target transverse acceleration GYO is read from a map shown in FIG. 14. As seen from FIG. 14, the correction amount VKC is increased as the target transverse acceleration GYO increases until the acceleration GYO reaches 0.1 g. This correction amount VKC is supplied to a subtractor 236, which is also supplied with the target front-wheel speed VFS(n) from the adder 234, whereby the correction amount VKC is subtracted from the target front-wheel speed VFS(n) in the subtracter 236, to obtain a target front-wheel speed VFS(n). Since the target front-wheel speed VFS(n) is calculated in this manner, when the vehicle is turning, the target front-wheel speed VFS(n) is reduced in accordance with the degree of the turning, whereby stable turning of the vehicle is ensured, though the acceleration performance slightly lowers.

During the period between a turning-on of the ignition key and the initiation of learning of the neutral position δM of the steering shaft 158, the value of the neutral position δM, i.e., the rotational angle δH of the steering shaft 158, lacks reliability. Therefore, the value of the aforesaid correction amount VKC is preferably multiplied by 0, so that the correction of the target front-wheel speed VFS(n) by the correction amount VKC may not be executed. According to this embodiment, not only the correction amount VKC but also the correction amount VK are individually multiplied by 0, until the learning of the neutral position δM of the steering shaft 158 is initiated, i.e., until the control flag FH is set, to thereby suspend the corrections of the target front-wheel speed VFS(n) by these correction amounts VKC and VK. After the control flag FH is set, the correction amounts VK and VKC are individually multiplied by 1, and thus the target front-wheel speed VFS(n) is corrected by the correction amounts VK and VKC.

Accordingly, while the control flag FH is set, the target front-wheel speed VFS(n) is subjected to the correction expressed by the following equation in the adder 234 and the subtracter 236:

$$VFS(n) = VFO(n) + VK - VKC.$$

The corrected target front-wheel speed VFS(n) is supplied to a subtracter 238, which is also supplied with an actual front-wheel speed VF(n) at the present point of time from the front-wheel rotation sensor 126, as shown in FIG. 8B. The actual front-wheel speed VF is derived by subjecting the detection signal of the front-wheel rotation sensor 126 to a filtering process to remove noise.

In the subtracter 238, the target front-wheel speed VFS(n) is subtracted from the actual front-wheel speed VF(n) to obtain a slippage s(n).

This slippage s(n) is supplied to a clipping section 240, and when the value of the slippage s(n) is smaller than a predetermined negative value, e.g., −2.5 km/h, it is restricted to a value equal to or larger than −2.5 km/h in the clipping section 240. By thus restricting the slippage s(n), the slippage s is set to a value suited to the actual drive of the vehicle, and thus the driving torque of the engine 2 can be properly controlled.

The slippage s(n) from the clipping section 240 is then supplied to a multiplier 242 for proportional control, whereupon the slippage s is multiplied by a proportional coefficient KP to thereby calculate a torque correction amount by means of a basic proportional control. This correction amount is supplied to a multiplier 244, in which it is multiplied by a correction coefficient ρKP to obtain a proportional correction torque TP(n). The correction coefficient ρKP is preset in accordance with speed reduction ratios (ρm) of the automatic transmission 6.

The slippage s(n) derived through the clipping section 240 is also supplied to a differentiating section 246, whereupon a rate GS(n) of change in the slippage s(n) is calculated. The rate of change, GS(n), is multiplied by a correction coefficient KD in a multiplier 248, to thereby obtain a basic correction amount for derivative control with respect to the change of the slippage s(n). This correction amount is further multiplied by a correction coefficient ρKD in a multiplier 250, to obtain a derivative correction torque TD(n). The correction coefficient ρKD is preset in accordance with the speed reduction ratios (ρm) of the automatic transmission 6.

The derivative correction torque TD(n) is supplied to a clipping section 252, which has the function of restricting the value of the derivative correction torque TD(n) to within a range between upper and lower limits thereof. The upper and lower limits are set, e.g., to 55 kgm and −55 kgm, respectively.

While the vehicle is running, the rate GS(n) of change may be suddenly varied due to a momentary free rotation or locking occurring in the wheel speeds VF, VRL and VRR, depending on the road surface conditions or running conditions, so that the derivative correction torque TD(n) takes an extraordinary positive or negative value. Nevertheless, since the derivative correction torque TD(n) is restricted by the aforesaid clipping section 252 to within the range defined by the upper and lower limits, the value of the derivative correction torque TD(n) never becomes extraordinary and always takes a proper value.

Figure 15:
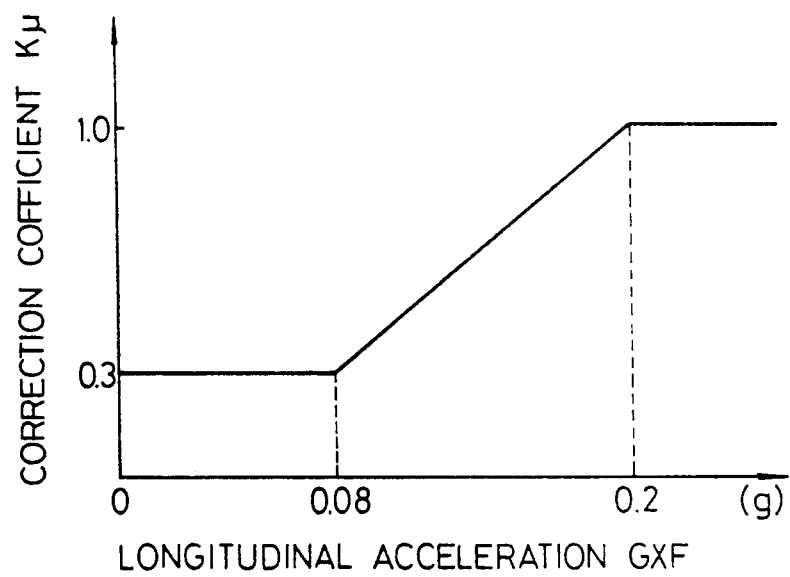
FIG. 15 is a graph showing a correction factor applied in accordance with the longitudinal acceleration of the vehicle, taking the friction coefficient of the road surface into account.

The derivative correction torque TD(n) obtained through the clipping section 252 and the aforesaid proportional correction torque TP(n) are both supplied to an adder 254 and added together therein to obtain a proportional-derivative correction torque TPD(n). The correction torque TPD(n) is supplied to a multiplier 256, whereupon it is multiplied by a slip correction coefficient Kμ to obtain a final proportional-derivative correction torque TPD(n). The correction coefficient Kμ is read from a map shown in FIG. 15, in accordance with the longitudinal acceleration GXF(n). The value of the correction coefficient Kμ is increased as the longitudinal acceleration GXF(n) rises, as long as the value of the acceleration GXF(n) is within a range of 0.08 g to 0.2 g. Accordingly, when the vehicle is traveling on a slippery road such as a frozen road, namely, when the longitudinal acceleration GXF(n) is small, the correction torque TPD(n) is set to a small value by correction, and is never set to an excessively large value.

Since the longitudinal acceleration GXF(n) represents the friction coefficient of a road surface on which the vehicle is running, multiplying the correction torque TPD(n) by the correction coefficient Kμ is comparable to restricting the correction torque TPD(n) in accordance with the friction coefficient of the road surface.

The slippage s(n) from the subtracter 238 is supplied to an integrating section 258, in addition to the clipping section 240, whereupon a constant value ΔTI representing a minute correction torque is added to or subtracted from the integral correction torque TI(n) obtained by the preceding process, depending on whether the sign of the value s(n) is positive or negative, at the sampling period (15 msec) of the main timer. Specifically, when the value of the slippage s(n) is positive, the constant value ΔTI is added to the integral correction torque TI(n−1), and when the value s(n) is negative, the constant value ΔTI is subtracted from the integral correction torque TI(n−1), whereby the integral correction torque TI(n) can be calculated corresponding to even a moderate change of the slippage s(n). The integral correction torque TI can of course be calculated by directly integrating the slippage s(n).

In the integrating section 258, a clipping of the correction amount is also simultaneously affected. Specifically, in the case wherein the time during which the actual front-wheel speed VF(n) is higher than the target front-wheel speed VFS(n) is longer than the time during which the latter is higher than the former, i.e., the time during which the value of the slippage s(n) is positive is longer than the time during which the value s(n) is negative, the acceleration performance of the vehicle is dominant. Accordingly, 0 kgm and −100 kgm, for example, are set as the upper and lower limits of the integral correction torque TI(n), respectively. The convergence of the slip control can be improved by clipping the integral correction torque TI(n) in this manner.

Figures 16, 17:
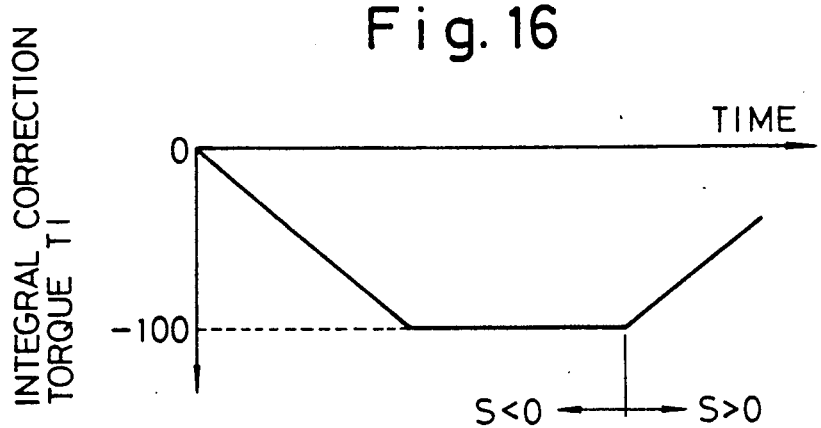
FIG. 16 is a graph showing a change of an integral correction torque with time.
FIG. 17 is a map showing correction factors for proportional control, differential control and integral control, in association with gear ratios of an automatic transmission.

The integral correction torque TI subjected to the above clipping process varies, for example, in a manner shown in FIG. 16.

The integral correction torque TI(n) is then supplied to a multiplier 260, whereupon it is multiplied by a correction coefficient ρKI. This correction coefficient ρKI is preset in accordance with the speed reduction ratios (ρm) of the automatic transmission 6.

The aforementioned correction coefficients ρKP, ρKD and ρKI may in practice be read from a map shown in FIG. 17.

The integral correction torque TI(n) and the proportional-derivative correction torque TPD(n) are supplied to an adder 262, in which the correction torques TI(n) and TPD(n) are summed up to obtain a final correction torque TPID(n).

The correction torque TPID(n) is then supplied to a subtracter 264, which is also supplied with the reference correction torque TB(n) from the aforesaid adder 230 of FIG. 8A. The substracter 264 subtracts the correction torque TPID(n) from the reference correction torque TB(n), and supplies the result to a multiplier 266. in the multiplier 266, the output of the substracter 264 is multiplier by a reciprocal of the sum total of the speed reduction ratios between the engine 2 and the axle of the front wheels FWL and FWR, to obtain a first target torque TOS(n) for the slip control.

The first target torque TOS(n) can be expressed by the following expression, which collectively represents the operations executed in the substracter 264 and the multiplier 266;

$$TOS(n) = (TB(n) - TPID(n))/(\rho m \cdot \rho d) \quad (7)$$

where ρd represents the reduction ratio of the differential gearing.

With regards the speed reduction ratio ρm of the automatic transmission 6 used in equation (7), when an upshift operation is being effected in the automatic transmission 6, the upshifted reduction ratio ρm is employed. If, during an upshift operation of the transmission 6, the first target torque TOS(n) is calculated by using the previous reduction ratio ρm in equation (7), the value of the target torque TOS(n) sharply increases during the shifting. Such a sudden increase of the first target torque TOS(n) is unfavorable because it causes an unwanted rise in the engine rotation.

Accordingly, in this embodiment, the previous reduction ratio ρm is employed to calculate the first target torque TOS(n) during the time which is required for the automatic transmission 6 to complete an upshift operation after it receives a shifting command signal, e.g., 1.5 sec. When 1.5 sec have passed, the upshift operation is already complete, and accordingly, the first target torque TOS(n) is calculated by using the upshifted reduction ratio ρm. For a downshift operation of the automatic transmission 6, on the other hand, the downshifted reduction ratio ρm is employed at the time when the automatic transmission 6 is supplied with a downshift command signal, to calculate the first target torque TOS(n).

In the above embodiment, although the final correction torque TPID(n) is obtained by adding the integral correction torque TI(n) to the product of the proportional-derivative correction torque TPD(n) and the correction coefficient $K\mu$, the calculation of the correction torque TPID(n) is not limited to the above-described procedure. For example, the final correction torque TPID(n) may be calculated by first adding up the correction torques TP(n), TD(n) and TI(n), and then multiplying the resulting sum by the correction coefficient $K\mu$.

The first target torque TOS(n) naturally takes a positive value. Nevertheless, in this embodiment, the first target torque TOS(n) obtained according to equation (7) is supplied to the clipping section 268, in which the torque TOS(n) is restricted to a value equal to or larger than 0 kgm.

The first target torque TOS(n) is then supplied to a discriminating section 270 for discriminating the start/end of the slip control, and the result of the discrimination by the section 270 is supplied to the ECU 12 as the first target torque TOS.

When conditions (a) through (e) mentioned later are all satisfied, it is determined in the discriminating section 270 that the slip control should be initiated. In this case, the aforementioned control flag FS is set and the changeover switch 204 is connected to the low-speed select section 204. Then, the first target torque TOS is calculated, and is supplied to the ECU 12. This state is maintained until conditions for terminating the slip control, mentioned later, are fulfilled.

SLIP CONTROL INITIATING CONDITIONS (a) The manual switch 156 is on, and thus the execution of the slip control is needed by the driver.

(b) The driving torque Td required by the driver is equal to or larger than the minimum driving torque required to drive the vehicle, e.g., 4 kgm. In this embodiment, the driving torque Td is read from a map shown in FIG. 18, on the basis of the engine rotation speed NE, obtained from the detection signal of the crank angle sensor 120, and the accelerator opening $\theta A$, obtained from the detection signal of the accelerator opening sensor 146.

(c) The slippage s is 2 km/h or more.

(d) The rate GS of change of the slippage s is 0.2 g or more.

(e) The actual front-wheel acceleration GF obtained from the actual front-wheel speed VF is 0.2 g or more. The actual front-wheel acceleration GF is obtained by subjecting the actual front-wheel speed VF to a time-based differentiation in the differentiating section 272, as seen from the block diagram of FIG. 8B, and the obtained acceleration GF is supplied to the discriminating section 270.

When either of conditions (f) and (g) mentioned later is satisfied after the slip control is once started, the discriminating section 270 terminates the execution of the slip control. In this case, the control flag FS is reset, the supply of the first target torque TOS from the TCL 142 to the ECU 12 is interrupted, and the changeover switch 204 is connected to the high-speed select section 202.

SLIP CONTROL TERMINATING CONDITIONS (f) The first target torque TOS(n) is equal to or larger than the driving torque Td, and at the same time the slippage s is maintained at a constant value equal to or smaller than $-0.2$ km/h for more than a predetermined time, e.g., 0.5 sec.

(g) The state in which the idle switch 124 remains on, i.e., the driver leaves the accelerator pedal 54 released, continues for more than a predetermined time, e.g., 0.5 sec.

Figure 19:
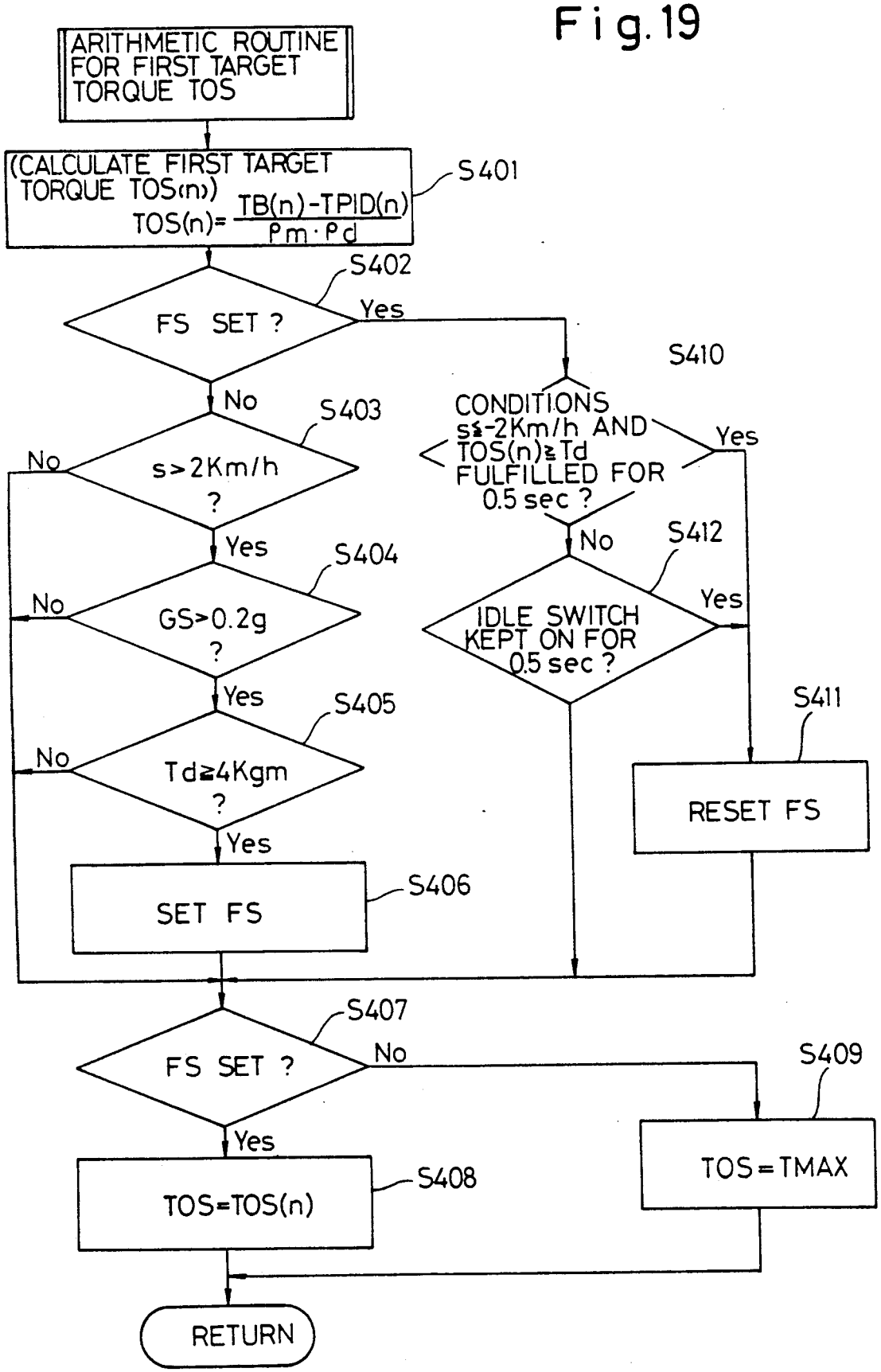
FIG. 19 is a flowchart showing an arithmetic routine for the first target torque.

The function of the aforementioned discriminating section 270 is specifically shown in the flowchart of FIG. 19 illustrating the arithmetic routine for the first target torque TOS. The following is a description of the arithmetic routine.

ARITHMETIC ROUTINE FOR FIRST TARGET TORQUE TOS

First, in Step S401, a first target torque TOS(n) is calculated in the manner described with reference to the block diagrams of FIGS. 8A and 8B. Step S401 is executed regardless of whether the aforesaid manual switch 156 is on or off.

When the first target torque TOS(n) is calculated in Step S401, the processes of Step S402 and the subsequent steps are executed on condition that the manual switch 156 (see FIG. 2) is on. Thus, the manual switch 156 is a switch for manually starting the slip control.

When the program proceeds to Step S401 on the assumption that the manual switch 156 is on, it is determined whether or not the control flag FS is set. Since the control flag FS is not set up in this case, the result of determination in Step S402 is NO, whereupon the program proceeds to Step S403.

In Step S403, it is determined whether or not the slippage s of the front wheels FW is greater than a preset threshold value, e.g., 2 km/h. If YES in Step S403, it is determined in Step S404 whether or not the rate GS of change of the slippage s is greater than 0.2 g. If the result in Step S404 is YES, it is further determined in Step S405 whether or not the driving torque Td required by the driver is greater than the minimum driving torque required for driving the vehicle, i.e., 4 kgm. In other words, in Step S405, it is determined whether or not the driver intends to move the vehicle.

If the result of determination in Step S405 is YES, the control flag FS is set in Step S406.

In Step S407, it is determined whether or not the control flag FS is set, as in the case of Step S402. If YES in Step S407, the first target torque TOS(n) calculated in Step S401 is set as the first target torque TOS, in Step S408.

If the result of determination in Step S407 is NO, the program proceeds to Step S409, whereupon a maximum driving torque TMAX of the engine 2 is set as the first target torque TOS.

When the maximum torque TMAX of the engine 2 is supplied, as the first target torque, TOS, from the TCL 142 to the ECU 12, the ECU 12 lowers the respective duty factors of the first and second solenoid values 90 and 104 to predetermined values on the 0% side. In this case, the engine 2 can produce a driving torque corresponding to the depth of depression of the accelerator pedal 54 by the driver.

If the result of determination in Step S403, S404 or S405 is NO, that is if the slippage s is smaller than 2 km/h, or the rate GS of change of the slippage s is lower than 0.2 g, or if the driving torque Td is smaller than 4 km/h, the program proceeds to Step S409 via Step S407, whereupon the maximum driving torque TMAX of the engine 2 is set as the first target torque TOS.

If the result of determination in Step S402 becomes YES as the arithmetic routine of Step S40 is repeatedly executed, that is, after Step S406 is already executed, the program proceeds from Step S402 to Step S410. In Step S410, it is determined whether or not the slippage s of the front wheels FW has a value equal to or smaller than $-2$ km/h and at the same time the driving torque Td remains at a level equal to or lower than the first target torque TOS(n) for more than 0.5 sec. Namely, in Step S410, it is determined whether or not acceleration of the vehicle is needed by the driver.

If the result of determination in Step S410 is YES, that is, if the driver needs no vehicle acceleration, then the control flag FS is reset in Step S411, followed by the execution of Step S407. In this case, the flow proceeds from Step S407 to Step S409, whereupon the maximum driving torque TMAX of the engine 2 is set as the first target torque TOS.

If the result of determination in Step S410 is NO, that is, if acceleration of the vehicle is needed by the driver, Step S412 is executed. In Step S412, it is determined whether or not an on-state of the idle switch 124, i.e., a fully-closed state of the throttle valve 22, has continued for more than 0.5 sec. If YES in Step S412, then it indicates that the accelerator pedaL 54 is not depressed, and thus the control flag FS is reset in Step S411. If the result of determination in Step S412 is NO, that is, if the accelerator pedal 54 is depressed by the driver, the program proceeds directly to Step S407.

Figure 20:
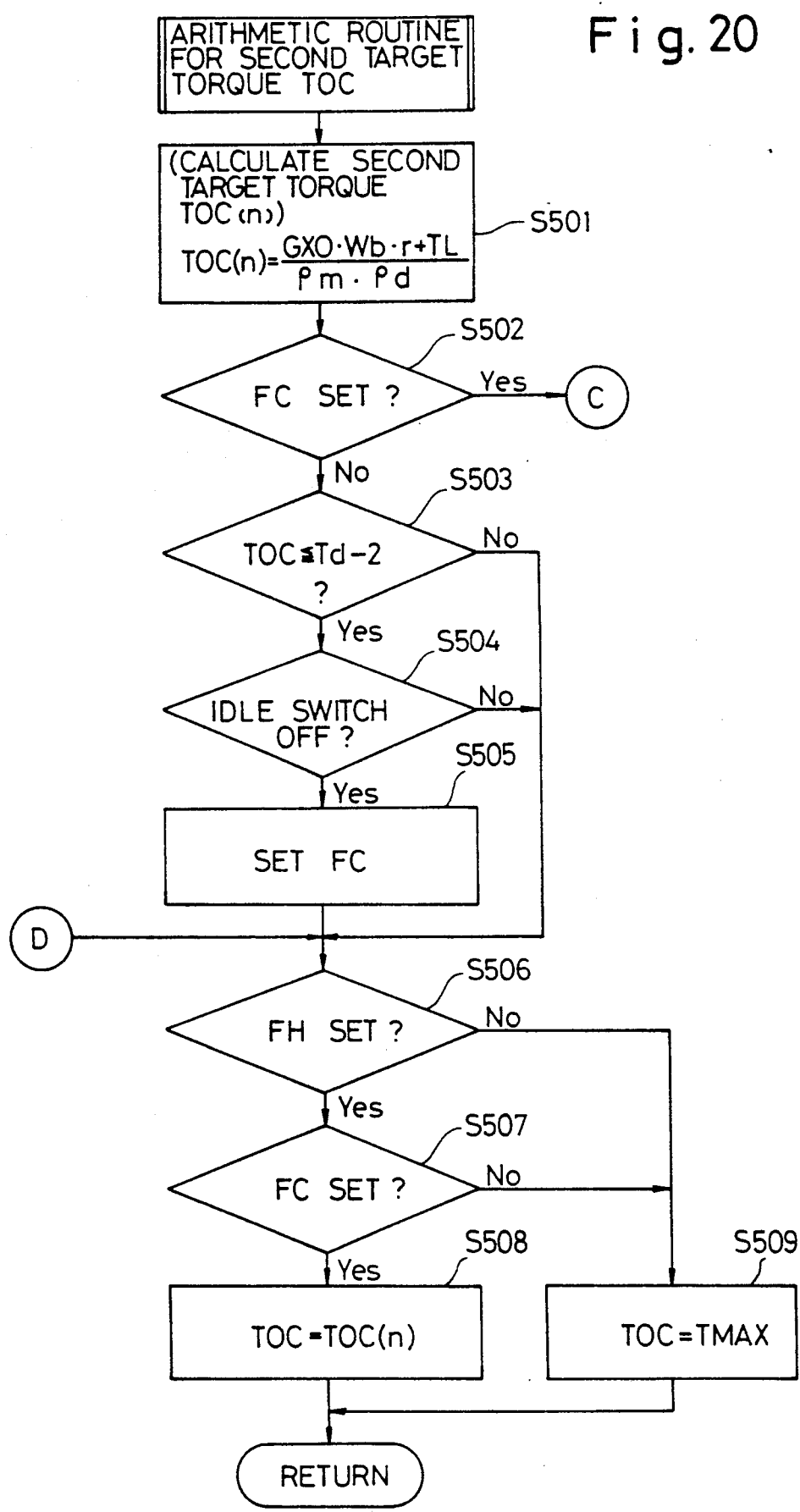
FIGS. 20 and 21 are flowcharts showing an arithmetic routine for a second target torque.
Figure 21:
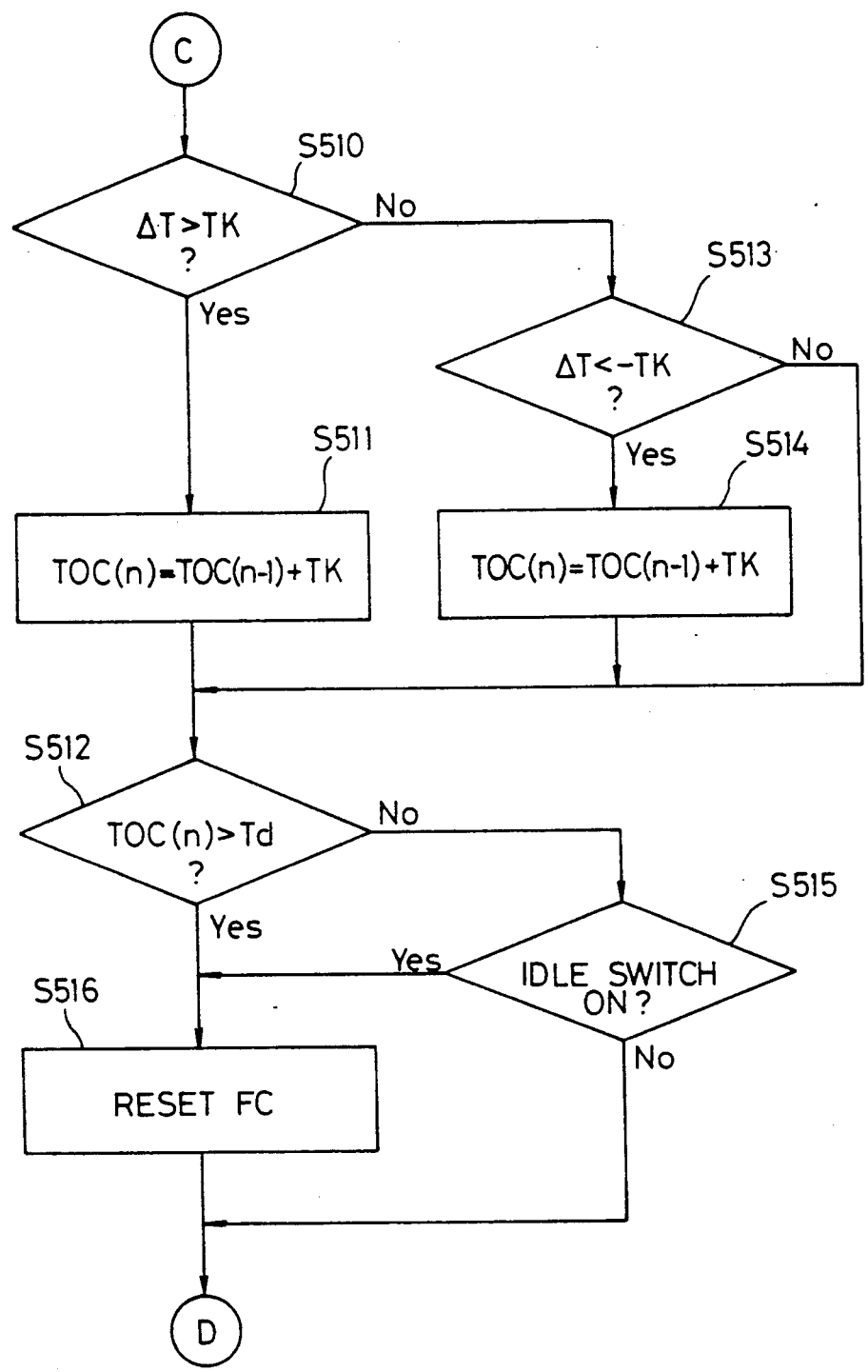

When the program returns to the main control routine of FIG. 5 after the execution of the above arithmetic routine for the first target torque TOS, an arithmetic routine for the first target torque TOS, an arithmetic routine for the second target torque TOC, which is used for the aforementioned turning control, is then executed. FIGS. 20 and 21 show the details of this arithmetic routine. Referring now to FIGS. 20 and 21, the arithmetic routine for the second target torque TOC will be described.

ARITHMETIC ROUTINE FOR SECOND TARGET TORQUE TOC

In this arithmetic routine, first, a second target torque TOC(n) for the present point of time is calculated. To explain an outline of the procedure of calculation of the second target torque TOC(n), a target transverse or lateral acceleration GYO of the vehicle is first calculated on the basis of the rotational angle $\delta H$ of the steering shaft 158 and the vehicle speed V, and then a target longitudinal acceleration GXO of the vehicle is calculated on the basis of the thus-obtained transverse acceleration GYO. The target longitudinal acceleration GXO is set such that the characteristics of the vehicle do not become extremely understeering. After the target longitudinal acceleration GXO is calculated in this manner, a second target torque TOC(n) of the engine 2 corresponding to this target longitudinal acceleration GXO is calculated.

The target transverse acceleration GYO may be estimated from the actual transverse acceleration GY which is calculated based on the aforementioned rear-wheel speed difference $|VRL-VRR|$. In the case of this embodiment, however, the responsiveness of the turning control can be improved by calculating or estimating the target transverse acceleration GYO in accordance with the rotational angle $\delta H$ of the steering shaft 158.

The actual transverse acceleration GY, which is calculated on the basis of the rear-wheel speed difference, can be derived by the following equation.

$$GY=(|VRL-VRR|\cdot V)/3.6^2 \cdot b \cdot g).$$

When the rate of change of the second target torque TOC(n) calculated at the sampling period of the main timer, i.e., 15 msec, is very large, an acceleration or deceleration shock occurs, making the vehicle ride uncomfortable. Accordingly, when the rate of change of the second target torque TOC(n) is so large that the riding feeling is spoiled, it is necessary that the increment or decrement of the second target torque TOC(n) be regulated.

In this embodiment, therefore, the second target torque TOC is calculated in consideration of the above. Namely, in Step S501 of FIG. 20 for calculating the second target torque TOC(n) for the present point of time, the torque TOC(c) is calculated in accordance with the procedure shown in the block diagram of FIG. 22. The following is a description of this block diagram.

First, a vehicle speed V is calculated based on the detection signals from the rear-wheel rotation sensors 148 and 150 and according to the aforesaid equation (1), and a steering angle $\delta$ of the front wheels FW is calculated based on the detection signal from the steering angle sensor 152 and according to equation (2). Based on the calculated vehicle speed V and steering angle $\delta$, a target transverse acceleration GYO is calculated in accordance with the aforementioned equation (3).

Figure 23:
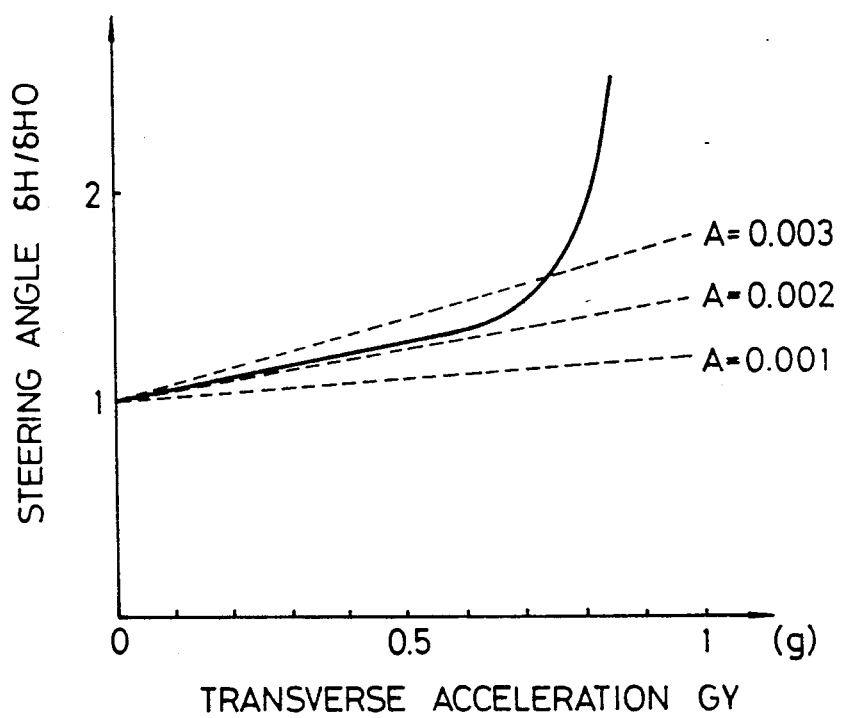
FIG. 23 is a graph showing the relationship between the transverse acceleration acting on the vehicle and the steering angle ratio.

As is generally known, the stability factor A in equation (3) is a value which depends on the construction of the suspension system of the vehicle, the characteristics of the tires, the road surface conditions, etc., and can be obtained from the characteristic curve of FIG. 23. FIG. 23 shows the relationship between the actual transverse acceleration GY acting on the vehicle and the steering angle ratio $\delta H/\delta HO$ when the vehicle is making a steady-state circular turning. Symbol $\delta HO$ indicates the rotational angle of the steering shaft 158, with respect to its neutral position $\delta M$, obtained when the vehicle is in a very-low-speed run such that the actual transverse acceleration GY is nearly zero, and $\delta H/\delta HO$ indicates the ratio of the rotational angle $\delta H$ of the steering shaft 158 at vehicle acceleration to the rotational angle $\delta HO$.

The stability factor A can be specifically given as an inclination of a tangent which touches the characteristic of FIG. 23 at a point determined by the value of the actual transverse acceleration GY. As seen from the characteristic curve of FIG. 23, in the region where the vehicle speed V is not very high and the actual transverse acceleration GY is small, the stability factor A takes a substantially constant value, e.g., $A=0.002$. In the region where the actual transverse acceleration GY exceeds 0.6 g, the stability factor A increases drastically, and thus the turning characteristic of the vehicle exhibits extreme understeering.

Accordingly, when the target transverse acceleration GYO is calculated the stability factor A must be set to a constant value, e.g., $A=0.002$, and the driving torque of the engine 2 must be controlled such that the target transverse acceleration GYO calculated according to equation (3) is smaller than 0.6 g.

When the road on which the vehicle is running is a slippery road such as a frozen road, the stability factor A is set to 0.005 or thereabouts, for example.

Figure 24:
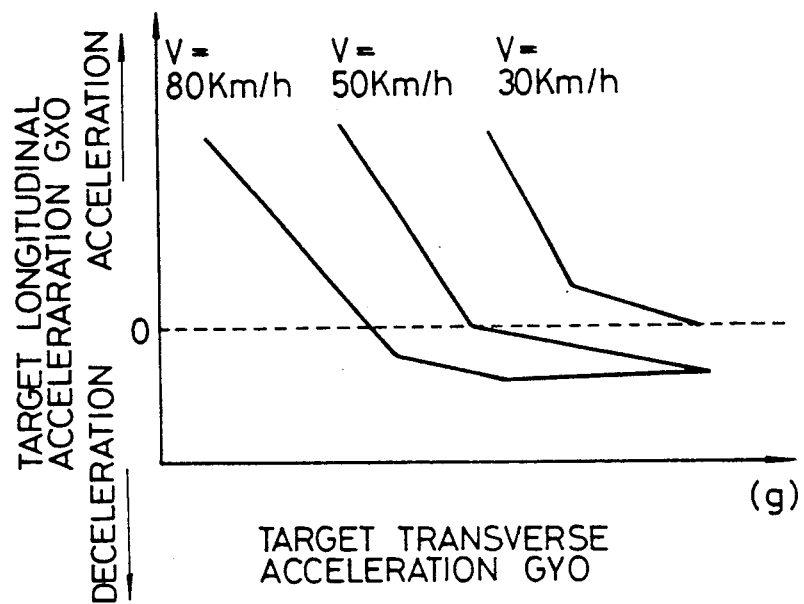
FIG. 24 is a graph showing the relationship between the target transverse acceleration and target longitudinal acceleration of the vehicle, in relation to vehicle speeds.

After the target transverse acceleration GYO is calculated, a target longitudinal acceleration GXO is read from a map shown in FIG. 24, in accordance with the calculated target transverse acceleration GYO. The map of FIG. 24 is previously stored in a memory of the TCL 142, and contains data on the target longitudinal acceleration GXO in association with the target transverse acceleration GYO and the vehicle speed V.

Figure 25:
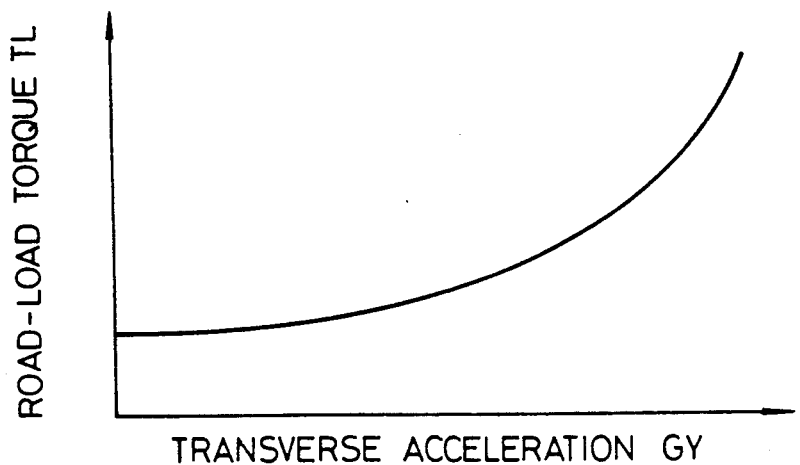
FIG. 25 is a graph showing the relationship between the transverse acceleration acting on the vehicle and road-load torque.

Then, based on the target longitudinal acceleration GXO thus obtained, a second target torque TOC(n) of the engine 2 for the present point of time is calculated according to the following equation:

$$TOC(n) = (GXO \cdot Wb \cdot r + TL)/(\rho m \cdot \rho d) \qquad (8)$$

where TL represents the road-load torque obtained from a map shown in FIG. 25 in accordance with the actual transverse acceleration GY.

Now referring to FIG. 20 showing the arithmetic routine for the second target torque TOC, in Step S501, a second target torque TOC(n) for the present point of time is calculated, as explained with reference to the block diagram of FIG. 19. Step S501 is executed regardless of whether the aforesaid manual switch 156 is on or off.

Step S502 and its subsequent steps are executed on condition that the manual switch 156 is on.

First, in Step S502, it is determined whether or not the control flag FC is set. The control flag FC is a flag which indicates whether or not the vehicle is under turning control. If the arithmetic routine of FIG. 20 is executed for the first time, the control flag FC is not set yet, and thus the result of determination in Step S502 is NO, whereupon the program proceeds to Step S503. In Step S503, it is determined whether or not the second target torque TOC(n) has a value equal to or smaller than a preset threshold value, e.g., (Td−2). As mentioned before, Td is the required driving torque of the engine 2. The process of Step S503 is required for the following reason. The second target torque TOC(n) for the turning control can be calculated even while the vehicle is advancing straight. Usually, however, the second target torque TOC(n) for this case is much greater than the required driving torque Td, and the required driving torque Td is generally small while the vehicle is turning. Accordingly, in this embodiment, the time at which the second target torque TOC(n) becomes lower than the threshold value (Td−2) is used as the starting time for the turning control. The value (Td−2), not Td, is set as the threshold value because the difference between Td and (Td−2) functions as a hysteresis for preventing hunting at the start of the turning control.

If the result of determination in Step S503 is YES, it is then determined in Step S504 whether or not the idle switch 124 is off. If YES in Step S504, that is, if the accelerator pedal 54 is depressed, the control flag FC is set in Step S505, whereupon the program proceeds to Step S506. In Step S506, it is determined whether or not the aforesaid control flag FH is set. Since the control flag FH indicates whether or not the learning correction of the neutral position δM of the steering shaft 158 is already executed, as described in connection with the learning routine of FIGS. 6 and 7, the reliability of the value of the steering angle δ obtained based on the detection signal from the steering angle sensor 152 can be determined by executing Step S506.

If the result of determination in Step S506 is YES, it is determined again in Step S507 whether or not the control flag FC is set. In this case, the control flag FC is already set in Step S505, that is, the result of determination in Step S507 is YES, and thus the program proceeds to Step S508. In Step S508, the second target torque TOC(n) already calculated in Step S501 is set directly as the second target torque TOC.

If the result of determination in Step S506 is NO, on the other hand, the value of the steering angle δ of the front wheels FW calculated according to equation (2) can be determined to be unreliable, and thus the value of the second target torque TOC(n), which is calculated according to equation (8) based on the steering angle δ, is also unreliable. In this case, therefore, the program proceeds to Step S509, whereupon the maximum driving torque TMAX of the engine 2 is set as the second target torque TOC. Also in this case, when the second target torque TOC adjusted to the maximum driving torque TMAX is supplied from the TCL 142 to the ECU 12, the ECU 12 sets the respective duty factors of the first and second solenoid valves 90 and 104 at predetermined values on the 0% side. Thus, the driving torque of the engine 2 depends on the depth of depression of the accelerator pedal 54 by the driver.

If the result of determination in Step S503 is NO, the program proceeds directly to Step S506, skipping Steps S504 and S505. In this case, the result of determination in Step S506 or S507 is NO, and thus the program proceeds to Step S509. If the result of determination in Step S504 is NO, the program also proceeds to Step S509 via Step S506 or S507, and accordingly, the engine 2 produces a driving torque corresponding to the depth of depression of the accelerator pedal 54 and the turning control is not affected.

When the arithmetic routine of FIG. 20 is repeatedly executed after Step S505 is executed, the result of determination in Step S502 is YES, in which case the program proceeds to Step S510 shown in FIG. 21, whereupon Step S510 and its subsequent steps are executed. In Step S510, it is determined whether or not a torque deviation ΔT1 is greater than a preset allowable value TK. The torque deviation ΔT1 is a deviation between the second target torque TOC(n) calculated this time and a second target torque TOC(n−1) calculated in the preceding cycle. The allowable value TK represents the maximum variation of the driving torque of the engine 2 that cannot give an acceleration or deceleration shock to the occupants of the vehicle. If the target longitudinal acceleration GXO of the vehicle is to be restricted to 0.1 g/s, for example, the allowable value TK can be calculated according to the following equation based on equation (8).

$$TK = 0.1 \cdot (Wb \cdot r) \cdot \Delta t /(\rho m \cdot \rho d).$$

If the result of determination in Step S510 is YES, the second target torque TOC(n) calculated this time is recalculated according to the following equation in Step S511, whereupon the program proceeds to Step S512.

$$TOC(n) = TOC(n-1) + TK.$$

If the result of determination in Step S510 is NO, on the other hand, the program proceeds to Step S513, whereupon it is determined whether or not the torque deviation ΔT1 is smaller than a negative allowable value −TK. If YES in Step S513, the second target torque TOC(n) calculated this time is recalculated according to the following equation in Step S514, whereupon the program proceeds to Step S512.

$$TOC(n) = TOC(n-1) - TK.$$

If both the results of determination in Steps S510 and S513 are NO, that is, if the absolute value |ΔT1| of the torque deviation ΔT1 is smaller than the allowable value TK, the program proceeds directly to Step S512, skipping Steps S511 and S514.

Therefore, if the torque deviation ΔT1 exceeds the allowable value TK, the second target torque TOC(n) calculated this time is restricted to a value obtained by adding the allowable value TK to the preceding second target torque TOC(n−1). Thus, the acceleration shock of the vehicle accompanying an increase of the driving torque of the engine 2 can be reduced. Moreover, when the torque deviation ΔT1 is smaller than the allowable value −TK, the second target torque TOC(n) calculated this time is restricted to a value obtained by subtracting the allowable value TK from the preceding second target torque TOC(n−1), whereby the deceleration shock of the vehicle accompanying a reduction of the driving torque of the engine 2 can be also reduced. If the absolute value of the torque deviation ΔT1 is smaller than the allowable value TK, the second target torque TOC(n) calculated in Step S501 is delivered to the subsequent steps.

In Step S512, it is determined whether or not the second target torque TOC(n) is greater than the required driving torque Td. If the control flag FC is set at this point of time, the second target torque TOC(n) cannot be greater than the required driving torque Td, as is evident from the foregoing description. Thus, the result of determination in Step S512 is NO, whereupon the program proceeds to Step S515. In Step S515, it is determined whether or not the idle switch 124 is on. If the result of determination in Step S515 is NO, it is concluded that the turning control is required, whereupon the program proceeds to the aforesaid Step S506.

If the result of determination in Step S512 is YES, that is, if the second target torque TOC(n) is greater than the required driving torque Td, it can be concluded that the turning of the vehicle is finished. In this case, the control flag FC is reset in Step S516, whereupon the program proceeds to Step S506. If the result of determination in Step S515 is YES, that is, if the accelerator pedal 54 is not depressed, the control flag FC is also reset in Step S516, and the program then proceeds to Step S506.

If Step S506 and its subsequent steps are executed after the control flag FC is reset in Step S516, Step S509 never fails to be executed, and therefore, the engine 2 produces a driving torque corresponding to the depth of depression of the accelerator pedal 54.

After the arithmetic routine for the second target torque TOC shown in FIGS. 20 and 21 is executed, the program returns to the main control routine of FIG. 5, whereupon a select routine for the final target torque TO is executed in Step S60. Basically, in this routine, one of the first and second target torques TOS and TOC obtained previously is selected as the final target driving torque TO. To ensure the stability of the vehicle running, in this case, the smaller of the first and second target torques TOS and TOC is preferably selected as the target driving torque TO with priority. In general, the first target torque TOS for the slip control is always smaller than the second target torque TOC for the turning control. Therefore, when selecting the target driving torque TO, the slip control and the turning control are checked for start in the order named, that is, their control flags are checked in that order. The target torque for the control, whose start is discriminated, is selected as the final target driving torque TO.

Figure 26:
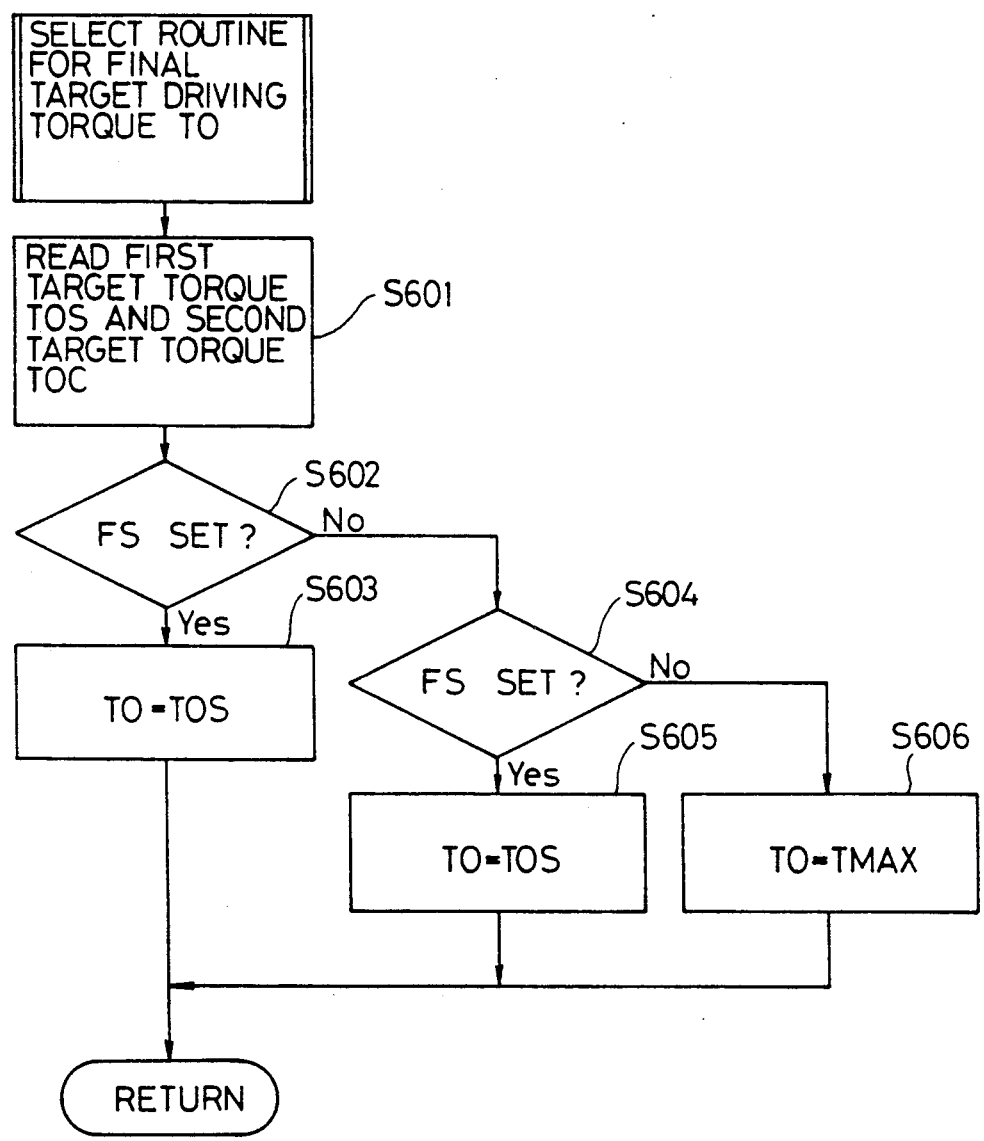
FIG. 26 is a flowchart showing a selection routine for the target driving torque.

The select routine for the final target driving torque TO is specifically shown in FIG. 26. Referring now to FIG. 26, therefore, the select routine will be described.

SELECT ROUTINE FOR TARGET DRIVING TORQUE TO

First, in Step S601, the first and second target torques TOS and TOC are read individually. It is then determined in Step S602 whether or not the control flag FS is set. If the result of determination in Step S602 is YES, the first target torque TOS is selected as the target driving torque TO in Step S603.

If the result of determination in Step S602 is NO, it is then determined in Step S604 whether or not the control flag FC is set. If YES in Step S604, the second target torque TOC is selected as the target driving torque TO in Step S605.

If the result of determination in Step S604 is NO, the maximum driving torque TMAX of the engine 2 is selected as the target driving torque TO in Step S606.

After the final target driving torque TO is selected in the select routine of FIG. 26, the program returns to the main control routine of FIG. 5, whereupon a retardation select routine for the ignition timing is executed.

In this routine, the rate of retardation for the aforementioned basic retard amount PB, i.e., retard level, is selected. There are provided, for example, three retard levels; level I for setting the retard amount to 0, level II for setting the retard amount to ⅔ of the basic retard amount PB, and level III for setting the retard amount to the basic retard amount PB. Basically, the retard amount is selected such that it is increased as the rate GS of change of the slippage s increases. By setting the retard level in this manner, even when the output of the engine 2 is reduced in accordance with the final target torque TO and this output reduction fails to keep up with the running state of the vehicle, the output of the engine 2, and thus the driving torque, can be promptly reduced. The reduction of the engine output is delayed, for example, when the vehicle is suddenly started from a standstill or the read abruptly changes from an ordinary dry road into a frozen road.

Figure 27:
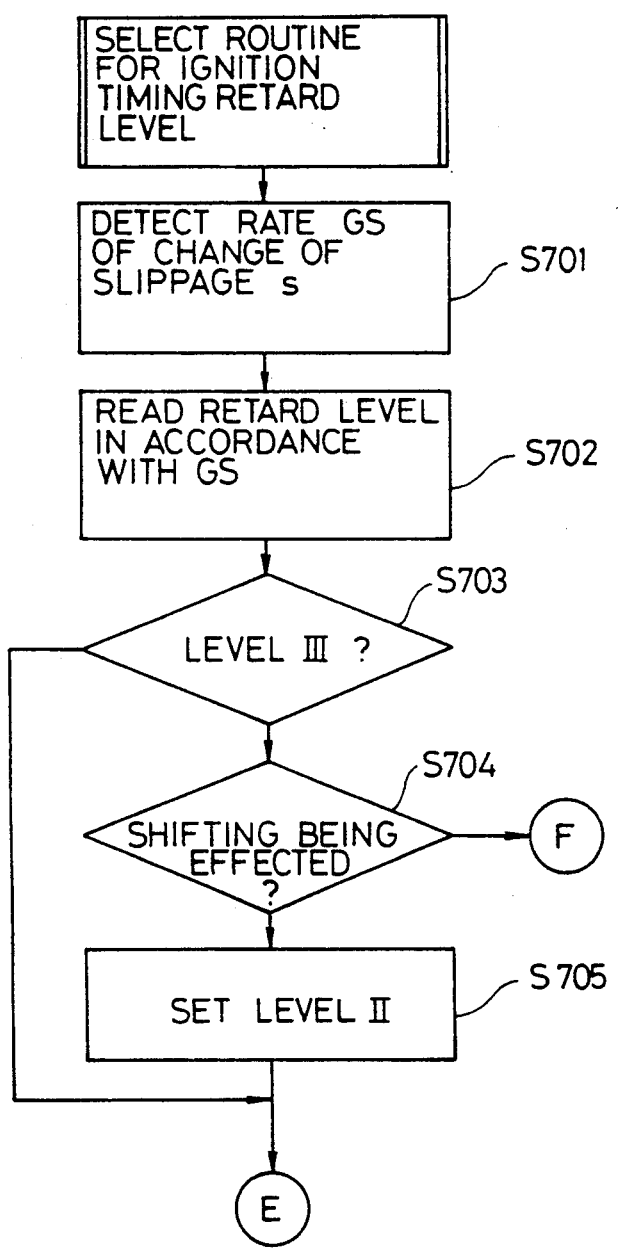
FIGS. 27 to 29 are flowcharts illustrating a selection routine for a retard level associated with ignition timing.
Figure 28:
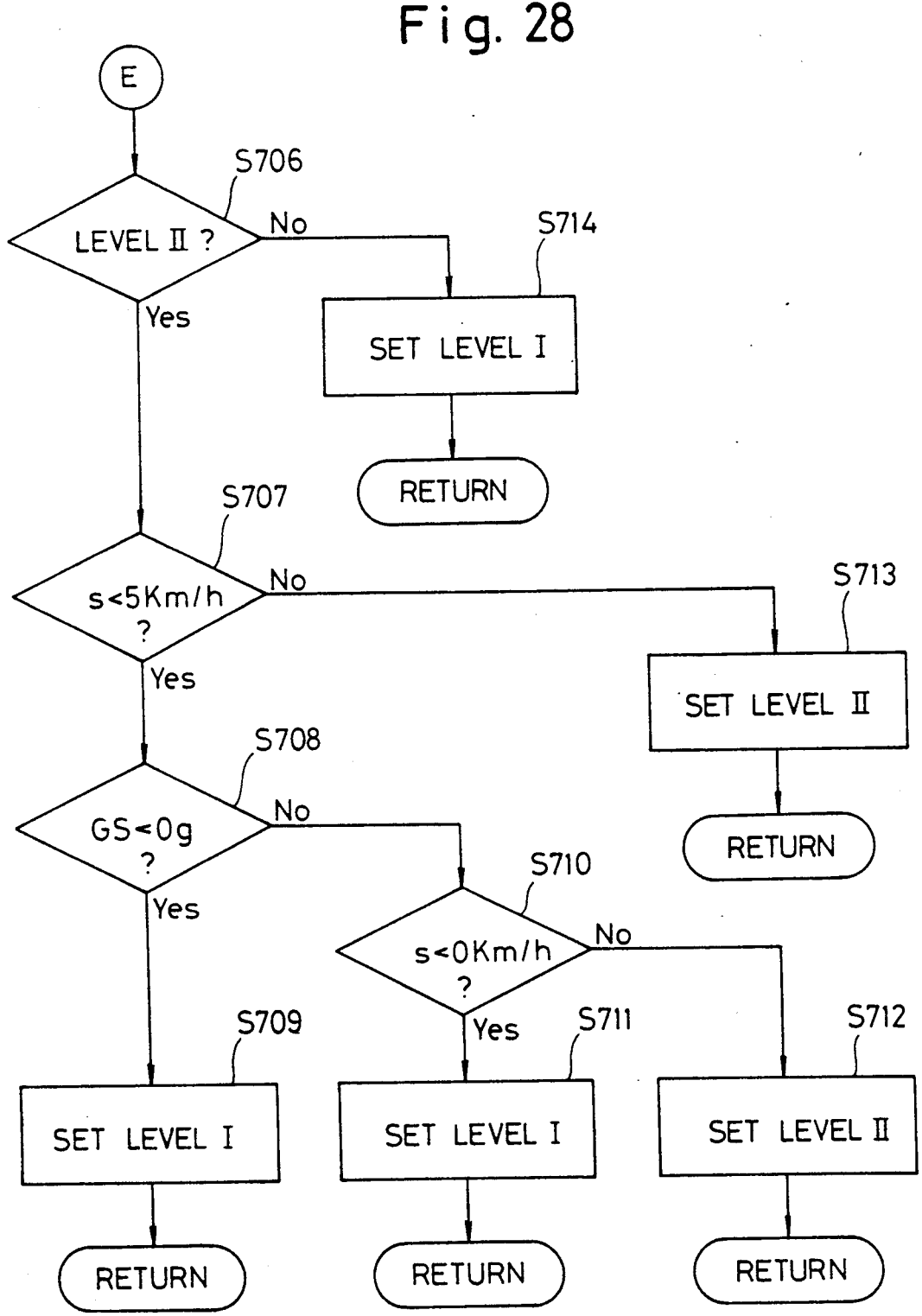
Figure 29:
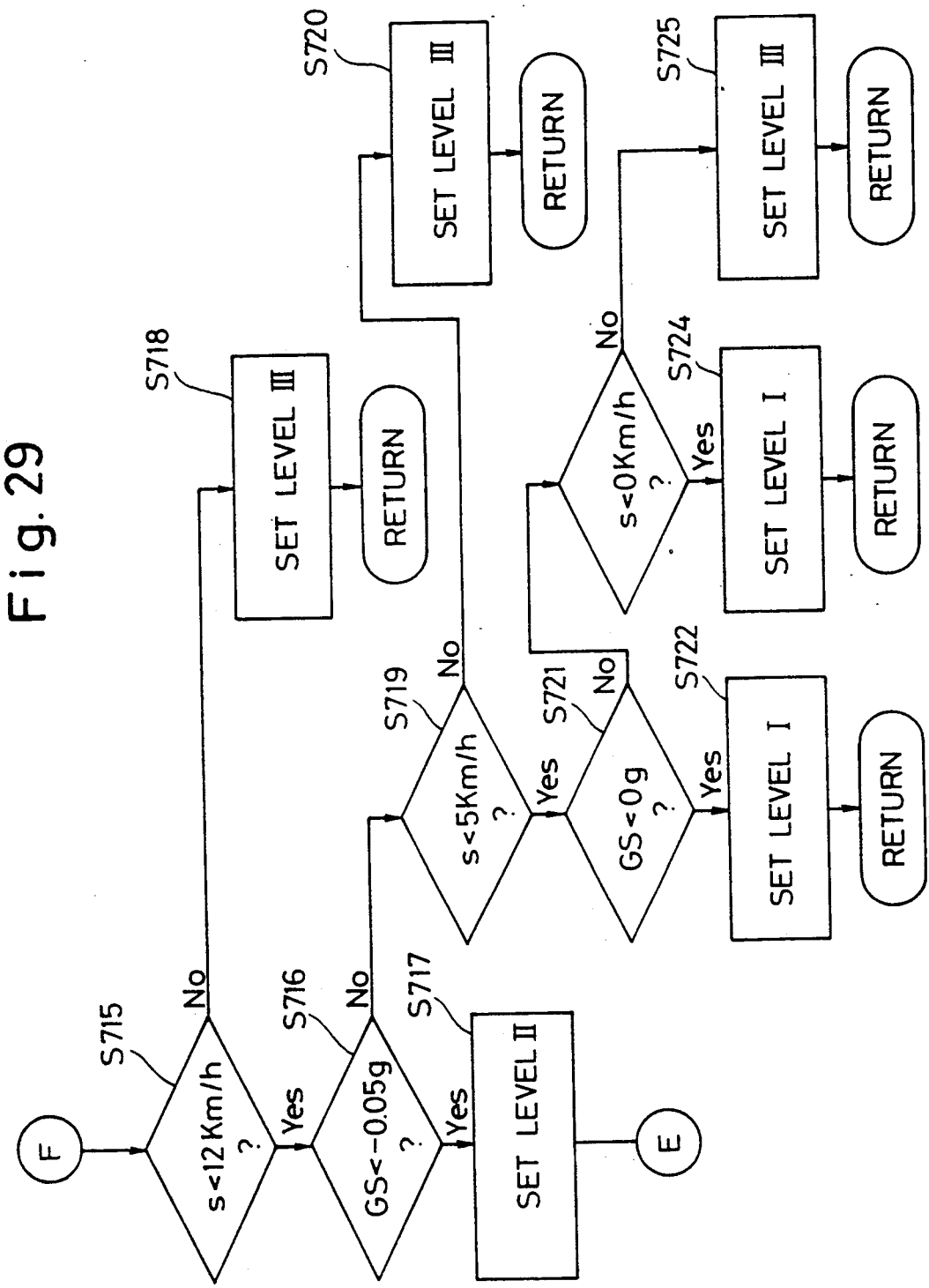

The retardation select routine for the ignition timing is specifically shown in FIGS. 27 through 29. The following is a description of the retardation select routine.

RETARDATION SELECT ROUTINE

Figure 30:
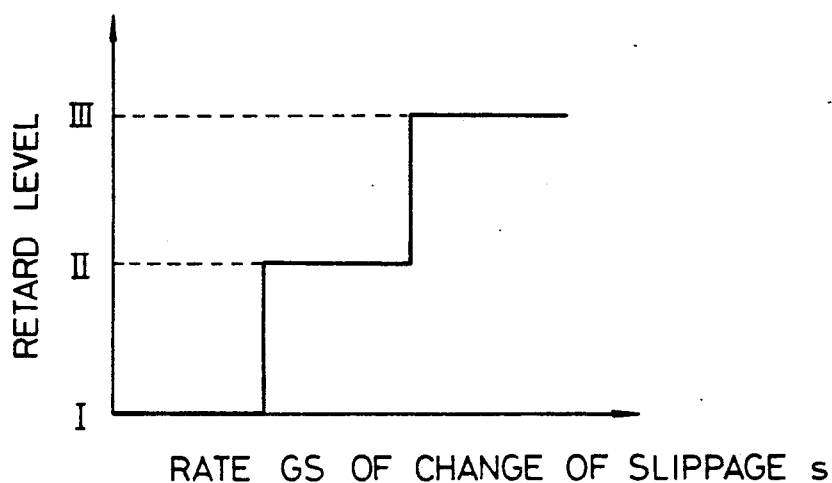
FIG. 30 is a graph showing the relationship between the rate of change in the slippage and the retard level.

First, in Step S701 of FIG. 27, the rate GS of change in the slippage s of the front wheels FWL and FWR is detected, and then in Step S702, a retard level corresponding to the detected rate GS is read. Specifically, the retard level for this point of time is read from a map shown in FIG. 30. In the map of FIG. 30, the rate GS of change of the slippage s is indicated along the abscissa axis and the retard level is indicated along the ordinate. As seen from the map, as the rate GS increases, a higher retard level is applied in a stepwise manner.

Next, in Step S703, it is determined whether or not the retard level is the level III. If the result of determination in Step S703 is YES, that is, if the ignition timing of the engine 2 is retarded to the maximum level, the program proceeds to Step S704, whereupon it is determined whether or not a shifting operation is being effected in the automatic transmission 6 (see FIG. 2), that is, whether or not the hydraulic control device 10 of the automatic transmission 6 is in operation. If the result of determination in Step S704 is YES, that is, if a shifting is being effected in the transmission 6, the flow proceeds to Step S705, whereupon the retard level is switched from the level III, which has been applied up to this point of time, to the level II. Accordingly, the output of the engine 2 cannot be reduced drastically when a shifting operation is being affected in the automatic transmission 6, whereby engine stall can be avoided.

After the execution of Step S705, the program proceeds to Step S706 of FIG. 28, whereupon it is determined whether or not the retard level is the level II. The result of the determination is YES in this case, and accordingly, it is then determined in Step S707 whether or not the slippage s of the front wheels FWL and FWR is smaller than 5 km/h. If the result of determination in Step S707 is YES, that is, if the slip of the front wheels FWL and FWR is not so large, then it is determined in Step S708 whether or not the rate GS of change of the slippage s is smaller than 0 g. If YES in Step S708, then level I is set as the retard level in Step S709. On the other hand, if the result of determination in Step S708 is NO, it is determined in Step S710 whether or not the slippage s of the front wheels FWL and FWR is smaller than 0 km/h. If YES in Step S710, Step S711 is executed and the retard level is also set to the level I in this case. If the result of determination in Step S710 is NO, that is, a slip of the front wheels FWL and FWR more or less occurs, the retard level is set to the level II in Step S712. Since, in this case, the retard level is already set at the level II, the level II is continuously employed.

If the result of determination in Step S707 is NO, then it can be concluded that the front wheels FWL and FWR are slipping. In this case, the retard level is set to the level II in Step S713. Since the retard level is already set at the level II, the level II is, in practice, maintained.

If the result of the determination in Step S706 is NO, the program proceeds to Step S714, whereupon the retard level is set to the level I. When the result of determination in Step S706 becomes NO, the retard amount has already been set to the level I in Step S702, and thus, in practice, the retard level is also maintained in this case.

When the result of determination in Step S704 of FIG. 27 is NO, that is, when the retard level is set at the level III and a shifting operation is not being affected in the automatic transmission 6, the program proceeds from Step S704 to Step S715 of FIG. 29. In Step S715, it is determined whether or not the slippage s of the front wheels FWL and FWR is smaller than 12 km/h. If the result of determination in Step S715 is YES, it is then determined in Step S716 whether or not the rate GS of change of the slippage s is smaller than −0.05 g. If YES in Step S716, the retard level is changed from the level III to the level II in Step S717, and the program proceeds to Step S706 of FIG. 28.

If the result of determination in Step S715 is NO, that is, if the slip of the front wheels FWL and FWR is large, the level III is set as the retard level in Step S718. The level III is continuously used in this case.

If the result of determination in Step S716 is NO, that is, if the slippage s of the front wheels FWL and FWR is increasing, it is then determined in Step S719 whether or not the slippage s is smaller than 5 km/h. If NO in Step S719, that is, if the slippage s falls within the range of 5 km/h to 12 km/h, the retard level III is set, or in this case, maintained in Step S720.

When the result of determination in Step S719 is YES, it is determined in Step S721 whether or not the rate GS of change of the slippage s is smaller than 0 g, that is, whether or not the vehicle is decelerating. If YES in Step S721, it indicates that the vehicle is already decelerating. Accordingly, the retard amount is switched from the level III to the level I in Step S722. If the result of determination in Step S721 is NO, it is then determined in Step S723 whether or not the slippage s of the front wheels FWL and FWR is smaller than 0 km/h. If YES in Step S723, it indicates that the front wheels FWL and FWR are not slipping. Thus, the retard amount is switched from the level III to the level I in Step S724. If the result of determination in Step S723 is NO, it indicates that the slippage of the front wheels FWL and FWR may increase. Accordingly the level III is set, or in this case, maintained in Step S725.

After the retard level for the ignition timing is selected in the aforesaid manner, the program returns to the main control routine shown in FIG. 5, whereupon Step S80 is executed. In Step S80, the final target driving torque TO and the retard level for the ignition timing, obtained in Steps S60 and S70 respectively, are supplied from the TCL 142 to the ECU 12.

The ECU 12 then actually controls the output torque of the engine 2 in accordance with the target driving torque TO and the ignition timing retard level. First, a target retard amount PO for the ignition timing P, for example, is calculated in the ECU 12. When calculating the target retard amount PO, the ignition timing P and basic retard amount PB are derived on the basis of the engine rotation speed NE and the amount of suction air of the engine 2. The ignition timing P and the basic retard amount PB are read from a map, not shown. In this map are set suitable ignition timing P and basic retard amount PB in relation to the detection signal from the crank angle sensor 120, i.e., the engine speed NE, and the detection signal from the airflow sensor 128, i.e., the amount of suction air of the engine 2. More specifically, the basic retard amount PB is set to a maximum value that does not cause an inconvenience to the operation of the engine 2 for that point of time.

After the ignition timing P and basic retard amount PB for the engine 2 are read from the map in the aforesaid manner, the ECU 12 calculates a target retard amount PO by correcting the basic retard amount PB in accordance with the retard level supplied from the TCL 142. In this case, an upper limit is set for the target retard amount PO, and this upper limit is determined in accordance with the allowable upper limit temperature of the exhaust gas from the engine 2. The allowable upper limit temperature of the exhaust gas is set to a temperature at which a catalyst for purifying the exhaust gas cannot be damaged. The temperature of the exhaust gas is detected by the exhaust gas temperature sensor 132.

When the temperature of the cooling water of the engine 2 is lower than a preset value, knocking or stalling of the engine 2 may be induced if the ignition timing P is retarded. In such a case, the retard control of the ignition timing P is preferably interrupted.

Figure 31:
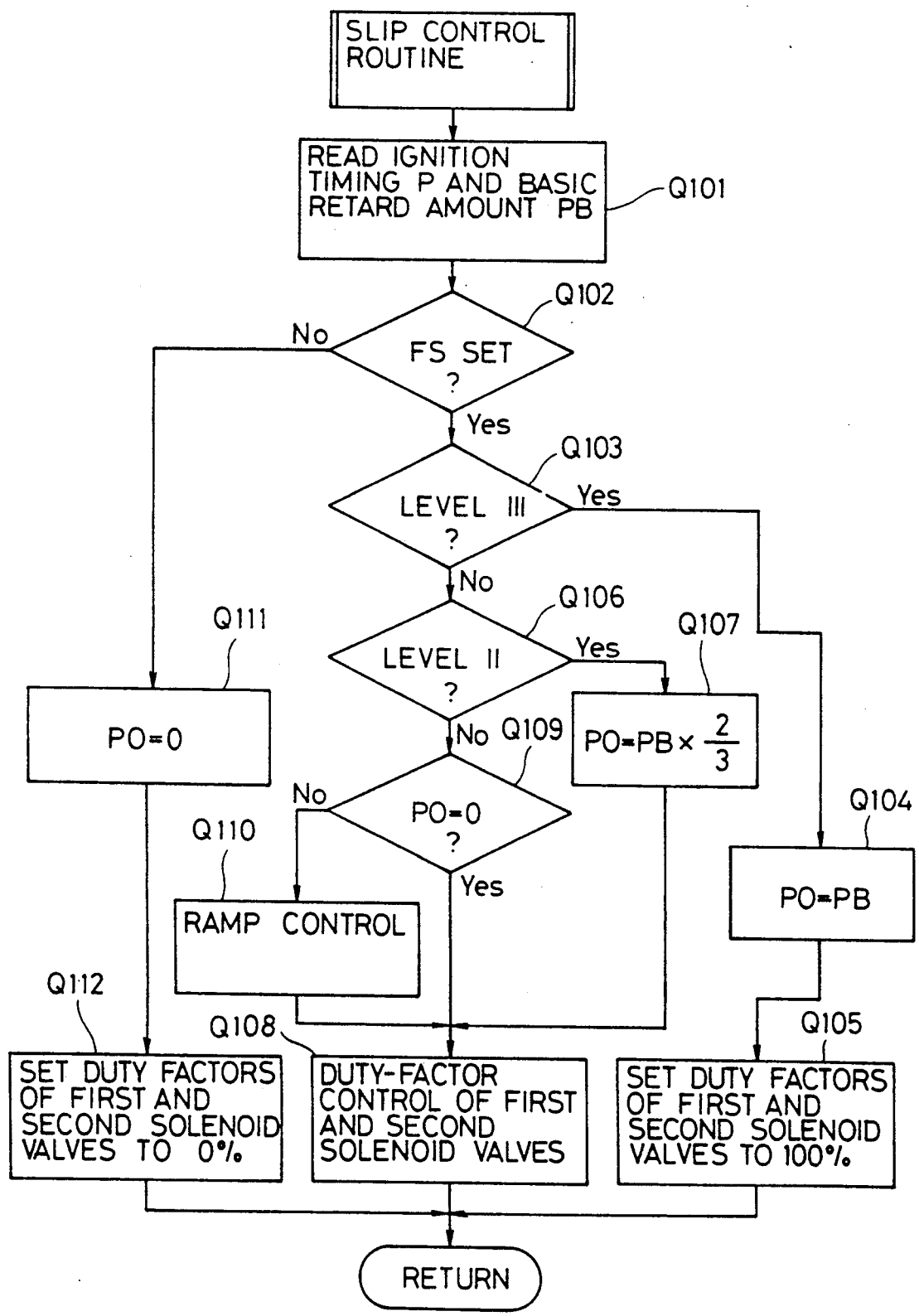
FIG. 31 is a flowchart of a slip control routine executed by an electronic control unit of FIG. 2.

The calculation procedure for the target retard amount PO, described above, and the duty factor control for the first and second solenoid valves 90 and 104 in accordance with the target retard amount PO will be apparent from a slip control routine shown in FIG. 31. The slip control routine will be now described with reference to FIG. 31.

SLIP CONTROL ROUTINE

First, in Step Q101, the ignition timing P and the basic retard amount PB are read in the aforesaid manner, and the program proceeds to Step Q102. In Step Q102, it is determined whether or not the control flag FS for the slip control is set. Namely, the slip control is effected where a slip of the front wheels FW occurs due to an abrupt start of the vehicle or a sudden change of the road surface conditions. Accordingly, Step Q102 is executed to determine whether the control flag FS is set.

If the result of determination in Step Q102 is YES, it is determined in Step Q103 whether or not the aforesaid retard level for the ignition timing P is the level III. If YES in Step Q103, the program proceeds to Step Q104, whereupon the basic retard amount PB is set as the target retard amount PO. Then, Step Q105 is executed, wherein the respective duty factors of the first and second solenoid valves 90 and 104 are set to 100%, regardless of the value of the target driving torque TO. Accordingly, when Steps Q104 and Q105 are executed, the ignition timing P is retarded by the target retard amount PO, i.e., the maximum retard amount for this point of time, by the ECU 12, to reduce the driving torque of the engine 2. In this case, the ECU 12 drives the pneumatic actuator 70 to close the throttle valve 22, whereby the engine 2 is forcibly brought to an idling state. Since the result of determination in Step Q102 was YES in this case, the first target torque TOS has been set as the target driving torque TO.

If the result of determination in Step Q103 is NO, it is determined in Step Q106 whether or not the retard level is the level II. If YES in Step Q106, a target retard amount PO is calculated in Step Q107, in accordance with the following equation:

$$PO = PB.$$

The program then proceeds to Step Q108, whereupon the respective duty factors of the first and second solenoid valves 90 and 104 are set in accordance with the target driving torque TO, i.e., the first target torque TOS. Accordingly, even when Steps Q107 and Q108 are executed, the ECU 12 delays the ignition timing P by the target retard amount PO ($= PB \cdot (\frac{2}{3})$) to reduce the driving torque of the engine 2, and also reduces the opening of the throttle valve 22 in accordance with the set duty factors of the first and second solenoid valves 90 and 104, regardless of the depth of depression of the accelerator pedal 54. This whereby reduces the driving torque of the engine 2.

In connection with Step Q108, the ECU 12 previously stores a map for obtaining a target throttle opening $\theta T$ by using the engine speed NE and the engine driving torque as parameters. Thus, a target throttle opening $\theta T$ can be read from the map on the basis of the engine speed NE and engine driving torque at the present point of time.

Then, a deviation between the target throttle opening $\theta T$ and the actual throttle opening $\theta A$ obtained by the throttle opening sensor 122 is calculated, and the respective duty factors of the first and second solenoid valves 90 and 104 are set in accordance with this deviation. Thereupon, the ECU 12 supplies a current to the solenoids of the first and second solenoid valves 90 and 104 in accordance with the respective duty factors, whereby the throttle valve 22 is actuated in the direction to be closed by the pneumatic actuator 70. Namely, the throttle valve 22 is controlled such that the actual throttle opening $\theta A$ thereof coincides with the target throttle opening $\theta T$.

When the maximum torque TMAX of the engine 2 is set as the target driving torque TO, i.e., the first target torque TOS, the ECU 12 sets the respective duty factors of the first and second solenoid valves 90 and 104 to the predetermined values on the 0% side, as mentioned earlier. Accordingly, the engine 2 produces a driving torque corresponding to the depth of depression of the accelerator pedal 54.

If the result of determination in Step Q106 is NO, it is determined in Step Q109 whether or not the target retard amount PO is already set at 0. If YES in Step Q109, the aforementioned Step Q108 is executed. Thus, in this case, the driving torque of the engine 2 is reduced based solely on the target driving torque TO.

If the result of determination in Step Q109 is NO, the program proceeds to Step Q110, whereupon the target retard amount PO is set by a ramp control. More specifically, when the result of determination in Step Q109 is NO, it indicates that the retard amount for the ignition timing P has been set to the level I. If, in this case, the target retard amount PO is set directly to 0, the driving torque of the engine 2 may be greatly varied. Accordingly, in the ramp control of Step Q110, the already set target retard amount PO is reduced by, e.g., 1°, in each sampling period $\Delta t$ of the main timer, i.e., every time Step Q110 is executed, until the value becomes 0. After the execution of Step Q110, the program proceeds to the aforesaid Step Q108.

When the result of determination in Step Q102 is NO, it indicates that the slip control of the vehicle is not being affected. Accordingly, in this case, the target retard amount PO is set to 0 in Step Q111, and Step Q112 is executed. In Step Q112, the duty factors of the first and second solenoid valves 90 and 104 are both set to 0%. Thus, when Steps Q111 and Q112 are executed, the ECU 12 never reduces the driving torque of the engine 2 by delaying the ignition timing P or by decreasing the throttle opening without regard to the depth of depression of the accelerator pedal 54. Accordingly, the engine 2 produces a driving torque corresponding to the depth of depression of the accelerator pedal 54.

Of course, the ECU 12 executes a turning control routine (not shown), in addition to the above-described slip control routine. In the turning control routine, the duty factors of the first and second solenoid valves 90 and 104 are set in accordance with a deviation between the target driving torque TO, i.e., the second target torque TOC, and the driving torque of the engine 2, and the actual throttle opening $\theta A$ of the throttle valve 22 is made equal to the target throttle opening $\theta T$.

Figure 32:
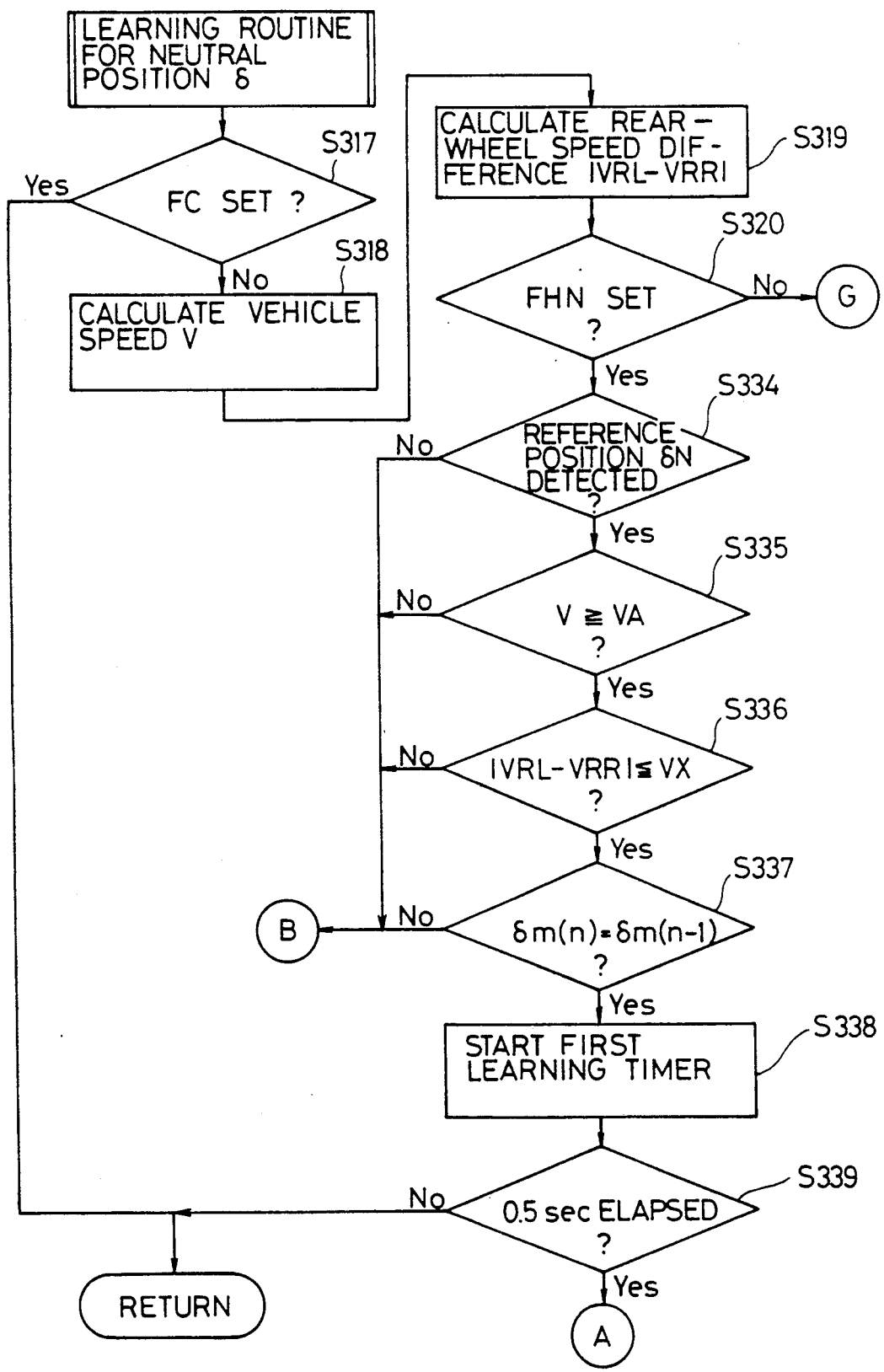
FIGS. 32 and 33 are flowcharts illustrating a modification of the routine shown in FIG. 6.
Figure 33:
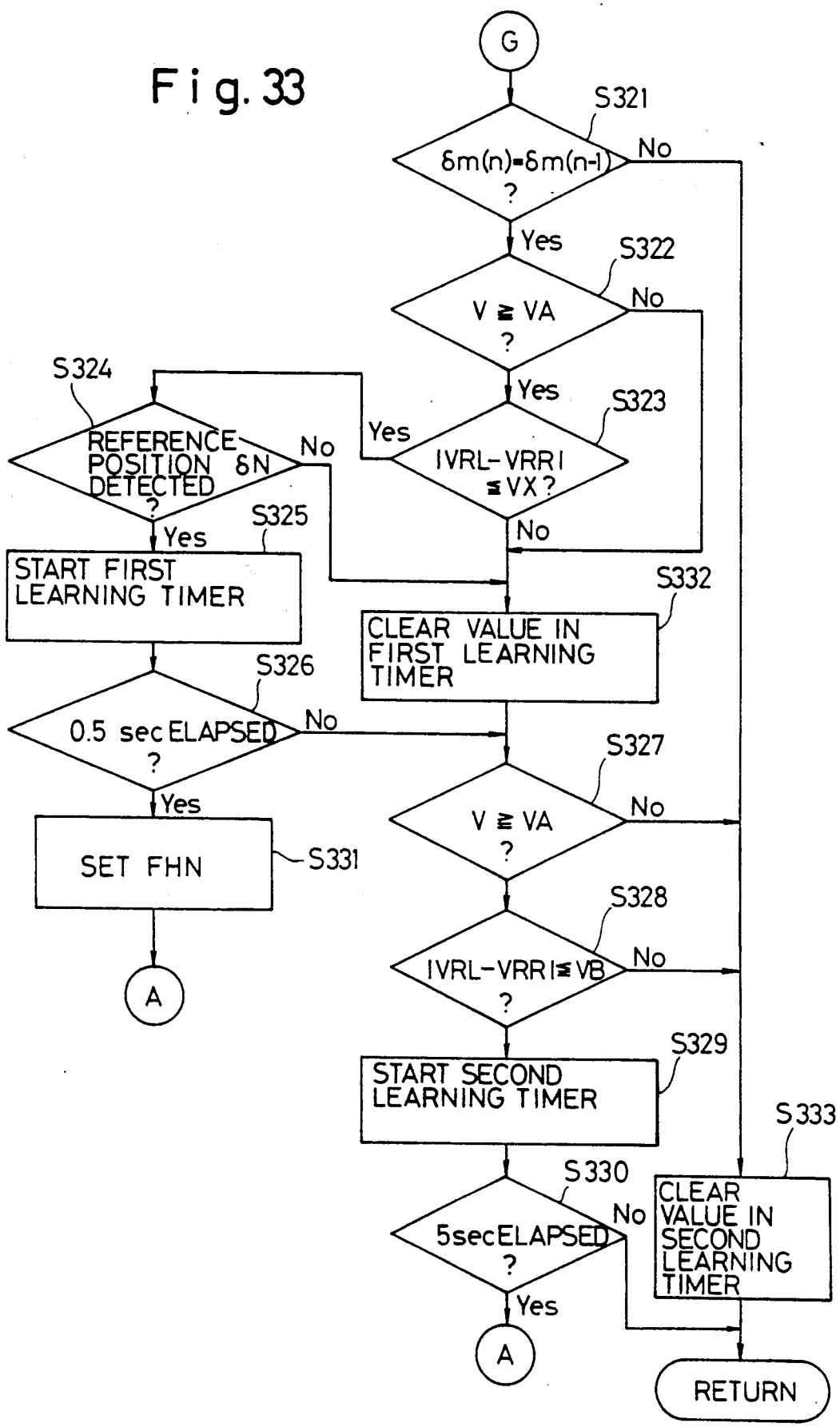

This invention is not limited to the foregoing embodiment, and various modifications can be made. For example, the learning routine for the neutral position $\delta M$ of the steering shaft 158 (see FIG. 4) may be modified as shown in FIGS. 32 and 33. The following is a description of the modified learning routine shown in FIGS. 32 and 33.

LEARNING ROUTINE

In this modification of the learning routine, Step S317 is first executed, that is, it is determined whether or not the control flag FC for the turning control is set. The control flag FC may be set when the arithmetic routine shown in FIG. 20 is executed.

When the result of determination in Step S317 is YES, it indicates that the turning control is being effected, and accordingly, the program returns to the main control routine of FIG. 5 without executing the learning routine. Namely, if the neutral position $\delta M$ of the steering shaft 158 is corrected by learning during the turning control, the second target torque TOC for the turning control calculated on the basis of the rotational angle $\delta H$ of the steering shaft 158, i.e., the driving torque of the engine 2, may be drastically varied, as noted from the foregoing description. A sudden change of the driving torque of the engine 2 spoils the ride feeling.

When the result of determination in Step S317 is NO, no inconvenience is caused if the learning routine is executed. Therefore, the program proceeds to Steps S318, S319, and S320. Steps S318 and S319 are identical with Steps S301 and S302 of FIG. 6, respectively, and thus the vehicle speed V and the rear-wheel speed difference are calculated in these steps.

In Step S320, it is determined whether or not a learning completion flag FHN is set. The flag FHN is a flag indicating that the learning correction of the neutral position $\delta M$ has been affects while a reference position $\delta N$ of the steering wheel 160 is detected by the reference position sensor 154.

The flag FHN remains reset immediately after the ignition key switch 134 is turned on. Accordingly, the result of determination in Step S320 at this point of time is NO, and thus the program proceeds to Step S321 of FIG. 33. Step S321 of FIG. 33 is identical with Step S305 of FIG. 6, and it is determined whether or not the rotational angle $\delta m(n)$ of the steering shaft 158 obtained this time is equal to the rotational angle $\delta m(n-1)$ obtained in the preceding cycle. If the result of determination in Step S321 is YES, it is determined in Step S322 whether or not the vehicle speed V takes a value equal to or larger than the aforementioned threshold value VA. The threshold value VA is set to 10 km/h, although in the foregoing embodiment, it is set to 20 km/h.

Figure 34:
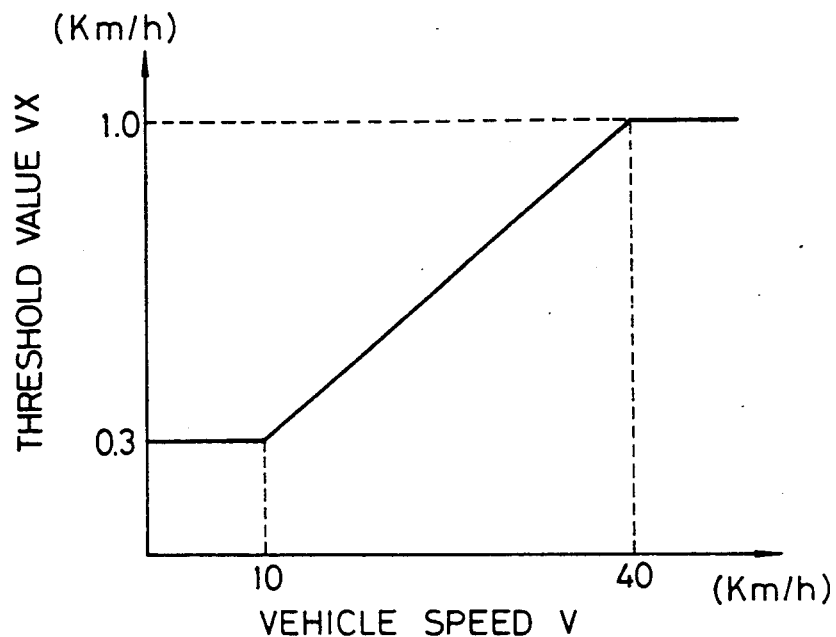
FIG. 34 is a graph showing a threshold value in relation to the vehicle speed.

If the result of determination in Step S322 is YES, it is determined in Step S323 whether or not the rear-wheel speed difference |VRL−VRR| takes a value equal to or smaller than a threshold value VX. The threshold value VX is used in a manner similar to the threshold value VB of the foregoing embodiment, and is read from a map shown in FIG. 34, for example. When the air pressures of the rear wheels RWL and RWR are not equal to each other, the rear-wheel speed difference |VRL−VRR| is liable to increase in proportion to the vehicle speed V, and accordingly, as seen from the map of FIG. 34, the threshold value VX is increased as the vehicle speed V rises. The minimum value of the threshold value VX is set to 0.3 km/h.

If the result of determination in Step S323 is YES, it is determined in Step S324 whether or not the reference position $\delta N$ of the steering wheel 160 is detected by the reference position sensor 154. If YES in Step S324, that is, it is determined that the vehicle is advancing straight, a first learning timer is started for counting in Step S325, and the program proceeds to Step S326. In Step S326, it is determined whether or not the value in the first learning timer indicates a passage of 0.5 sec. The result of determination in Step S326 is NO immediately after the execution of Step S325, and thus the program proceeds to Step S327.

In Step S327, it is determined whether or not the vehicle speed V takes a value equal to or larger than the threshold value VA, as in the aforesaid Step S322. If the result of determination in Step S327 is YES, it is then determined in Step S328 whether or not the rear-wheel speed difference takes a value equal to or smaller than the threshold value VB. Step S328 is identical with Step S304 in FIG. 6. If the result of determination in Step S328 is YES, a second learning timer is started for counting in Step S329, and the program proceeds to Step S330. In Step S330, it is determined whether or not the value in the second learning timer indicates a passage of 5 sec. The result of determination in Step S330 is NO immediately after the execution of Step S329, and accordingly, the program returns to the main control routine of FIG. 5.

If the result of determination in Step S326 becomes YES while the main control routine repeatedly calls for the execution of the learning routine of FIGS. 32 and 33, Step S331 is executed, whereupon the aforementioned learning completion flag FHN is set. Specifically, while the results of determination in Steps S321 through S324 are all YES, that is, while the vehicle continues advancing straight for 0.5 sec, the flag FHN is set in Step S331, the program then proceeds to Step S308 of FIG. 7, and Step S308 and its subsequent steps are executed in the above-described manner.

If any one of the results of determination in Steps S322, S323 and S324 becomes NO, Step S332 is executed, whereupon the value in the first learning timer is cleared and the counting of the timer is stopped. Even in such a situation, where the results of determination in Steps S327 and S328 remain YES and the determination in Step S330 provides an affirmative answer (YES), on condition that the result of determination in Step S321 remains YES, the program proceeds from Step S330 to Step S308 of FIG. 7. The flow proceeds from Step S330 to Step S308 of FIG. 7 in the case wherein the results of determination in Steps S321, S322, S323, S327 and S328 all remain YES but the determination in Step S324 gives a negative answer (NO).

When Step S308 and its subsequent steps in FIG. 7 are executed, the neutral position $\delta M$ is corrected by learning at this point of time, as mentioned before. According to the modified learning routine, when Step S310 of FIG. 7 is executed, the values in the first and second learning timers are simultaneously cleared and the timers are stopped.

If any one of the results of determination in Steps S321, S327 and S328 becomes NO, it can be concluded that the vehicle is not advancing straight, in which case the program returns to the main control routine of FIG. 5.

While the learning routine is repeatedly executed after the execution of Step S331, the result of determination in Step S320 becomes YES and it can be concluded that the neutral position $\delta M$ has been corrected by learning. Thus, the program proceeds from Step S320 to Step S334.

In subsequent Steps S334, S335, S336 and S337, determinations are successively made as to whether or not the reference position δN is detected, whether or not the vehicle speed V takes a value equal to or greater than the threshold value VA, whether or not the rear-wheel speed difference takes a value equal to or smaller than the threshold value VX, and whether or not the rotational angle δm(n) of the steering shaft 158 calculated this time coincides with the rotational angle δm(n−1) calculated in the preceding cycle. If the results of determination in Steps S334 through S337 are all YES, it can be concluded that the vehicle is advancing straight, and accordingly, Step S338 is executed. In Step S338, the first learning timer is started for counting, and in subsequent Step S339, it is determined whether or not the value in the first learning counter indicates a passage of 0.5 sec. Immediately after the execution of Step S338, the result of determination in Step S339 becomes NO, and thus the program returns to the main control routine of FIG. 5. However, when the result of determination in Step S339 becomes YES while the learning routine is repeatedly executed, the program proceeds to Step S308 of FIG. 7 and this step and those following it are executed.

When any one of the results of determination in Steps S334, S335, S336 and S337 becomes NO, the program proceeds directly to Step S310 of FIG. 7.

In the modified learning routine described above, whether the vehicle is advancing straight or not is not determined solely based on the rear-wheel speed difference. The detection signal from the reference position sensor 154, in addition to the rear-wheel speed difference, is utilized for the determination. Accordingly, the learning correction of the neutral position δM can be executed immediately after the start of the vehicle, and the derived neutral position δM can be made stable. Namely, even when the reference position sensor 154 is damaged, the neutral position δM can be corrected by learning, as in the learning routine of the aforementioned embodiment.

Figure 35:
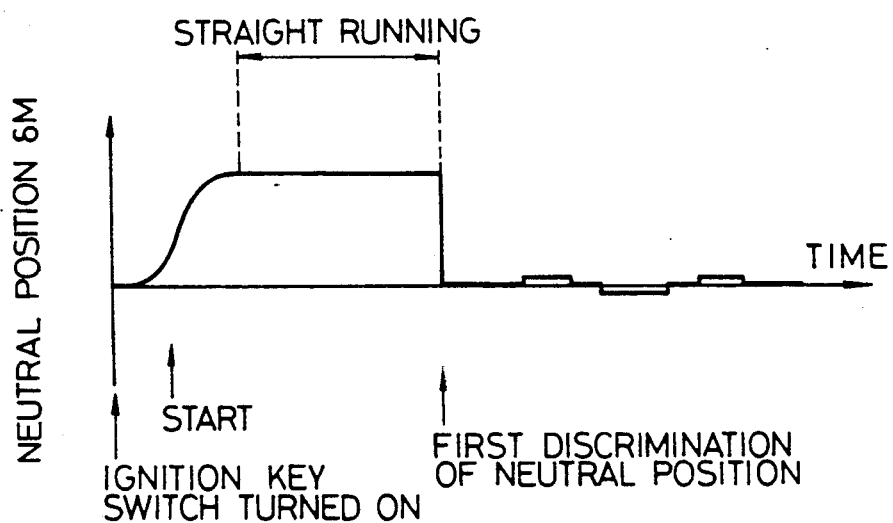
FIG. 35 is a graph showing an example of the neutral position learning for the steering shaft.

FIG. 35 shows the way the neutral position of the steering shaft 158 is corrected by learning, when starting the drive of the vehicle, having so far been at a stop with its front wheels FW kept turned, after turning on the ignition key. After the ignition key is turned on to start the drive, as seen from FIG. 35, Step S20 of FIG. 5 is executed for the first time, and the rotational angle δH of the steering shaft 158 is acquired based on the detection signal from the steering angle sensor 152. Thereupon, the first rotational angle δH is set as the neutral position δM of the steering shaft 158, as mentioned before, and thus the neutral position δM at the start of the drive of the vehicle is substantially deviated from the actual neutral position. However, when the learning routine of FIGS. 32, 33 and 7 is executed for learning correction, the first neutral position δM is corrected by a large margin. If the learning routine is repeatedly executed thereafter, one of Steps S313, S315 and S316 is sure to be executed even though the result of determination in Step S311 is NO. Therefore, the correction amount of the neutral position δM is restrained.

Figure 36B:
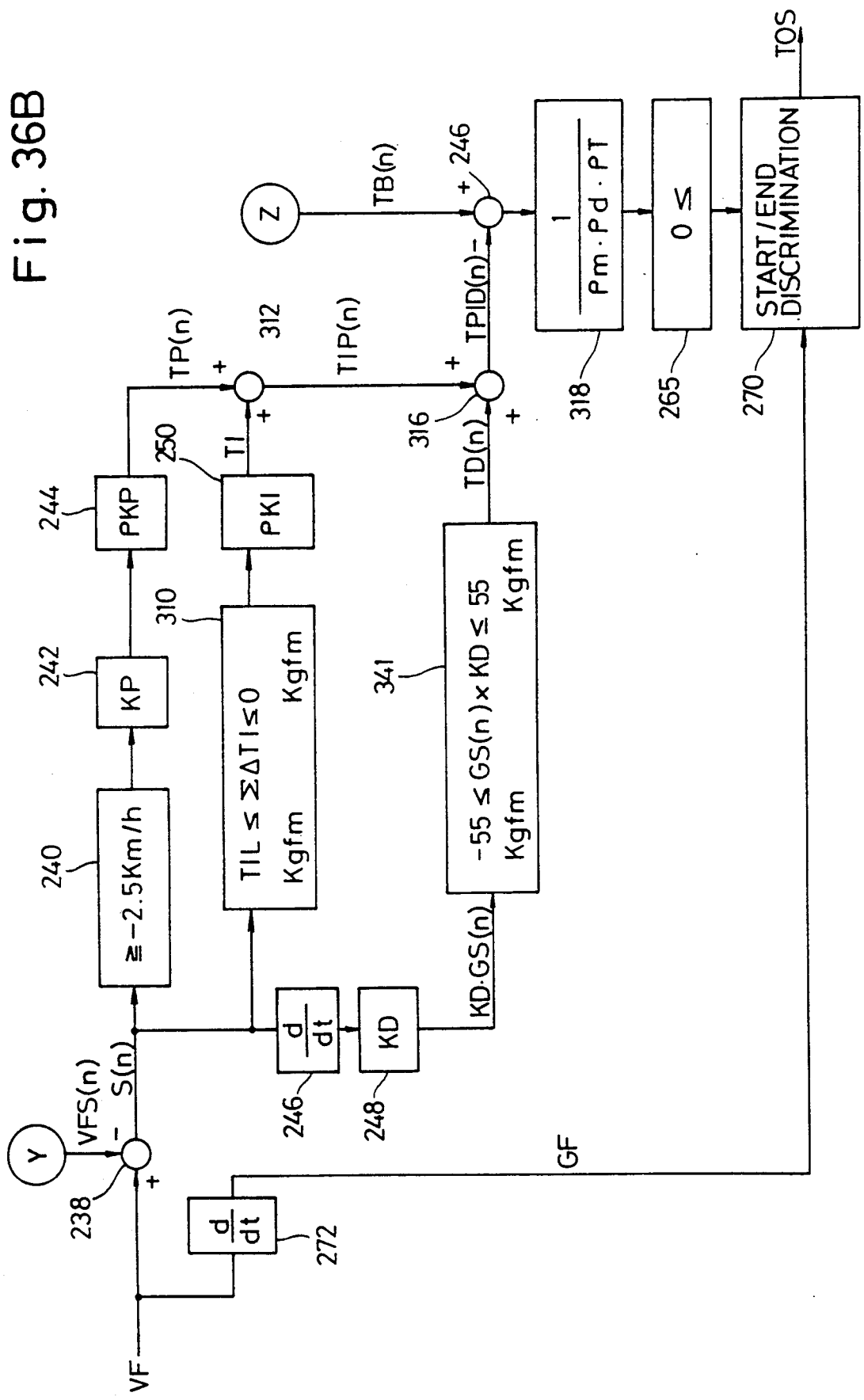

FIGS. 36A and 36B are block diagrams showing a modification of the first target torque TOS(n) calculation procedure of FIGS. 8A and 8B. In FIGS. 36A and 36B, like reference numerals are used to denote like elements appearing in FIGS. 8A and 8B, and a description thereof is omitted.

Figure 37:
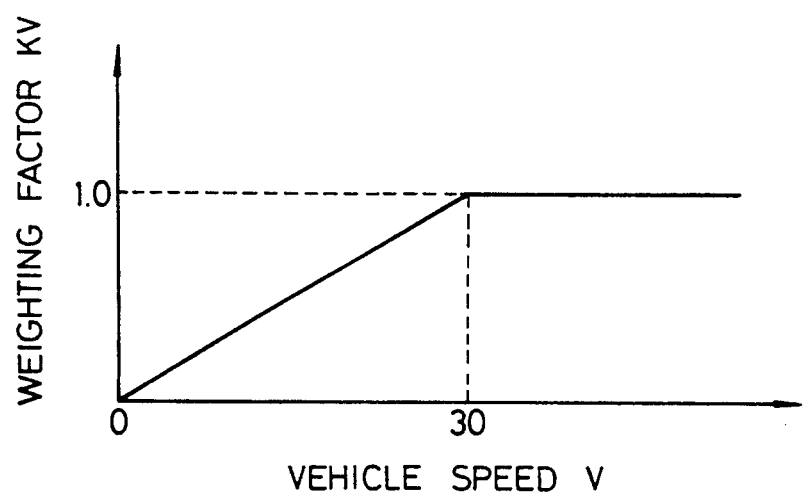
FIG. 37 is a graph showing a weighting factor in relation to vehicle speed.

In the block diagram of FIG. 36A, the changeover switch 204 is not designed to select one of the rear-wheel speeds supplied from the low- and high-speed select sections 200 and 202 to calculate the vehicle speed VS(n) for the slip control, but the changeover switch 204 is supplied with the high rear-wheel speed VH from the high-speed select section 202 and a value obtained by adding together the values supplied from a pair of multipliers 280 and 282. More specifically, the low rear-wheel speed VL is supplied from the low-speed select section 200 to the multiplier 282, whereupon the rear-wheel speed VL is multiplied by a weighing factor KV. The weighing factor KV is set in accordance with the vehicle speed V calculated according to equation (1) mentioned above. Specifically, the weighing factor KV may be read from a map shown in FIG. 37. The high rear-wheel speed VH is supplied to the multiplier 280, whereupon the rear-wheel speed VH is multiplied by a weighing factor (1−KV). The values calculated in the multipliers 280 and 282 are summed up, and the resultant value is supplied to the changeover switch 204.

Accordingly, one of the high rear-wheel speed VH and the rear-wheel speed VM (=VH+KV(VL−VH)), supplied from the added 284, is selected by the changeover switch 204. Thus, when the control flag FS is set, the smaller of the rear-wheel speeds VH and VM is selected by the changeover switch 204, as mentioned before. When the vehicle turns to the right or left at an intersection, for example, the radius of turn of the vehicle is small and thus the deviation between the rear-wheel speeds VRL and VRR becomes very large. In the block diagram of FIGS. 8A and 8B, if the control flag FS is set in this case, the rear-wheel speed VL is directly selected by the changeover switch 204, in which the rear-wheel speed VL differs significantly from an average value of the peripheral speeds of the front wheels FWL and FWR. Therefore, if feedback control of the driving torque of the engine 2 is performed in accordance with the first target torque TOS calculated by using the rear-wheel speed VL as the vehicle speed V, the correction amount for the driving torque of the engine 2 becomes too large to deteriorate the acceleration performance of the vehicle. However, in the block diagrams showing the modification, when the control flag FS is set, the rear-wheel speed VM is close to the average value of the peripheral speeds of the front wheels FWL and FWR even though the rear-wheel speed VM is selected by the changeover switch 204, whereby the above drawback is eliminated.

The vehicle speed VS(n) selected by the changeover switch 204 is supplied to the differentiating section 214, whereupon the longitudinal acceleration GX(n) of the vehicle at the present point of time is calculated according to the following equation:

$$GX(n) = (VS(n) - VS(n-1))/(3.6 \cdot \Delta t \cdot g).$$

The calculated longitudinal acceleration GX(n) is supplied to the clipping section 216 and the filter section 218 to obtain a corrected longitudinal acceleration GXF(n), as in the case of the block diagram of FIG. 8A.

The filter section 218 has the following function, in addition to that described before. Namely, when an upshift operation is effected in the automatic transmission 6 during the execution of the slip control, the corrected longitudinal acceleration GXF is maintained at a maximum value for that point of time, and accordingly, the driver can enjoy a feeling of acceleration of the vehicle.

The corrected longitudinal acceleration GXF(n) is then supplied to the torque converting section 228, whereupon it is converted into a torque. The torque value obtained in the torque converting sections 228 naturally takes a positive value, and thus the value clipped by the clipping section 286 is equal to or large than 0. The value derived through the clipping section 286 is supplied to an adder 230, whereupon it is added to a running resistance TR supplied from the calculating section 232. The value obtained by the adder 230 is supplied to an adder 288, whereupon it is further added to a cornering drag correction torque TC supplied from a calculating section 300, to obtain a reference driving torque TB(n) at the present point of time.

The following equation represents the calculation procedure effected between the torque converting section 228 and the adder 288;

$$TB(n) = GXF(n)\cdot Wb\cdot r + TR + TC \qquad (9).$$

Figure 38:
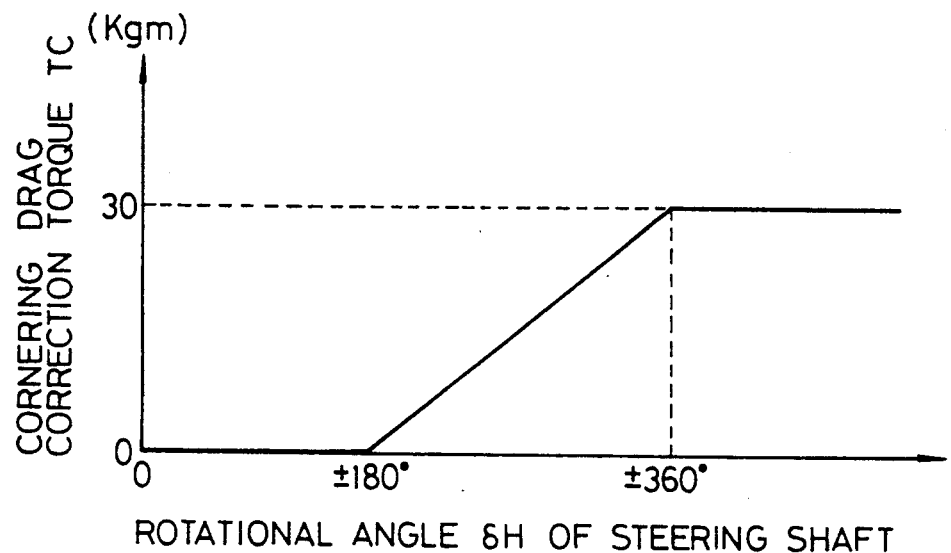
FIG. 38 is a graph showing a correction torque for a cornering drag with respect to the rotation angle of the steering shaft.

The running resistance TR is read from the map shown in FIG. 12 in accordance with the vehicle speed V. The cornering drag correction torque TC may, in practice, be read from a map shown in FIG. 38. As seen from the map, the correction torque is read in accordance with the rotational angle δH of the steering shaft 158, and is set such that it is increased as the rotational angle δH increases toward ±360° beyond the range of ±180°. Accordingly, by reading the cornering drag correction torque TC from the map of FIG. 38, the reference driving torque TB, calculated according to equation (9), can be made close to the engine driving torque in an actual running state of the vehicle. In this case, the reference driving torque TB is set to a value larger than an actual driving torque immediately after a turning of the vehicle, whereby the vehicle acceleration feeling after turning is improved.

Figure 39:
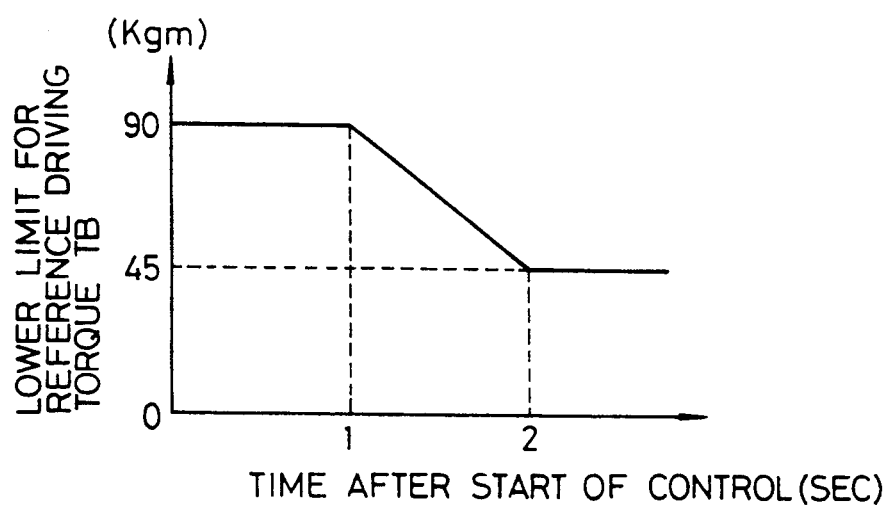
FIG. 39 is a graph showing a lower limit for the reference driving torque which is varied after the start of the slip control with time.

The reference driving torque TB(n) is then supplied from the adder 288 to a variable clipping section 302. The lower limit value in the variable clipping section 302 for the reference driving torque TB(n) is variably set in accordance with the time elapsed from the start of the slip control. More specifically, the lower limit for the reference driving torque TB(n) may be read from a map shown in FIG. 39, and is set such that it is decreased as time elapses after the start of the slip control, as seen from the figure. If the lower limit for the reference driving torque TB(n) is set in this manner, a negative value does not result from a subtracted 264 shown in FIG. 36B in which the final correction torque TPID(n) is subtracted from the reference driving torque.

The final correction torque TPID(n) is calculated through a feed back control, on the basis of the slippage s represented in terms of a deviation between the actual front-wheel speed VF, detected by the front-wheel rotation sensor 126, and the vehicle speed VS for the slip control.

To efficiently utilize the driving torque produced by the engine 2 during an acceleration of the vehicle, the slip factor S of the front wheels FWL and FWR is desirably adjusted to the target slip factor So, or to a value close to and smaller than the target slip factor So, as mentioned with reference to FIG. 9. Furthermore, since the target slip factor So varies in the range of approximately 0.1 to 0.25 in accordance with the road surface conditions, as mentioned before, the amount of the slip for the front wheels FWL and FWR serving as the driving wheels is set to an extent of about 10% (slippage s) in this embodiment. Accordingly, in the present modification, the target front-wheel speed VFO(n) at the present point of time is obtained according to the following equation:

$$VFO(n) = 1.1\cdot VS(n).$$

To explain the calculation procedure for the target front-wheel speed VFO(n) with reference to the block diagram of FIG. 36A, the vehicle speed VS(n), output from the aforesaid changeover switch 204, is supplied to the multiplier 304, in addition to the differentiating section 214, and the target front-wheel speed VFO(n) is calculated in this multiplier 304.

The target front-wheel speed VFO(n) is supplied to the adder 234, whereupon it is added to a slip correction amount VK supplied from the acceleration correcting section 220. The slip correction amount VK may be read from the map shown in FIG. 13, as mentioned above.

In the following subtractor 236, a slip correction amount VKC supplied from the turning correcting section 222 is subtracted from the value obtained through the adder 234. In this modification, the slip correction amount VKc is read from a map shown in FIG. 40, not that shown in FIG. 14, in accordance with the target transverse acceleration GYO or actual transverse acceleration GY as required. Namely, during the time after the ignition key switch 134 is turned on until the learning correction for the neutral position δM of the steering shaft 158 is initiated, the value of the rotational angle δH of the steering shaft 158 lacks reliability. Accordingly, in this case, the slip correction amount VKC is read by using the characteristic indicated by the broken line in the map of FIG. 40, in accordance with the actual transverse acceleration GY calculated from the peripheral speeds of the rear wheels RWL and RWR, i.e., corrected actual transverse acceleration GYF mentioned later. On the other hand, after the learning control for the neutral position δM is executed, the slip correction amount VKC is read, using the characteristic indicated by the full line in the map of FIG. 40, in accordance with the target transverse acceleration GYO.

As described above, the target front-wheel speed VFO(n) is corrected for the slip control and becomes a target front-wheel speed VFS(n) as it passes through the adder 234 and the subtracted 236. While the vehicle is accelerating, the target front-wheel speed VFS(n) is increased, compared with the target front-wheel speed VFO(n), and thus the slip factor of the front wheels becomes close to and at the same time smaller than the target slip factor So. When the vehicle is turning, on the other hand, the target front-wheel speed VFS(n) is reduced in comparison with the target front-wheel speed VFO(n), whereby the vehicle is allowed to turn smoothly. Namely, as indicated by the one-dot-chain line in FIG. 9, the target slip factor S for turning of the vehicle is considerably smaller than the target slip factor So for straight advancement of the vehicle. Therefore, when the vehicle is turning, the target front-wheel speed VFS(n) is preferably set to a small value.

The target transverse acceleration GYO is calculated on the basis of the steering angle δ, calculated according to equation (2) on the basis of the detection signal from the steering angle sensor 152, in accordance with equation (3), as mentioned before. Accordingly, if the steering angle sensor 152 or the reference position sensor 154 fails, the neutral position δM of the steering shaft 158 cannot be accurately detected, making the value of the steering angle δ, and thus the value of the target transverse acceleration GYO calculated from the steering angle δ, inaccurate.

Therefore, when the steering angle sensor 152 or the like fails, the actual transverse acceleration GY of the vehicle calculated based on the rear-wheel speed difference |VRL−VRR|, i.e., the corrected transverse acceleration GYF, is preferably used instead of the target transverse acceleration GYO.

Specifically, the actual transverse acceleration GYF is calculated in the following manner. As shown in the block diagram of FIG. 36A, the rear-wheel speeds VRL and VRR are supplied to a transverse acceleration calculating section 306, whereupon the actual transverse acceleration GY is calculated according to the following equation:

$$GY = (|VRL - VRR| \cdot V)/(3.6^2 \cdot b \cdot g) \quad (10)$$

where b represents the tread of the rear wheels RWL and RWR.

The actual transverse acceleration GY calculated according to the above equation is supplied to a filter section 308, whereupon it is subjected to a low-pass filtering by a digital operation expressed by the equation given below, whereby a corrected actual transverse acceleration GFY(n) at this point of time is derived:

$$GYF(n) = \Sigma(20/256)(GY(n) - GYF(n-1))$$

where GY(n) represents the actual transverse acceleration calculated this time, and GYF(n−1) represents the corrected actual transverse acceleration calculated in the preceding cycle.

Figure 41:
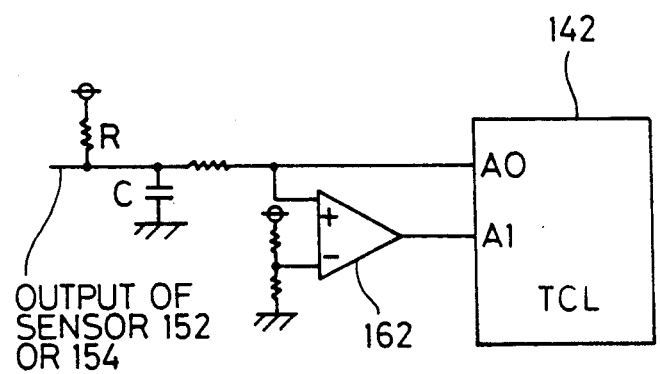
FIG. 41 is a diagram of a disconnection detecting circuit for a sensor.

Whether the steering angle sensor 152 or the reference position sensor 154 is in trouble or not, can be determined by the TCL 142, with the aid of a disconnection detecting circuit shown in FIG. 41, for example. In the disconnection detecting circuit, the output of the steering angle sensor 152 or the reference position sensor 154 is supplied to an A1 terminal of the TCL 142, and also supplied to an A2 terminal of same via a comparator 162. A pull-up resistor R is connected across the line connecting the comparator 162 and the sensor, and is connected to a grounded capacitor C.

A reference voltage of 4.5 V is applied to the minus terminal of the comparator 162. Accordingly, if the line connected to the sensor is disconnected or if the sensor fails, no detection signal is supplied from the sensor to the A0 terminal of the TCL 142, thus the voltage applied to the A0 terminal becomes higher than the reference voltage, in which case the comparator 162 is made on and a high-level (H) input is continuously applied to the A1 terminal. When the voltage input to the A1 terminal remains a high-level for, e.g., 2 sec, it may be determined by the TCL 142 that the line connected to the steering angle sensor 152 or the reference position sensor 154 is disconnected or the sensor itself fails.

In the disconnection detecting circuit of FIG. 41, a disconnection in the steering angle sensor 154 is detected by hardware, but a fault of the sensor 154 may be detected by software.

Figure 42:
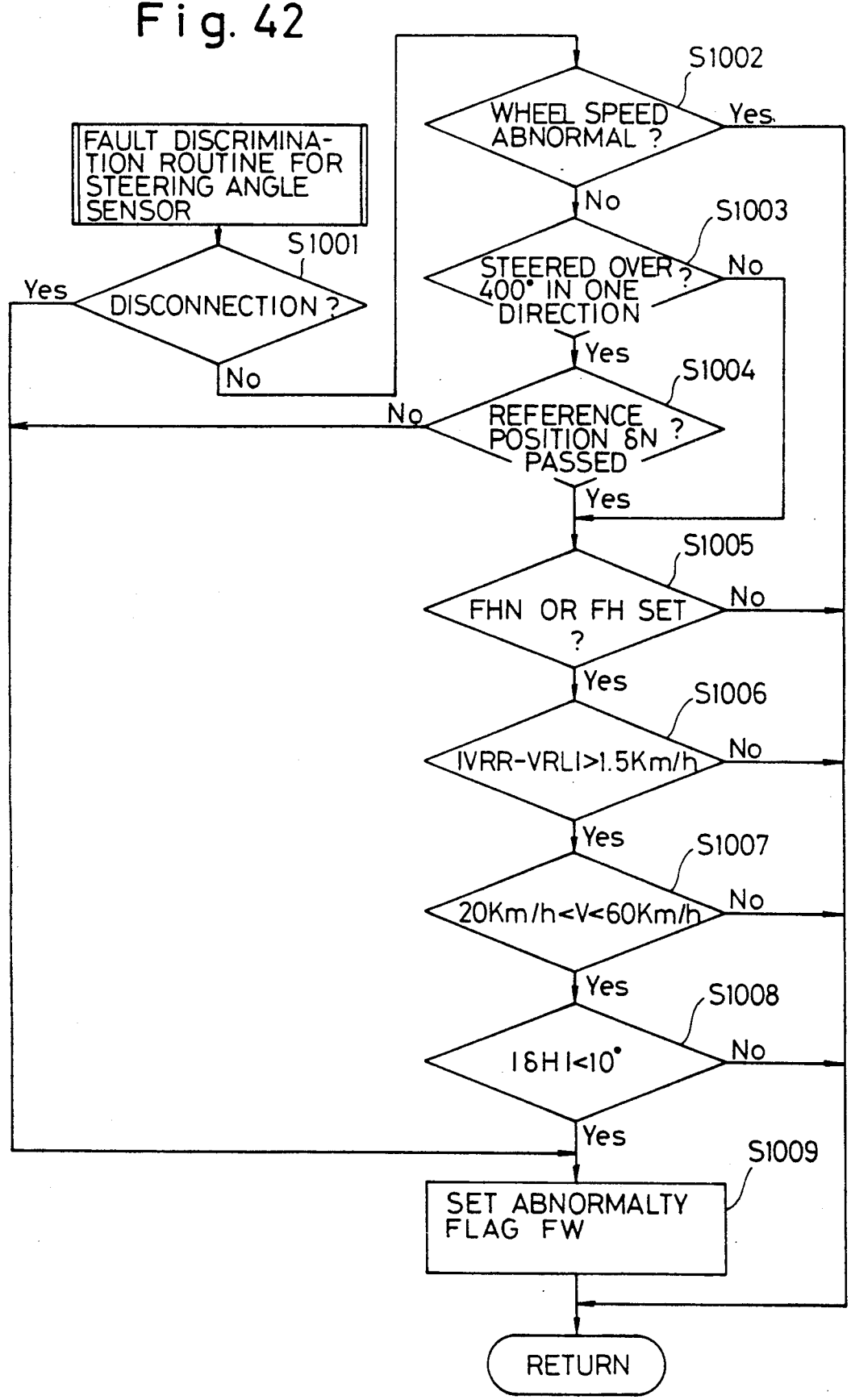
FIG. 42 is a flowchart illustrating a sensor fault discrimination routine.

For example, a fault discrimination routine for the steering angle sensor 154, shown in FIG. 42, may be executed. The fault discrimination routine is a subroutine of the arithmetic routine in Step S40 of FIG. 5.

FAULT DISCRIMINATION ROUTINE FOR STEERING ANGLE SENSOR

First, in Step S1001 of FIG. 42, it is determined whether or not a disconnection in the reference position sensor 154 exists, by using the disconnection detecting circuit of FIG. 41. If the result of determination in Step S1001 is NO, it is determined in Step S1002 whether or not the front-wheel and rear-wheel rotation sensors 126, 148 and 150 are in trouble, that is, whether or not an abnormality exists in the speeds of the respective wheels, by using hardware similar to the above disconnection detecting circuit.

If the result of determination in Step S1002 is NO, it is then determined in Step S1003 whether or not the steering wheel 160 is turned by 400° in either direction, that is, whether or not the rotational angle δH of the steering shaft 158 is equal to or greater than 400°. If YES, in Step S1003, it is determined in Step S1004 whether or not the reference position δN has been detected by the reference position sensor 154, that is, whether or not the steering wheel 160 has been rotated over 360°. When the result of determination in Step S1004 is NO and at the same time it has been determined that the reference position sensor 154 is operating properly, then it can be concluded that the result of determination in Step S1003 is erroneous. Namely, the result of determination in Step S1004 must be YES where the steering angle sensor 152 is operating properly and the result of determination in Step S1003 is YES. Thus, if the result of determination in Step S1004 is NO and at the same time it is already determined that the reference position sensor 154 is operating properly, it can be concluded that an abnormality exists in the steering angle sensor 152. In this case, the program proceeds from Step S1004 to Step S1009, whereupon an abnormality flag FW is set. The flag FW indicates an occurrence of abnormality in the steering angle sensor 154.

If the result of determination in Step S1003 is NO, the program proceeds to Step S1005, skipping Step S1004, and also when the results of determination in Steps S1003 and S1004 are both YES, Step S1005 is executed. In Step S1005, it is determined whether or not the learning control for the neutral position δM of the steering shaft 158 has already been executed, that is, whether the learning completion flag FHN or the learning flag FH is set. If the result of determination in Step S1005 is YES, Steps S1006, S1007 and S1008 are successively executed on condition that the result of determination in the respective preceding Step is YES.

In Step S1006, it is determined whether or not the rear-wheel difference |VRL−VRR| is greater than, e.g., 1.5 km/h, and in Step S1007, it is determined whether or not the vehicle speed V takes a value higher than 20 km/h and at the same time lower than 60 km/h. Then, in Step S1008, it is determined whether or not the absolute value of the rotational angle δH of the steering shaft 158 is smaller than 10°.

When the results of determination in Steps S1006 and S1007 are both YES, it can be concluded that the vehicle is turning at some speed. In such a condition, the absolute value of the rotational angle δH of the steering shaft 158 must be 10° or more. Accordingly, if the result of determination in Step S1008 is YES, it is determined that the steering angle sensor 154 is in trouble, and thus the abnormality flag FW is set in the aforesaid Step S1009.

Figure 40:
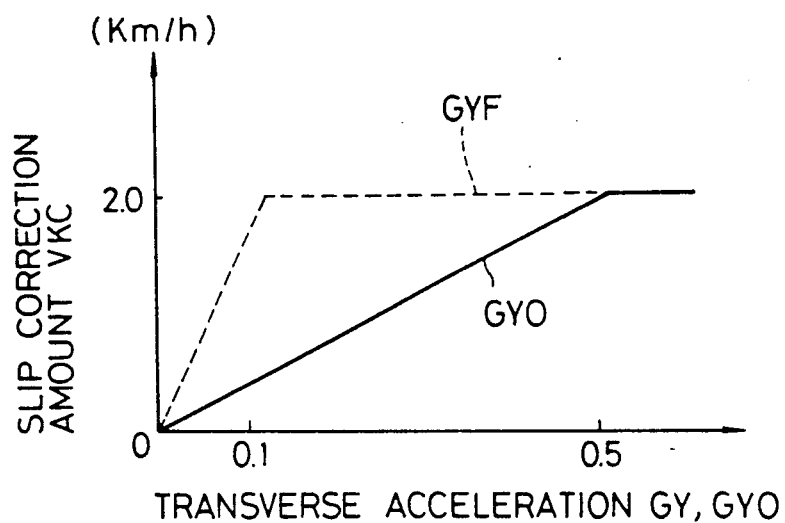
FIG. 40 is a graph showing a slip correction amount with respect to the transverse acceleration of the vehicle.

After Step S1009 is executed, the corrected actual transverse acceleration GYF, instead of the target transverse acceleration GYO, is used to calculate the second target torque TOC for the turning control. As shown in the map of FIG. 40, in a region in which the target transverse acceleration GYO is small, the slip correction amount VKC corresponding to the actual transverse acceleration GY (GYF) is set to a larger value than the slip correction amount VKC corresponding to the target transverse acceleration GYO. This is because the steering wheel 160 may be oversteered by the driver when the actual transverse acceleration GY (GYF) is calculated.

When the vehicle speed V is in a very low-speed region, the acceleration performance of the vehicle is preferably ensured, while when the vehicle speed V reaches a region of some high speed, the turning of the vehicle should preferably be facilitated with the acceleration performance restrained. Accordingly, in this modification, the slip correction amount VKC read from the map of FIG. 40, i.e., the slip correction amount VKC supplied from the correcting section 222 in FIG. 36A, is further multiplied by a correction coefficient read from a map of FIG. 43 in accordance with the vehicle speed V, to obtain a corrected slip correction amount VKF. Thus, the slip correction amount VKF, not the slip correction amount VKC, is actually supplied to the aforesaid subtracted 236, and the target front-wheel speed VFS(n) is calculated according to the following equation:

$$VFS(n) = VFO(n) + VK - VKF.$$

Figure 43:
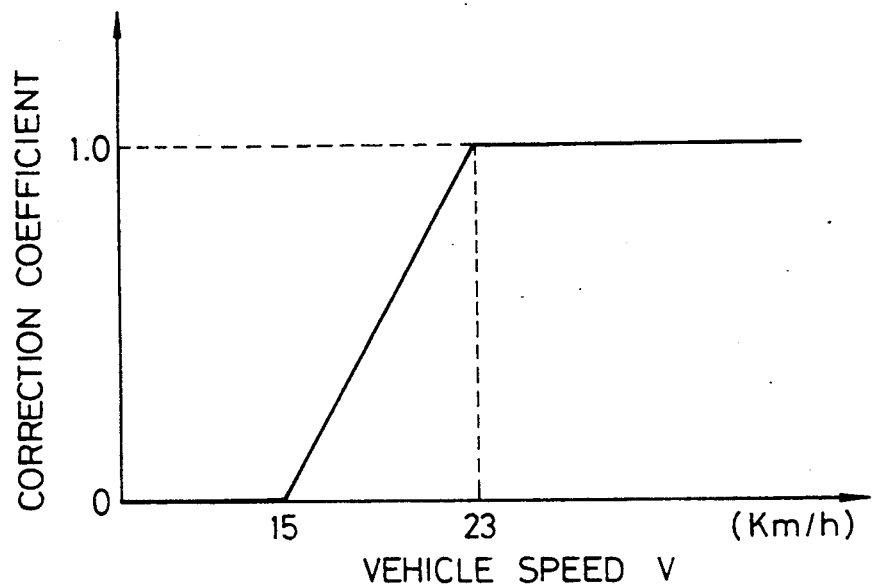
FIG. 43 is a graph showing a correction factor for the vehicle speed.

In the block diagram of FIG. 36A, the function of the correction coefficient obtained from the map of FIG. 43 is represented by the switch 310.

Since the target front-wheel speed VFS(n) is calculated taking the slip correction amount VKF into account, it is reduced in accordance with the vehicle speed V, whereby stable vehicle turning is ensured though the acceleration performance is slightly lowered. Namely, in this case, the slip factor S of the front wheel FW at vehicle turning can be made smaller than the target slip factor So used when the vehicle is advancing straight.

Figure 44:
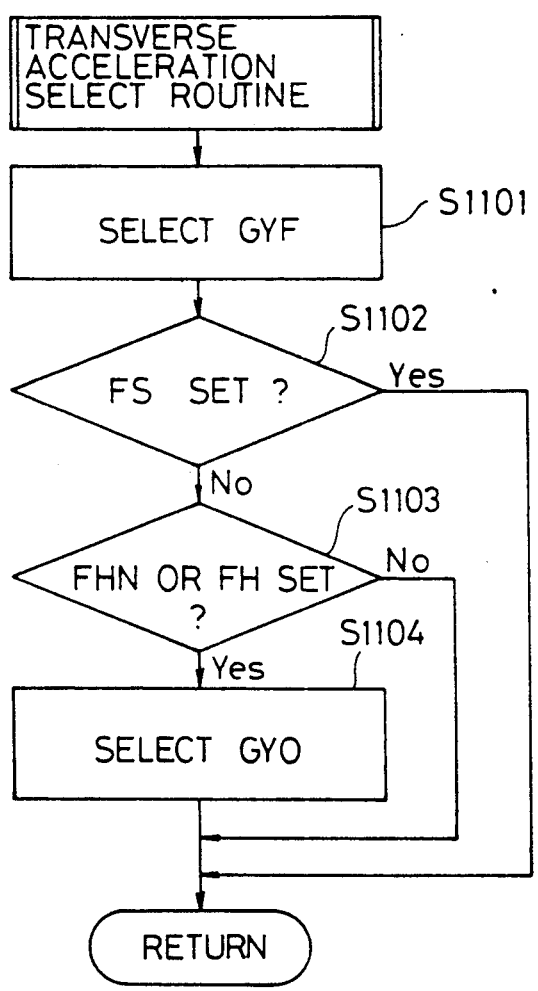
FIG. 44 is a flowchart illustrating a selection routine for the transverse acceleration.

Now referring to FIG. 44, there is illustrated a routine for selecting the target transverse acceleration GYO or the actual transverse acceleration GYF for the calculation of the slip correction amount VKC in the correcting section 22. The following is a description of this routine.

TRANSVERSE ACCELERATION SELECT ROUTINE

This select routine is executed as a subroutine of the arithmetic routine in Step S40 of FIG. 5. First, in Step S1101, the actual transverse acceleration GYF supplied from the aforementioned filter section 308 is selected. Then, in Step S1102, it is determined whether or not the control flag FS for the slip control is set. If YES, in Step S1102, the select routine is ended and the program returns to the arithmetic routine from which the select routine branched. Thus, when the slip control is effected, the actual transverse acceleration GYF is selected as the transverse acceleration. This serves to prevent the slip correction amount VKC from being greatly varied when the selected transverse acceleration changes from the actual transverse acceleration GYF to the target transverse acceleration GYO during the slip control, and thereby prevent an undesirable disturbance in the operation of the vehicle.

If the result of determination in Step S1102 is NO, that is, if the slip control is not being affected it is determined in Step S1103 whether or not either of the learning completion flag FHN and the learning flag FH is set. If NO in Step S1103, the actual transverse acceleration GYF is employed as the transverse acceleration.

On the other hand, if the result of determination in Step S1103 is YES, the target transverse acceleration GYO is selected as the transverse acceleration in Step S1104.

Figure 45:
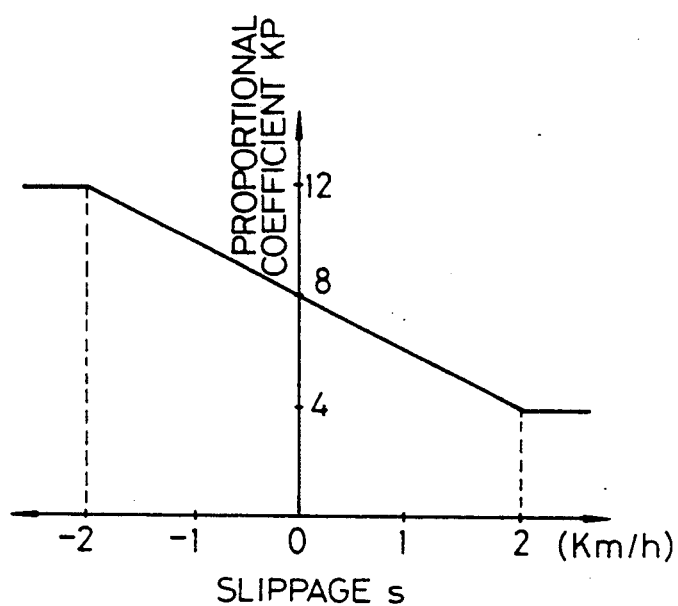
FIG. 45 is a graph showing a proportional coefficient in relation to the slippage.

Subsequently, the target front-wheel speed VFS(n) and the actual front-wheel speed VF, which is obtained by subjecting the determination signal from the front-wheel rotation sensor 126 to filtering process, are supplied to the subtractor 238 to obtain a slippage s(n) at this point of time. Thereafter, as described with reference to the block diagram of FIG. 8B, the slippage s is supplied to the clipping section 240 and the multipliers 242 and 244, to be converted into a proportional correction torque TP(n). In this modification, the proportional coefficient KP, which is not described in detail in connection with the multiplier 242 in FIG. 8B, is read from a map shown in FIG. 45.

Figure 46:
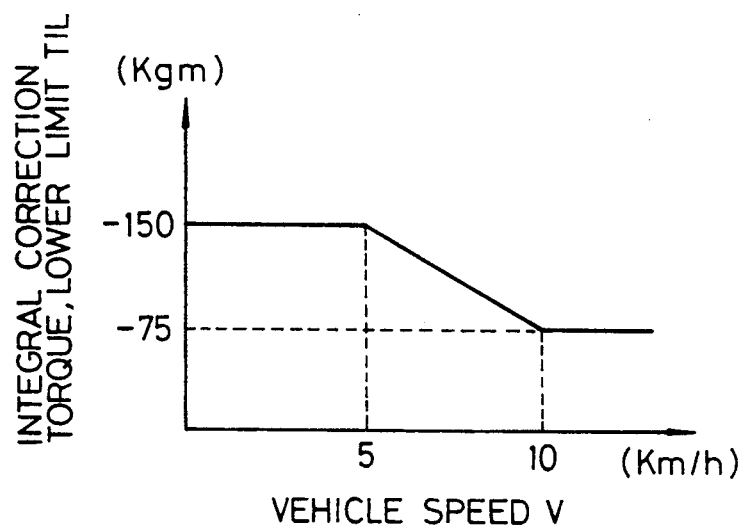
FIG. 46 is a graph showing a lower limit for the integral correction torque in relation to the vehicle speed.
Figures 47, 48:
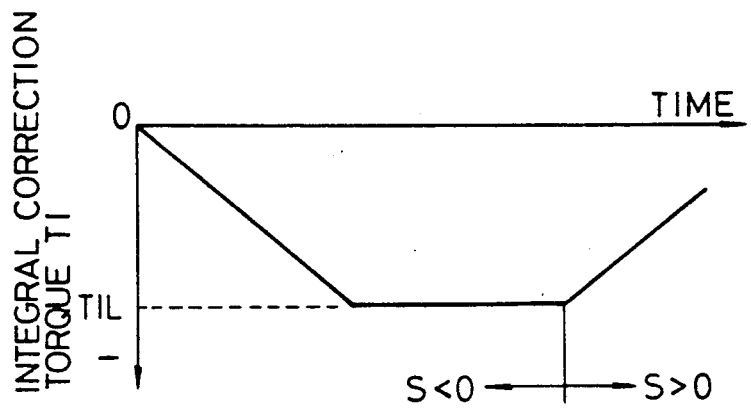
FIG. 47 is a graph showing a change of the integral correction torque with time.
FIG. 48 is a map showing correction factors for the proportional control and differential control, and torque converter ratios, in relation to the gear ratios of the automatic transmission.

The slippage s(n) is converted into an integral correction torque TI via the integrating section 310 and the multiplier 250, to accomplish a correction corresponding to a moderate change of the slippage. The integrating section 310 and the integrating section 258 in FIG. 8B have a similar function but differ from each other only in the way the lower limit for the integral correction torque TI is set. Namely, in the integrating section 258, the lower limit for the integral correction torque TI is set to a fixed value (−100 kgm), while in the integrating section 310, the lower limit TIL for the integral correction torque TI is varied in accordance with the vehicle speed V. For example, the lower limit value TIL is read from a map shown in FIG. 46. When the vehicle is started, particularly on an uphill road, the integral correction torque TI has a great influence on the first target torque TOS(n), as seen from the map of FIG. 46, and thus the driving torque of the engine 2 can be fully enjoyed. On the other hand, after the vehicle speed V reaches a certain level after the start of the vehicle, the influence of the integral correction torque TI on the first target torque TOS(n) is lessened, to thereby ensure the stability of the slip control. FIG. 47 shows a change of the integral correction torque TI with time.

The integral correction torque TI and the proportional correction torque TP are supplied to the adder 312, whereupon a proportional integral torque TPI(n) at this point of time is calculated.

Further, in this embodiment, the slippage s(n) output from the subtracter 238 is supplied to the differentiating section 246 and the multiplier 248, to obtain a rate GS(n) of change of the slippage. The rate GS(n) of change of the slippage is supplied to a clipping section 314 through the multiplier 248, whereupon a derivative correction torque TD(n) (=Gs·KD) at this point of time is calculated. The correction coefficient KD is a constant.

In this modification, the correction coefficients ρKI and ρKP are read from a map shown in FIG. 48, not from the map of FIG. 17, in accordance with the speed reduction ratio ρm of the automatic transmission 6.

The derivative correction torque TD(n) and the proportional integral torque TPI(n) are supplied to the adder 316, whereupon a final correction torque TPID(n) is obtained. The final correction torque TPID(n) and the reference driving torque TB supplied from the variable clipping section 302 are supplied to the subtracter 264, whereupon the final correction torque TPID(n) is subtracted from the reference driving torque TB(n). The result of the subtraction in the subtracter 264 is multiplied by the reciprocal of the sum total of the reduction ratios between the engine 2 and the front wheels FW in the multiplier 318, to obtain a first target torque TOS(n) for the slip control.

The calculations in the subtracter 264 and the multiplier 318 can be collectively expressed by the following equation.

$$TOS(n) = (TB(n) - TPID(n))/(\rho m \cdot \rho d \cdot \rho T) \quad (11)$$

where ρT represents the torque converter ratio. The speed reduction ratio ρm is selected in the same manner as described with reference to the multiplier 266 in FIG. 8B.

When calculating the proportional correction torque TP, the slippage s is clipped by the lower limit value, as described above. Accordingly, the calculated correction torque TP serves to reduce the value of the first target torque TOS(n) lest a large slip of the front wheels FW should not occur. The integral correction torque TI, on the other hand, is clipped by the upper limit value, and thus the correction torque TI serves to increase the first target torque TOS(n) such that the front wheels FW slip. The integral correction torque TI is also clipped by the lower limit value TIL, which is varied in accordance with the vehicle speed V. Accordingly, when the vehicle is started on an uphill road, the driving torque of the engine 2 is fully utilized, and after the start, the stability of the slip control is ensured, as mentioned above.

The calculated first target torque TOS(n) is naturally positive, and thus is clipped to a value equal to or larger than 0 in the clipping section 268.

The first target torque TOS(n) is then processed in a discriminating section 270 for discriminating the start/end of the slip control. The conditions for initiating and terminating the slip control, employed in the discriminating section 270, are the same as those explained with reference to the discriminating section shown in the block diagram of FIG. 8B.

Therefore, the arithmetic routine of FIG. 19 applies also to the first target torque TOS calculated in the manner shown in the block diagrams of FIGS. 36A and 36B.

Figure 22:
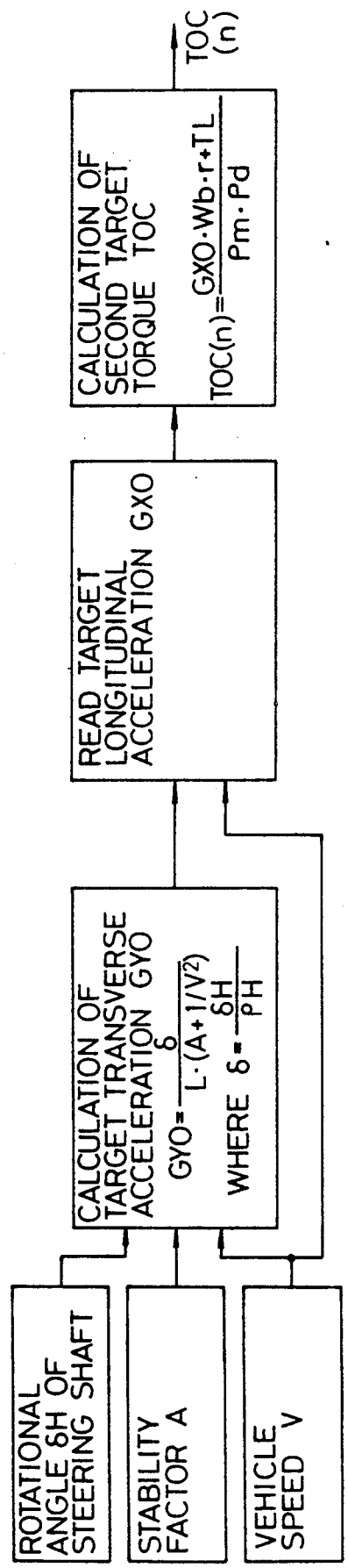
FIG. 22 is a block diagram illustrating the procedure of the first step in the arithmetic routine of FIG. 20.
Figure 49:
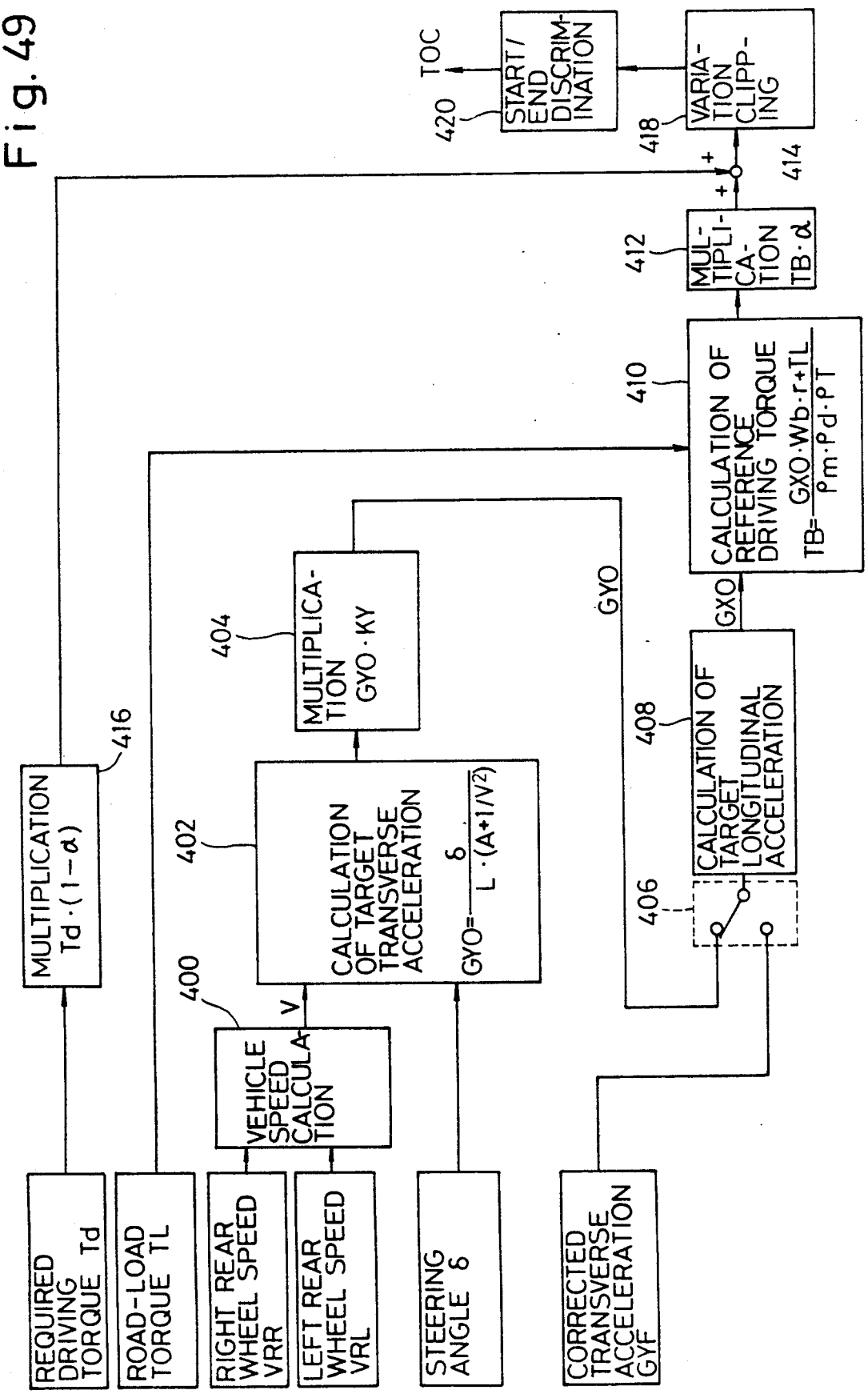
FIG. 49 is a block diagram showing a modification of the target torque calculation procedure.

Referring now to FIG. 49, there is illustrated a modification of the block diagram of FIG. 22, for the calculation of the second target torque TOC(n).

As seen from the block diagram of FIG. 49, first, a vehicle speed V is calculated in a vehicle speed calculating section 400, according to the aforesaid equation (1). The vehicle speed V is supplied to a calculating section 402 for a target transverse acceleration, which is also supplied with the steering angle δ calculated according to equation (2). Thus, in the calculating section 402, a target transverse acceleration GYO is calculated according to equation (3). In this case, the stability factor A in equation (3) is set in the calculating section 402 in a manner similar to that described with reference to FIG. 22.

Figure 50:
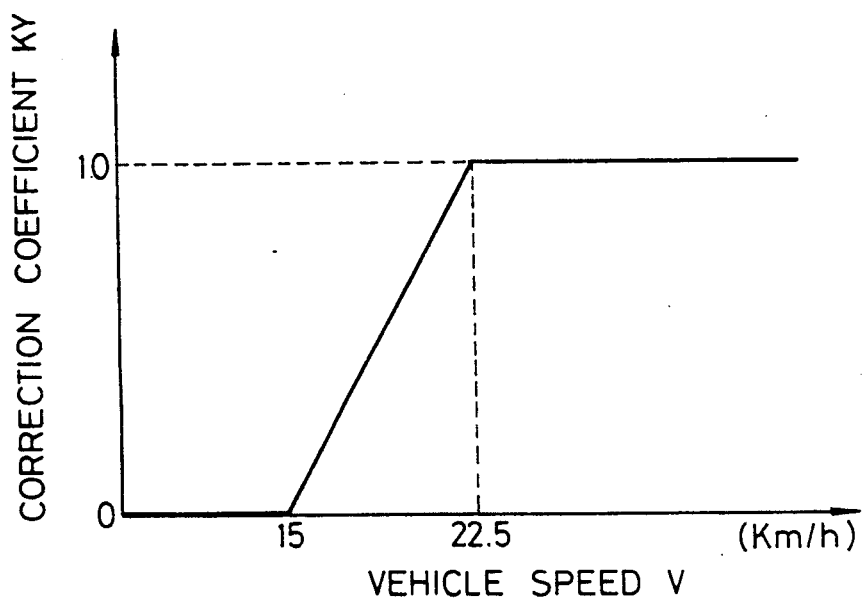
FIG. 50 is a graph showing the correction factor for the vehicle speed.

The target transverse acceleration GYO is then supplied to a multiplier 404, whereupon it is multiplied by a correction coefficient KY for correction. The correction coefficient KY is read from a map shown in FIG. 50 in accordance with the vehicle speed. If the turning control of the vehicle is restrained or inhibited in a low vehicle speed region of less than 22.5 km/h, for example, the vehicle acceleration can be fully enjoyed when the vehicle is to turn to the right or left at a crowded intersection, allowing the vehicle to quickly go through the intersection. Therefore, the correction coefficient KY is gradually reduced as the vehicle speed V decreases from 22.5 km/h, as shown in the map of FIG. 50.

The value of the target transverse acceleration GYO calculated on the basis of the steering angle δ before the learning correction for the neutral position δM of the steering shaft 158 is initiated lacks reliability, as mentioned before. Accordingly, the turning control based on the target acceleration GYO should not preferably be affected. However, the turning control of the vehicle is sometimes required even when the vehicle is to move on a winding road immediately after the start. Nevertheless, the conditions for initiating the learning correction for the neutral position δM remain unfulfilled for a long time in the above running state, as noted from the foregoing description, so that the execution of the turning control is delayed.

Therefore, in this modification, the corrected actual transverse acceleration GYF supplied from the filter section 308 in the block diagram of FIG. 36A is used, instead of the target transverse acceleration GYO calculated in the calculating section 402, until the learning correction of the neutral position δM is executed. Namely, as seen from FIG. 49, the target transverse acceleration GYO corrected by the multiplier 404 and the actual transverse acceleration GYF are supplied to a changeover switch 406, whereupon one of the target transverse acceleration GYO and the actual transverse acceleration GYF is selected. When the learning correction of the neutral position δM is executed in accordance with the arithmetic routine of FIGS. 32, 33 and 7, the changeover switch 406 selects the actual transverse acceleration GYF on condition that the learning completion flag FHN and the learning flag FH are both reset. When one of the flags FHN and FH is set, the changeover switch 406 selects the target transverse acceleration GYO.

When the road on which the vehicle is running changes from a dry road into a slippery road or low-μ road, such as a frozen road, the target transverse acceleration GYO becomes larger than the actual transverse acceleration GYF. Therefore, a determination is made as to whether or not the target transverse acceleration GYO is larger than, e.g., (GYF −2), and when the result of this determination is YES, it can be concluded that the road is a low-μ road, in which case a turning control suited to the low-μ road may be executed as required.

More specifically, whether the road on which the vehicle is running is a low-μ road or not may be determined as follows. A threshold value is set by adding 0.05 g, for example, to the actual transverse acceleration GYF calculated according to equation (10), and when the target transverse acceleration GYO becomes larger than the threshold value, it is determined that the vehicle is running on a low-μ road.

Figure 51:
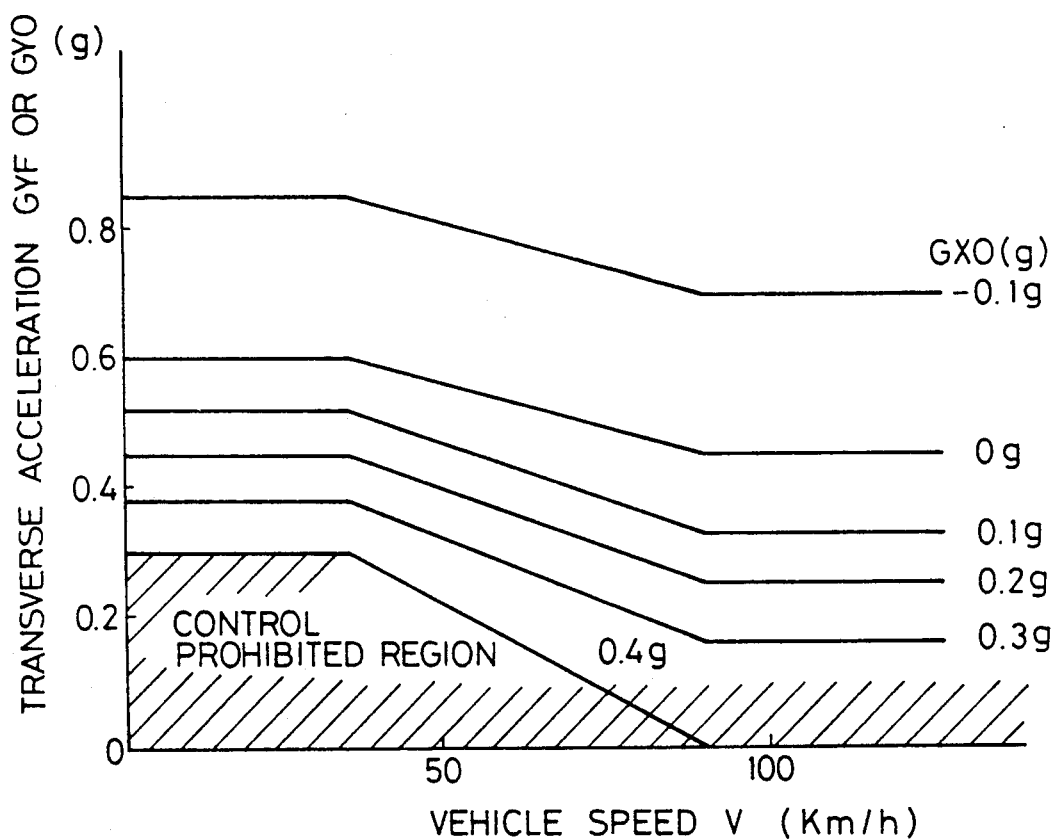
FIG. 51 is a graph showing a target longitudinal acceleration of the vehicle calculated from the vehicle speed and transverse acceleration.

When one of the target transverse acceleration GYO and the actual transverse acceleration GYF is selected by the changeover switch 406, the selected transverse acceleration is supplied to a calculating section 408, whereupon a target longitudinal acceleration GXO is calculated. Specifically, the target longitudinal acceleration GXO is read from a map shown in FIG. 51, in accordance with the vehicle speed V and the transverse acceleration. The target longitudinal acceleration GXO is then supplied to a calculating section 410, whereupon a reference driving torque TB of the engine 2 is calculated according to the following equation:

$$TB = (GXO \cdot Wb \cdot r + TL)/(\rho m \cdot pd \cdot pT) \quad (12)$$

where TL represents the road-load torque read from the map of FIG. 25 in accordance with the actual transverse acceleration GY, as mentioned above.

When the reference driving torque TB is calculated in this manner, no matter which of the target transverse acceleration GYO and the corrected actual transverse acceleration GYF is selected by the changeover switch 406, the driver's intention, i.e., the driving torque of the engine 2 required by the driver, is not at all reflected in the reference driving torque TB, because the reference torque TB is calculated based merely on the vehicle speed V and the steering angle δ, i.e., the rotational angle δH of the steering shaft 158, or on the rear-wheel speed difference. Therefore, if the second target torque TOC(n) for the present point of time is calculated on the basis of the reference driving torque TB and the turning control of the vehicle is executed in accordance with the calculated second target torque TOC(n), the driver may not be satisfied with the drivability of the vehicle.

Figure 18:
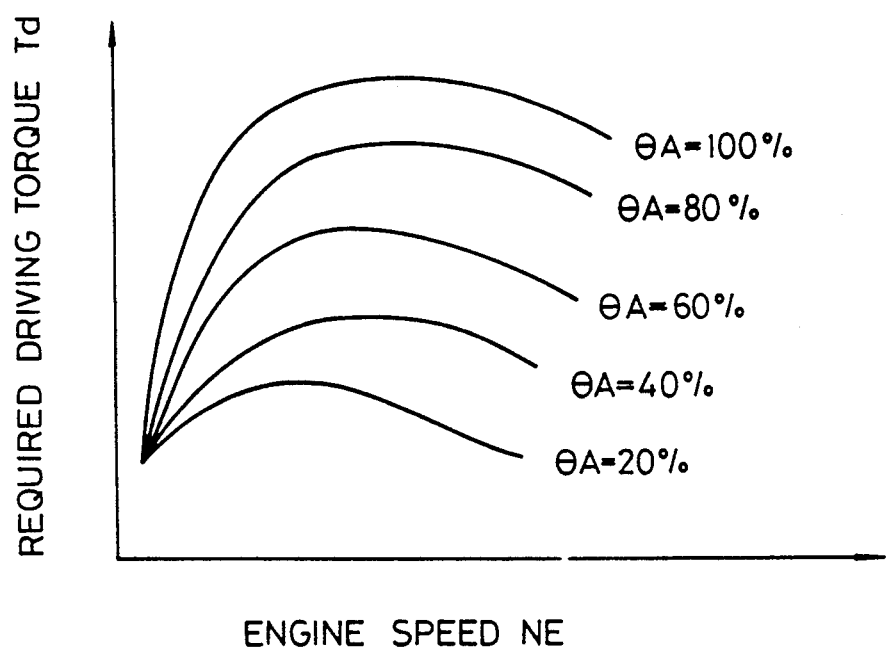
FIG. 18 is a graph showing the relationship between the engine rotation speed and required driving torques.

In this modification, therefore, the second target torque TOC(n) is calculated on the basis of both the reference driving torque TB and the required driving torque Td read from the map of FIG. 18. More specifically, as shown in FIG. 49, the reference driving torque TB is supplied to a multiplier 412, whereupon it is multiplied by a weighting factor α, and the result is supplied to an adder 414. The required driving torque Td is supplied to a multiplier 416, whereupon it is multiplied by a weighting factor (1−α), and the result is supplied to the adder 414. Thus, in the adder 414, the second target driving torque TOC(n) is calculated according to the following equation:

$$TOC(n) = \alpha \cdot TB + (1-\alpha) \cdot Td \quad (13).$$

When the road on which the vehicle is running is a high-μ road, the weighting factor α is set to 0.6 or thereabouts. In this case, the ratio of the reference driving torque TB and the required driving torque Td to the second target torque TOC(n) is 6:4, as seen from the above equation.

If the amount of variation of the second target torque TOC(n), which is calculated in each sampling period of the main timer, i.e., 15 msec, is large, an acceleration/deceleration shock on the vehicle is also large, possibly spoiling the ride feeling. Therefore, in this modification, the second target torque TOC(n) derived from the adder 414 is supplied to a variation clipping section 418. In the clipping section 418, first, a deviation ΔT between the second target torque TOC(n) calculated this time and the second target torque TOC(n−1) calculated in the preceding cycle is obtained. If the absolute value of the deviation ΔT, i.e., |ΔT|, is smaller than an allowable value TK, the second target torque TOC(n) calculated this time is output directly from the clipping section 418, but if the deviation ΔT is still smaller than the negative allowable value −TK, the second target torque TOC(n) for the present cycle is calculated according to the following equation:

$$TOC(n) = TOC(n-1) - TK.$$

When the deviation ΔT is greater than the allowable value TK, the second target torque TOC(n) for the present cycle is calculated according to the following equation:

$$TOC(n) = TOC(n-1) + TK.$$

As is evident from the above two equations, a variation of the second target torque TOC(n) output from the clipping section 418 is restricted to within the range equivalent to the allowable value TK, whereby an acceleration/deceleration shock accompanying an increase/decrease of the driving torque of the engine 2 can be prevented.

To restrict the longitudinal acceleration GXO of the vehicle to 0.1 g/sec, the allowable value TK is calculated according to the following equation based on the aforementioned equation (12):

$$TK = 0.1 \cdot Wb \cdot r \cdot \Delta t/(\rho m \cdot pd \cdot pT).$$

The second target torque TOC(n) output from the clipping section 418 is supplied finally to a discriminating section 420 for discriminating the start/end of the turning control. In this section 420, when all of the below-mentioned conditions (a) through (d) are fulfilled, it is determined that the turning control should be initiated.

(a) The second target torque TOC(n) takes a value equal to or smaller than a value obtained by subtracting a threshold value, e.g., 2 kgm, from the required driving torque Td.

(b) The manual switch 156 is operated by the driver, and thus the execution of the turning control is desired.

(c) The idle switch 124 is off.

(d) The system for executing the turning control functions properly.

When either of the following conditions (e) and (f) is fulfilled, the discriminating section 420 determines that the turning control should be stopped.

(e) The second target torque TOC(n) has a quantity equal to or larger than the required driving torque Td.

(f) The system for the turning control does not function properly.

Figure 52:
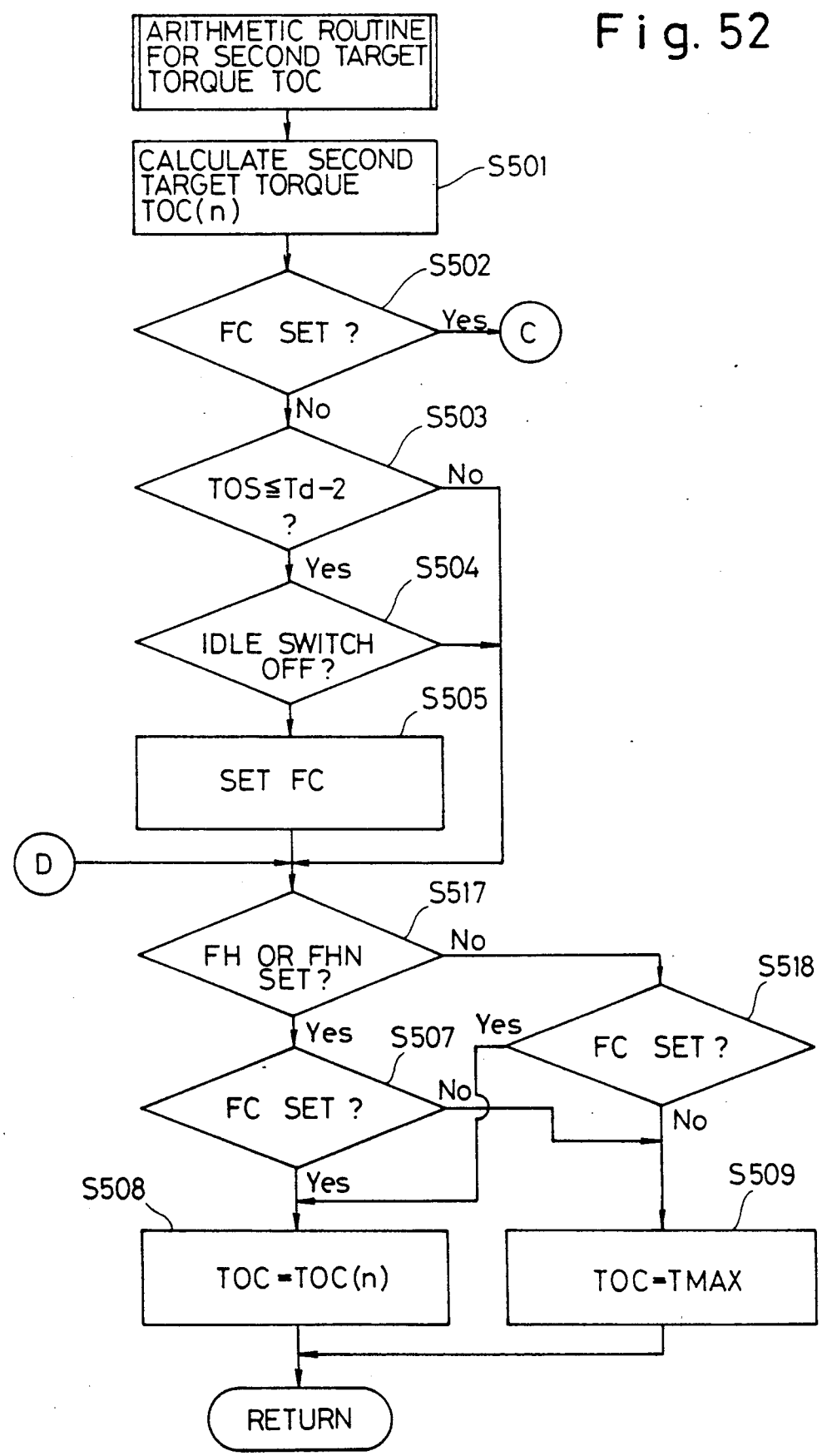
FIG. 52 is a flowchart showing, a relation to the block diagram of FIG. 49, a modification of the routine of FIG. 20.

The function of the discriminating section 420 will be apparent from the arithmetic routine for the second target torque TOC shown in FIG. 52, taken in conjunction with the flowchart of FIG. 21. The function of the discriminating section 420 is basically the same as the arithmetic routine shown in FIGS. 20 and 21, and differs only in part from the flowchart of FIG. 20. Accordingly, in FIG. 52, like step numbers are used to denote like operations executed in the flowchart of FIG. 20, and description is made only for the operations unique to FIG. 52.

In Step S501 of FIG. 52, a second target torque TOC(n) at the present point of time is calculated. This target torque TOC(n) is the value output from the adder 414 of FIG. 49.

In the flowchart of FIG. 52, Step S506 of FIG. 20 is replaced by Step S517. In Step S517, it is determined whether or not either of the learning completion flag FHN and the learning flag FH is set. Namely, in this modification, the neutral position $\delta M$ of the steering shaft 158 is corrected by learning in accordance with the learning routine of FIGS. 32, 33 and 7.

If the result of determination in Step S517 is YES, Step S507 is executed, as in the case of FIG. 20, but if the result of determination in Step S517 is NO, Step S518 is executed, unlike the case of FIG. 20. When the result of determination in Step S507 is YES and thus Step S508 is executed, the second target torque TOC, i.e., TOC(n), is calculated based on the target transverse acceleration GYO. Namely, when the result of determination in Step S517 is YES, the reliability of the steering angle $\delta$ calculated according to equation (2) is ensured. Accordingly, in this case, the changeover switch 406 in FIG. 49 is connected so as to select the target transverse acceleration GYO, so that the second target torque TOC(n) is calculated based on the target transverse acceleration GYO in the calculating section 408.

If the result of determination in Step S517 is NO, the program proceeds to Step S518, whereupon it is determined whether or not the control flag FC is set. If YES in Step S518, Step S508 is executed. In this case, the second target torque TOC, i.e., TOC(n), is calculated based on the corrected actual transverse acceleration GYF, and not the target transverse acceleration GYO, in Step S518. Namely, when the result of determination in Step S517 is NO, the value of the steering angle $\delta$ lacks reliability, and accordingly, the changeover switch 406 in FIG. 49 is connected so as to select the actual transverse acceleration GYF, whereby the calculating section 408 calculates the target longitudinal acceleration GXO, i.e., the second target torque TOC(n), on the basis of the actual transverse acceleration GYF.

If the result of determination in Step S518 is NO, the program proceeds to Step S509, whereupon the maximum driving torque TMAX of the engine 2 is set as the second target torque TOC.

When calculating the second target torque TOC for the turning control, the required driving torque Td may be ignored for the simplicity of calculation procedure. In this case, the second target torque TOC is calculated based solely on the reference driving torque TB calculated in the calculating section 410 in FIG. 49.

If the required driving torque Td is to be used in the calculation of the second target driving torque TOC, as in the above modification, the weighting factor $\alpha$ should not necessarily be a fixed value. For example, the value of the weighting factor $\alpha$ may be gradually reduced as time elapses after the start of the turning control or as the vehicle speed V rises, whereby the influence of the required driving torque Td upon the second target torque TOC can be progressively increased. Furthermore, the value of the weighting factor $\alpha$ may be maintained at a fixed value for some time after the start of the turning control, and thereafter gradually reduced with time. Moreover, if the value of the weighting factor $\alpha$ is increased as the rotational angle $\delta H$ of the steering shaft 158 increases, the stability of vehicle turning can be ensured particularly when the vehicle is running along a corner whose radius of curvature is progressively reduced.

In the above modification, a single second target torque TOC is calculated, but two second target torques, one for high-$\mu$ road and the other for low-$\mu$ road, may be calculated so that one of the two calculated torques is selected in accordance with the road surface conditions.

Furthermore, the variation of the target longitudinal acceleration GXO may be regulated in advance, instead of regulating the variation of the second target torque TOC(n), to prevent the acceleration/deceleration shock of the vehicle.

In the foregoing embodiment and modifications, the required driving torque Td is read from the map of FIG. 18 in accordance with the engine speed NE and the accelerator opening $\theta A$. In order to detect an accurate value of the required driving torque Td, it is first necessary that the accelerator opening $\theta A$ be accurately detected. Generally, there is a certain proportion between the detection signal from the accelerator opening sensor 146 and the accelerator opening $\theta A$. For example, the accelerator opening sensor 146 is mounted to the throttle body 20 such that when the accelerator opening $\theta A$ takes a value indicating a fully-closed state of the throttle valve 22, the accelerator opening sensor 146 outputs a signal or voltage of 0.6 V. If, however, the accelerator opening sensor 142 is once detached from the throttle body 20 at inspection or maintenance of the vehicle, it is practically impossible to attach the accelerator opening sensor 142 to the throttle body 20 in exactly the same condition as before. The mounted state of the accelerator opening sensor 142 also varies with time. Accordingly, in the below-described embodiment, the fully-closed position of the throttle valve 22, which is used as a reference position for the accelerator opening sensor 142, is corrected by learning, so that the reliability of the accelerator opening $\theta A$ calculated based on the detection signal from the accelerator opening sensor 142 is retained.

Figure 53:
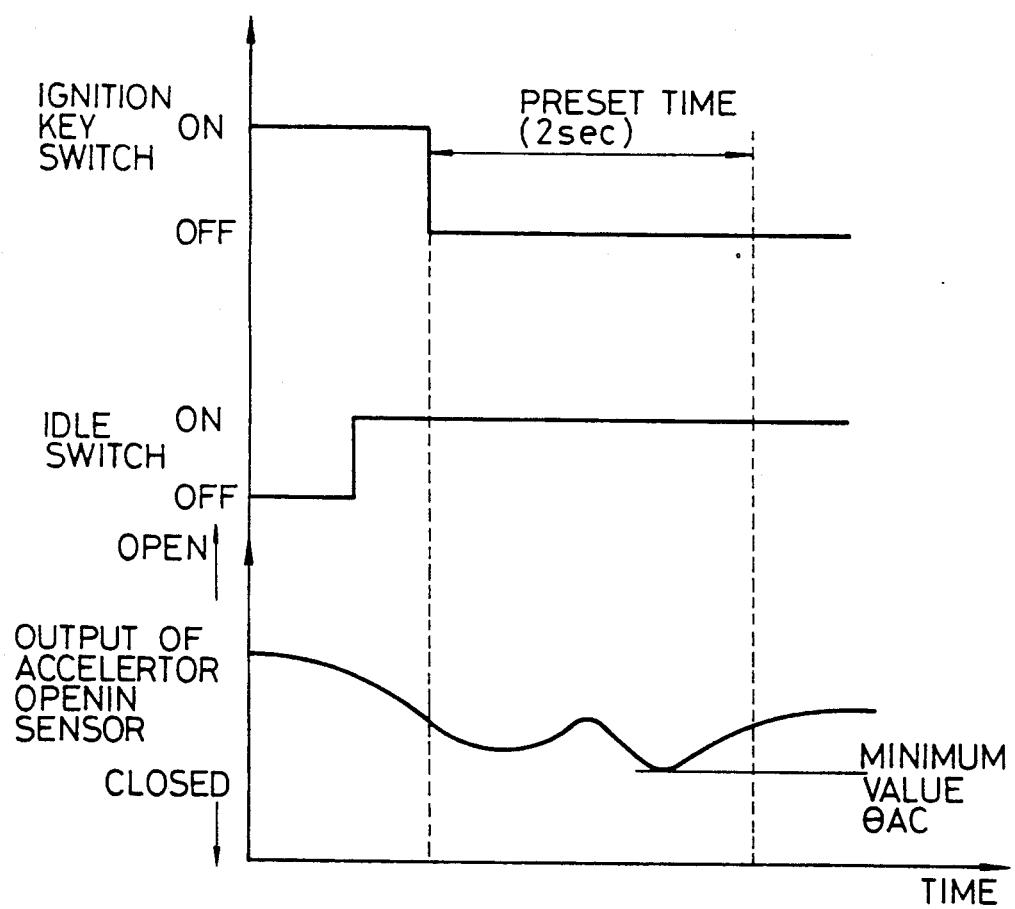
FIG. 53 is a timing chart showing on/off states of an ignition key switch and an idle switch and a change of the output from an accelerator opening sensor, for the explanation of a learning procedure for the fully-closed position value of the accelerator opening sensor.

FIG. 53 is a timing chart illustrating the learning procedure for the reference position, i.e., the fully-closed position, of the accelerator opening sensor 142. If the ignition key switch 134 is turned off while the idle switch 124 remains on, the TCL 142 starts monitoring the output of the accelerator opening sensor 146 for a predetermined time, e.g., 2 sec. This 2-second monitor time is a time for which the TCL 142 and the ECU 12 can operate with reliability even if the ignition key switch 134 is turned off.

When a detection signal of the accelerator opening sensor 146 is supplied to the TCL 142 during the monitor time, the TCL 142 sets a minimum value of the accelerator opening $\theta A$, calculated based on the detection signal, as a fully-closed position $\theta AC$. The value of the fully-closed position $\theta AC$ is transferred from the TCL 142 to the ECU 12 via the communication cable 144, and is stored in a backed-up random-access memory (RAM), not shown, in the ECU 12. The fully-closed position value $\theta AC$ is used as the reference value indicating the fully-closed position of the accelerator opening sensor 146, until the fully-closed position $\theta AC$ is detected next. Thus, taking the fully-closed position value $\theta AC$ into account, the TCL 142 calculates the accelerator opening $\theta A$ on the basis of the detection signal from the accelerator opening sensor 146.

Figure 54:
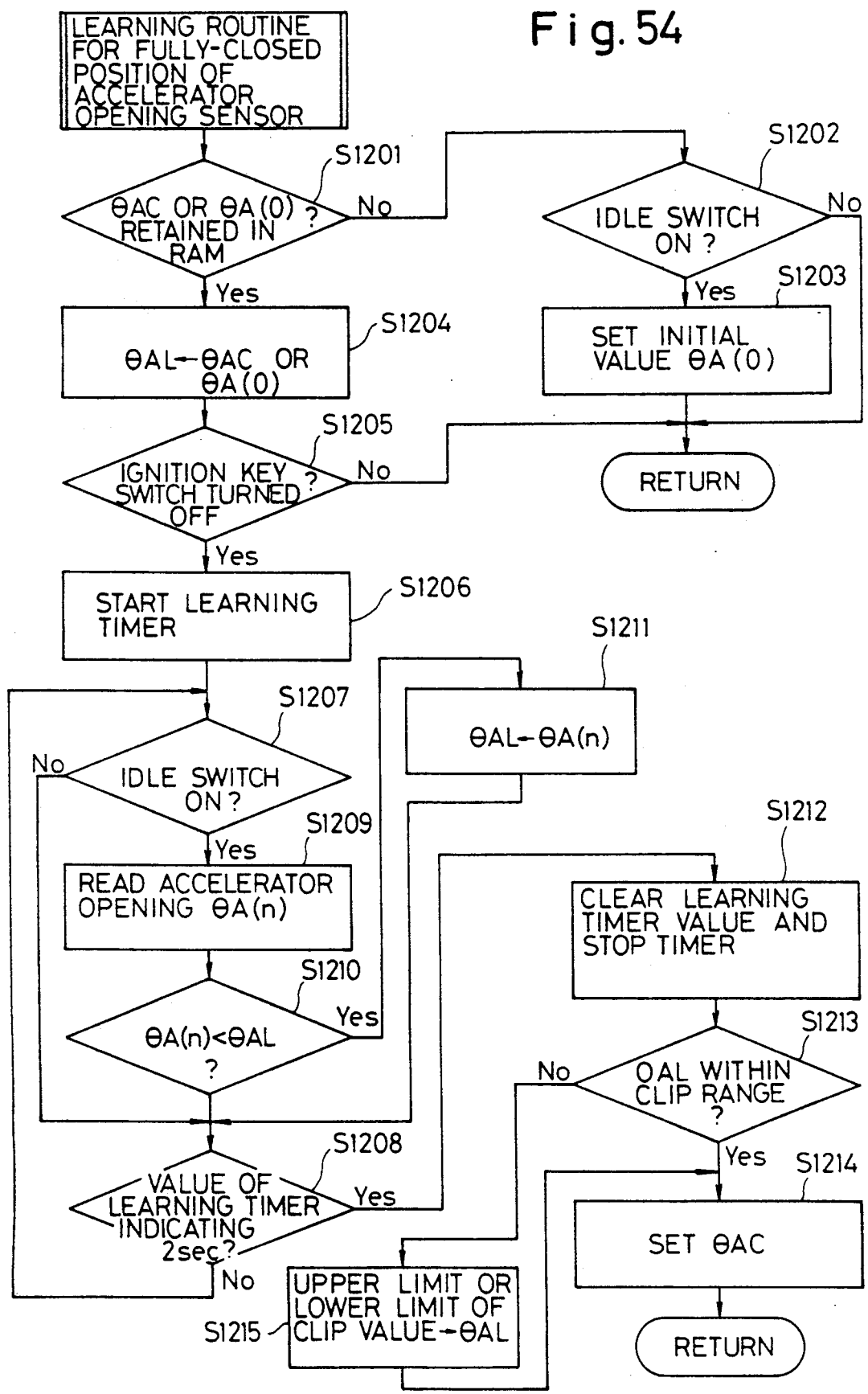
FIG. 54 is a flowchart illustrating the learning procedure for the fully-closed position value of the accelerator opening sensor.

When the battery (not shown) installed in the vehicle is detached, the content of the RAM, i.e., the value of the fully-closed position $\theta AC$, is lost, and thus the aforementioned arithmetic routine for the fully-closed position of the accelerator opening sensor 146 cannot be executed. Therefore, in this case, a learning routine shown in FIG. 54 is executed by the TCL 142. The following is a description of the learning routine for the fully-closed position of the accelerator opening sensor 146.

LEARNING ROUTINE FOR FULLY-CLOSED POSITION OF ACCELERATOR OPENING SENSOR

This learning routine is preferably executed between the learning routine of Step S30 and calculation routine of Step S40 in the main control routine of FIG. 5. First, in Step S1201, it is determined whether or not the aforesaid RAM stores data representing the fully-closed position value $\theta AC$ of the accelerator opening $\theta A$ or an initial value $\theta A(0)$ mentioned later. If NO in Step S1201, it is determined in Step S1202 whether or not the idle switch 142 is on. If the result of determination in Step S1202 is YES, the program proceeds to Step S1203, whereupon the accelerator opening $\theta A(0)$ calculated based on the detection signal from the accelerator opening sensor 146 is stored in the RAM as an initial value.

If the result of determination Step S1201 is YES, that is, if the RAM stores the fully-closed position value $\theta AC$ or Step S1203 is previously executed and thus the initial value $\theta A(O)$ has been set, Step S1204 is executed, whereupon the fully-closed position value $\theta AC$ or the initial value $\theta A(O)$ is set as a minimum value $\theta AL$ of the accelerator opening $\theta A$.

In a subsequent Step S1205, it is determined whether or not the ignition key switch 134 has been shifted from an on to an off position. If YES in Step S1205, that is, if the engine 2 is stopped, the program proceeds to Step S1206, whereupon a learning timer is started for counting.

Then, in Step S1207, it is determined whether or not the idle switch 124 is on. If NO in Step S1207, that is, if the accelerator pedal 54 is depressed at this point of time, the program proceeds to Step S1208. In Step S1208, it is determined whether or not the value in the learning timer has reached a preset value equivalent, for example, to 2 sec. If the result of determination in Step S1208 is NO, the program returns to Step S1207.

If the result of determination in Step S1207 is YES, an accelerator opening $\theta A(n)$ calculated based on the detection signal from the accelerator opening sensor 146 is read in Step S1209, and it is then determined in Step S1210 whether or not the accelerator opening $\theta A(n)$ is smaller than the minimum value $\theta AL$.

If the result of determination in Step S1210 is NO, the program proceeds directly to Step S1208, but if YES in Step S1210, the program proceeds to Step S1208 via Step S1211. In Step S1211, the accelerator opening $\theta A(n)$ is set as the minimum value $\theta / AL$. Accordingly, the accelerator opening $\theta A$ is repeatedly read at predetermined intervals, and the minimum value $\theta AL$ is updated depending on the result of the comparison between the accelerator opening $\theta A$ and the minimum value $\theta AL$, until the result of determination in Step S1208 becomes YES.

When the result of determination in Step S1208 becomes YES, the value in the learning timer is cleared and the operation thereof is stopped in Step S1215, and the program proceeds to Step S1213. In Step S1213, it is determined whether or not the minimum value $\theta AL$ falls within a preset clip range, e.g., a range from 0.3 to 0.9 V when the accelerator opening $\theta A$ is expressed in volts. If YES in Step S1213, the program proceeds directly to Step S1214, and if NO in Step S1213, the program first proceeds to Step S1215 and then to Step S1214.

In Step S1215, if the minimum value $\theta AL$ is larger than the upper limit value of the clip range, the upper limit value is set to a value equal to the minimum value $\theta AL$, and if the minimum value $\theta AL$ is smaller than the lower limit value of the clip range, then the lower limit value is set to a value equal to the minimum value $\theta AL$.

In Step S1214, the fully-closed position value $\theta AC$ is corrected or set in accordance with the minimum value $\theta AL$. Specifically, when the fully-closed position value $\theta AC$ is already set and is greater than the minimum value $\theta AL$, a value obtained by subtracting 0.1 V from the fully-closed position value $\theta AC$, when the opening values are measured in terms of voltage, is set as a new fully-closed position value $\theta AC$. Thus, the fully-closed position value $\theta AC$ is corrected according to the following equation:

$$\theta AC = \theta AC - 0.1.$$

On the other hand, when the initial value $\theta A(0)$ is not the fully-closed postion value $\theta AC$, is set and is greater than the minimum value $\theta AL$, a value obtained by subtracting 0.1 V from the initial value $\theta A(0)$ is set as the fully-closed position value $\theta AC$. Thus, the fully-closed position value $\theta AC$ is corrected according to the following equation:

$$\theta AC = \eta A(0) - 0.1.$$

When the fully-closed position value $\theta AC$, or the initial value $\theta A(0)$, is smaller than the minimum value $\theta AL$, the fully-closed position value $\theta AC$ is corrected or set according to the following equations:

$$\theta AC = \theta AC + 0.1.$$

$$\theta AC = \theta A(0) + 0.1.$$

$$\theta AC = \theta A(0) + 0.1.$$

As described above, upper and lower limits are provided for the minimum value $\theta AL$ of the accelerator opening $\theta A$, and accordingly, an erroneous learning correction of the fully-closed position value $\theta AC$ due to an abnormal-level detection signal from the accelerator opening sensor 146 can be prevented. Further, since the learning correction amount applied to each correction of the fully-closed position value $\theta AC$ is restricted to a fixed value, the learning correction is never adversely influenced by disturbance such as noise.

The aforementioned learning correction for the fully-closed position value $\theta AC$ is executed when the ignition key switch 134 is shifted from an on to an off state, but it may be executed at other times. For example, in the case wherein the vehicle has a sensor for determining whether or not the driver's seat is occupied, the steps following S1206 may be executed after it is determined that the driver has left the seat, to carry out a learning correction for the fully-closed position value $\theta AC$. For such a sensor, a sensor capable of detecting the pressure applied to the driver's seat or a change in shape of the driver's seat can be used.

Alternatively, the learning correction of the fully-closed position value $\theta AC$ may be executed at the time when the door lock (not shown) of the vehicle is manipulated from outside or is operated by a key entry system. Moreover, the learning correction of the fully-closed position value $\theta AC$ may be executed when all of the following conditions are fulfilled: (a) the select lever (not shown) of the automatic transmission 6 is in a neutral or parking position (in the case of a manual transmission, the shift level is in a neutral position); (b) the hand brake is applied; and (c) the air conditioner is turned off (the engine 2 is not in an idle-up state).

Referring to FIGS. 55 to 58, there is illustrated a modification of the select routine for the retard level described with reference to FIGS. 27 to 29. In this modification, the retard levels further include a level IV, in addition to the aforementioned levels I, II, and III. With the level IV, the retard amount for the ignition timing is set to the aforementioned basic retard amount PB and the throttle valve 22 is fully closed.

Figure 55:
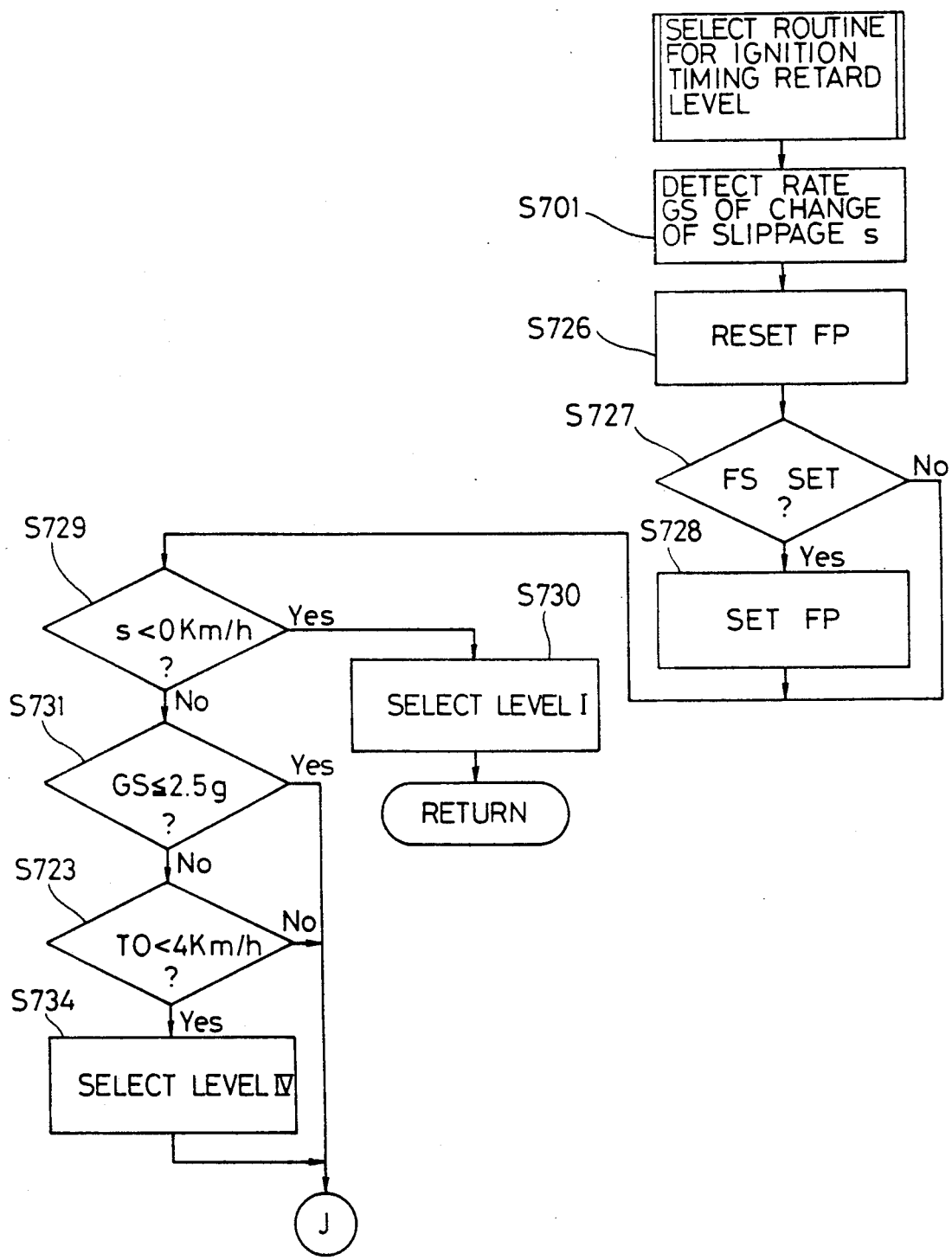
Figure 56:
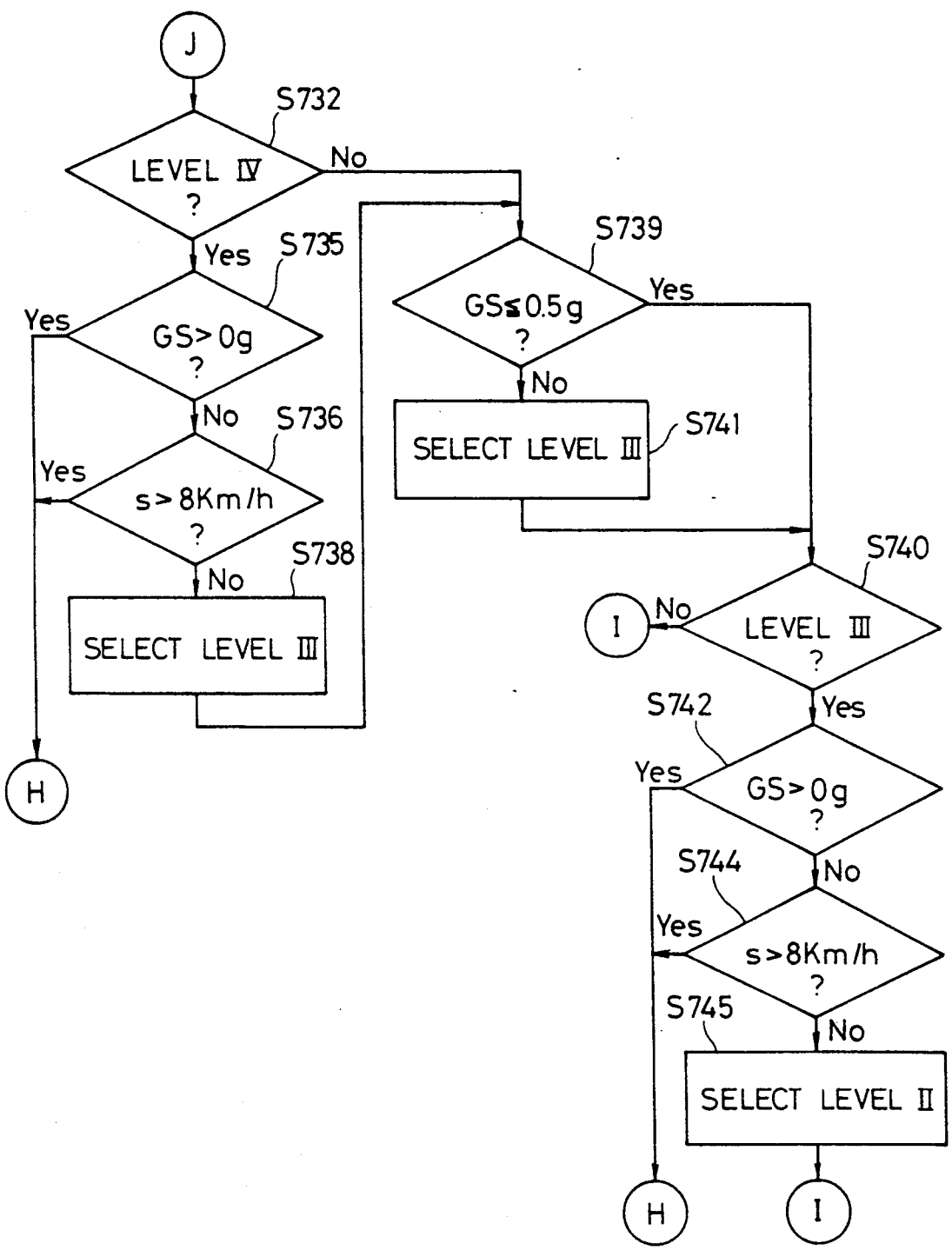
FIGS. 56 to 58 are flowcharts illustrating a modification of the selection routine shown in FIGS. 27 to 29.

First, in Step S701 of FIG. 55, the rate GS of change of the slippage s is detected, as in the case of the foregoing embodiment.

In Step S726, a control flag FP, which indicates that the ignition timing is being controlled, is reset. The program then proceeds to Step S727, whereupon it is determined whether or not the control flag FS is set. When the result of determination in Step S727 is YES, it indicates that the slip control is already executed, and accordingly, the control flag FP is set in Step S728, and then the program proceeds to Step S729. When the result of determination in Step S727 is NO, on the other hand, the program proceeds directly to Step S729, skipping Step S728.

In Step S729, it is determined whether or not the slippage s is smaller than 0 km/h. When the result of determination in Step S729 is YES, no inconvenience is caused if the driving torque of the engine 2 is increased, and in this case, the retard level I is set in Step S730. On the other hand, if the result of determination in Step S729 is NO, it is determined in Step S731 whether or not the rate GS of change of the slippage s takes a value equal to or smaller than 2.5 g. If YES in Step S731, the program proceeds to Step S732 of FIG. 56. When the result of determination in Step S731 is NO, it can be concluded that a sudden slip of the front wheels FW is occurring, and thus the program proceeds to Step S733. In Step S733, it is determined whether or not the final target driving torque TO is smaller than 4 kmg. If NO in Step S733, the program proceeds to Step S732 of FIG. 56. When the result of determination in Step S733 is YES, it is concluded that the driving torque of the engine 2 must be quickly reduced, and thus the program proceeds to Step S734, whereupon the retard level IV is selected, followed by the execution of Step S732.

In Step S732, it is determined whether or not the retard level is the level IV. If the result of determination in Step S732 is YES, it is determined in Step S735 whether or not the rate GS of change of the slippage s is larger than 0 g, i.e., whether or not the slippage s shows a tendency to increase. When the result of determination in Step S735 is NO, it is concluded that the slippage s is decreasing, and the program proceeds to Step S736. On the other hand, when the result of determination in Step S735 is YES, it is concluded that the slippage s is increasing, and the program proceeds to Step S737 of FIG. 58.

Figure 58:
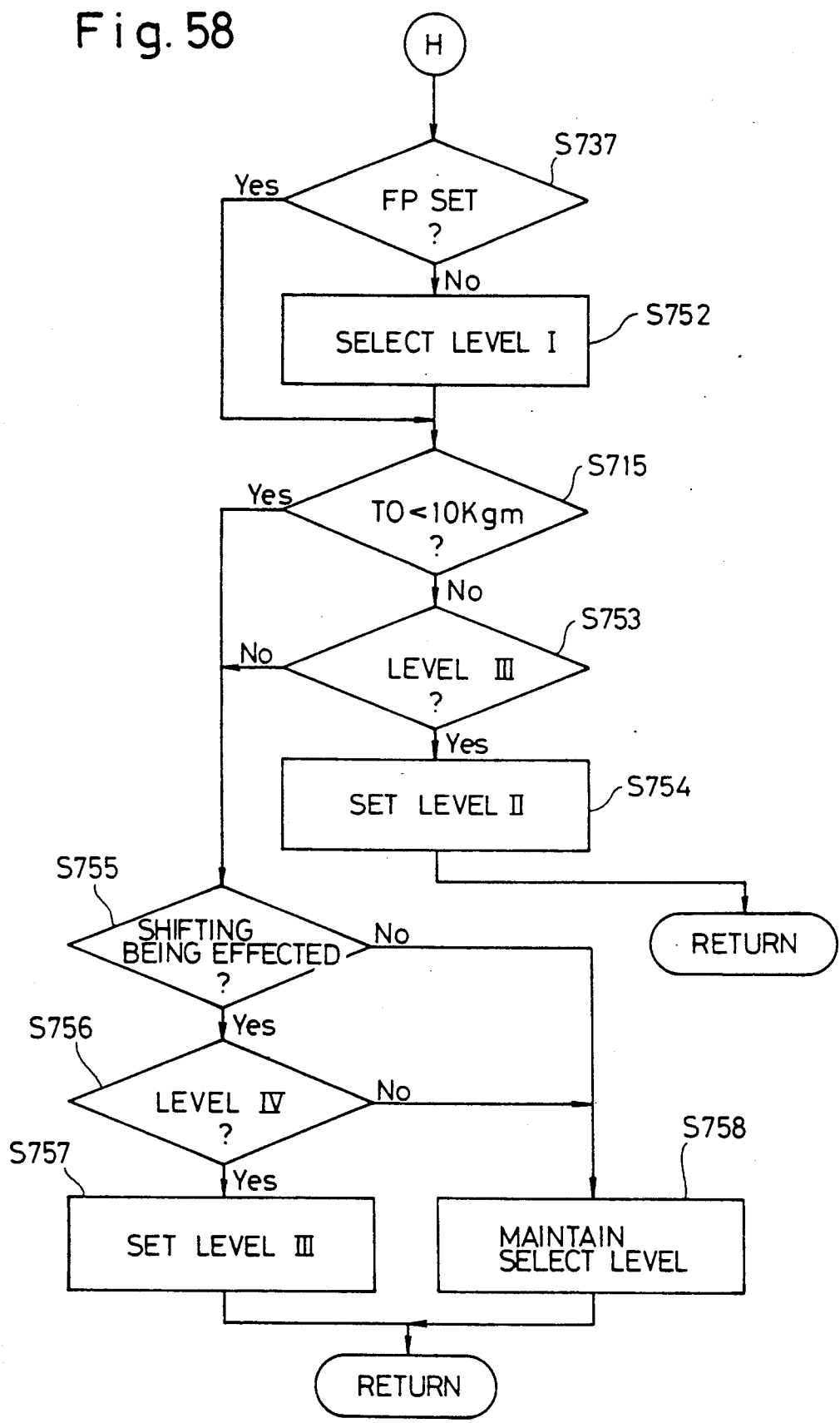

In Step S736, it is determined whether or not the slippage s is larger than 8 km/h, and if the result of the determination is YES, the program proceeds to Step S737 of FIG. 58. If the result of determination in Step S736 is NO, the retard level is switched from the level IV to the level III in Step S738, and the program proceeds to Step S739. When the result of determination in the aforesaid Step S732 is NO, the program proceeds directly to Step S739.

It is determined in Step S739 whether or not the rate GS of change of the slippage s takes a value equal to or smaller than 0.5 g. When the result of determination in Step S739 is YES, it is concluded that the change of the slippage s is not very severe, and Step S740 is executed. When the result of determination in Step S739 is NO, the retard level III is selected in Step S741, and then Step S740 is executed.

In Step S740, it is determined whether or not the selected retard level is the level III. If YES in Step S740, Step S742 is executed; if NO in Step S740, the program proceeds to Step S743 of FIG. 57.

In Step S742, it is determined whether or not the rate GS of change of the slippage s is larger than 0 g. When the result of determination in Step S742 is NO, it is concluded that the slippage s shows a tendency to decrease, and thus the program proceeds to Step S744, whereupon it is determined whether or not the slippage s is larger than 8 km/h. If NO in Step S744, the retard level is switched from the level III to the level II in Step S745, and the program proceeds to Step S743 of FIG. 57. If the results of determination in Steps S742 and S744 are both NO, the program proceeds to Step S737 of FIG. 58.

Figure 57:
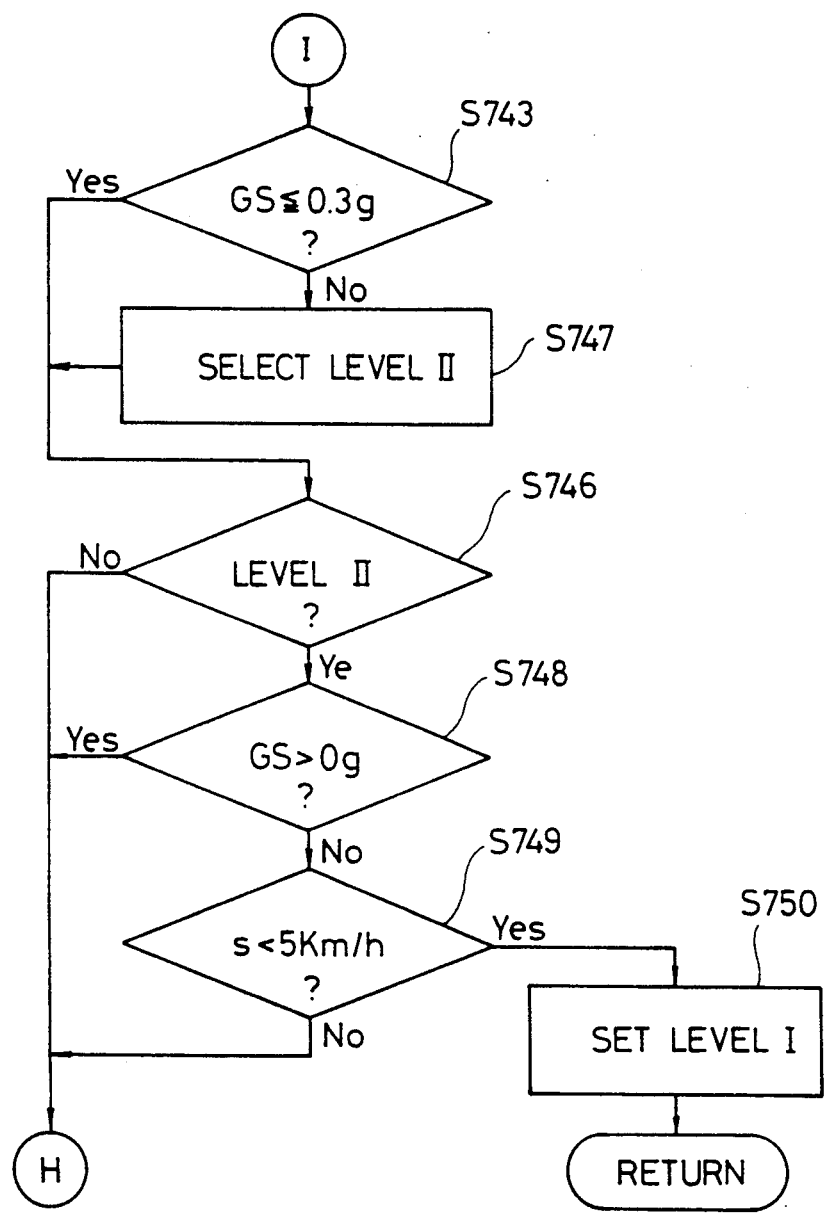

It is determined in Step S743 of FIG. 57 whether or not the rate GS of change of the slippage s takes a value equal to or smaller than 0.3 g. When the result of determination in Step S743 is YES, it is concluded that the slippage s is almost not increasing, and thus the program proceeds to Step S746. On the other hand, when the result of determination in Step S743 is NO, it is concluded that the slippage s is more or less increasing, and thus the retard level II is selected in Step S747, followed by the execution of Step S746.

In Step S746, it is determined whether or not the selected retard level is the level II. If YES in Step S746, it is determined in Step S748 whether or not the rate GS of change of the slippage s is larger than 0 g. When the result of determination in Step S748 is NO, it is concluded that the slippage s shows a tendency to decrease, and thus the program proceeds to Step S749, whereupon it is determined whether or not the slippage s is smaller than 5 km/h. When the result of determination is Step S749 is YES, it is concluded that the front wheels FW scarcely slip, and thus the retard level I is set in Step S750.

When the result of determination in Step S746 or S749 is NO or when the result of determination in Step S748 is YES, the program proceeds to Step S737 of FIG. 58.

In Step S737, it is determined whether or not the control flag FP is set: If YES in Step S737, Step S751 is directly executed; if NO in Step S737, Step S751 is executed after the retard level I is selected in Step S752.

It is determined in Step S751 whether or not the final target driving torque TO is smaller than 10 kmg. When the result of determination in Step S751 is NO, it is concluded that the engine 2 is producing a relatively large striving torque, and thus it is determined in Step S753 whether or not the selected retard level is the level III. If YES in Step S753, the retard level is switched from the level III to the level II in Step S754.

When the result of determination in Step S751 is YES or when the result of determination in Step S753 is NO, the program proceeds to Step S755, whereupon it is determined whether or not a shifting operation is being effected in the automatic transmission 6. If YES in Step S755, it is determined in Step S756 whether or not the selected retard level is the IV level. If the result of determination in Step S756 is YES, the retard level III is selected in Step S757.

When the result of determination in Step S755 or S756 is NO, Step S758 is executed, wherein the present retard level is maintained.

In the retard level select routine described above, the situation in which the retard level III is selected in Step S734 and the retard level IV is finally maintained as the result of execution of Step S758 is established on condition that the rate GS of change of the slippage s is larger than 0 g, or that the slippage s is larger than 8 km/h, the final target driving torque TO is smaller than 10 kmg, and no shifting operation is being effected in the automatic transmission 6, as noted from the determinations in Steps S753, S751, and S755. In such a situation, the degree of increase of the slippage s is extremely large even if the target driving torque TO is restricted to less than 10 kmg, and thus it is difficult to effectively suppress the slippage s of the front wheels FW by controlling the driving torque of the engine 2 merely on the basis of the target driving torque TO and the ignition timing retard amount. However, by setting the retard level to the level IV, as in this modification, the throttle valve 22 can be forcibly brought to the fully-closed position, whereby a slip of the front wheels FW can be effectively suppressed at an initial stage.

Figure 59:
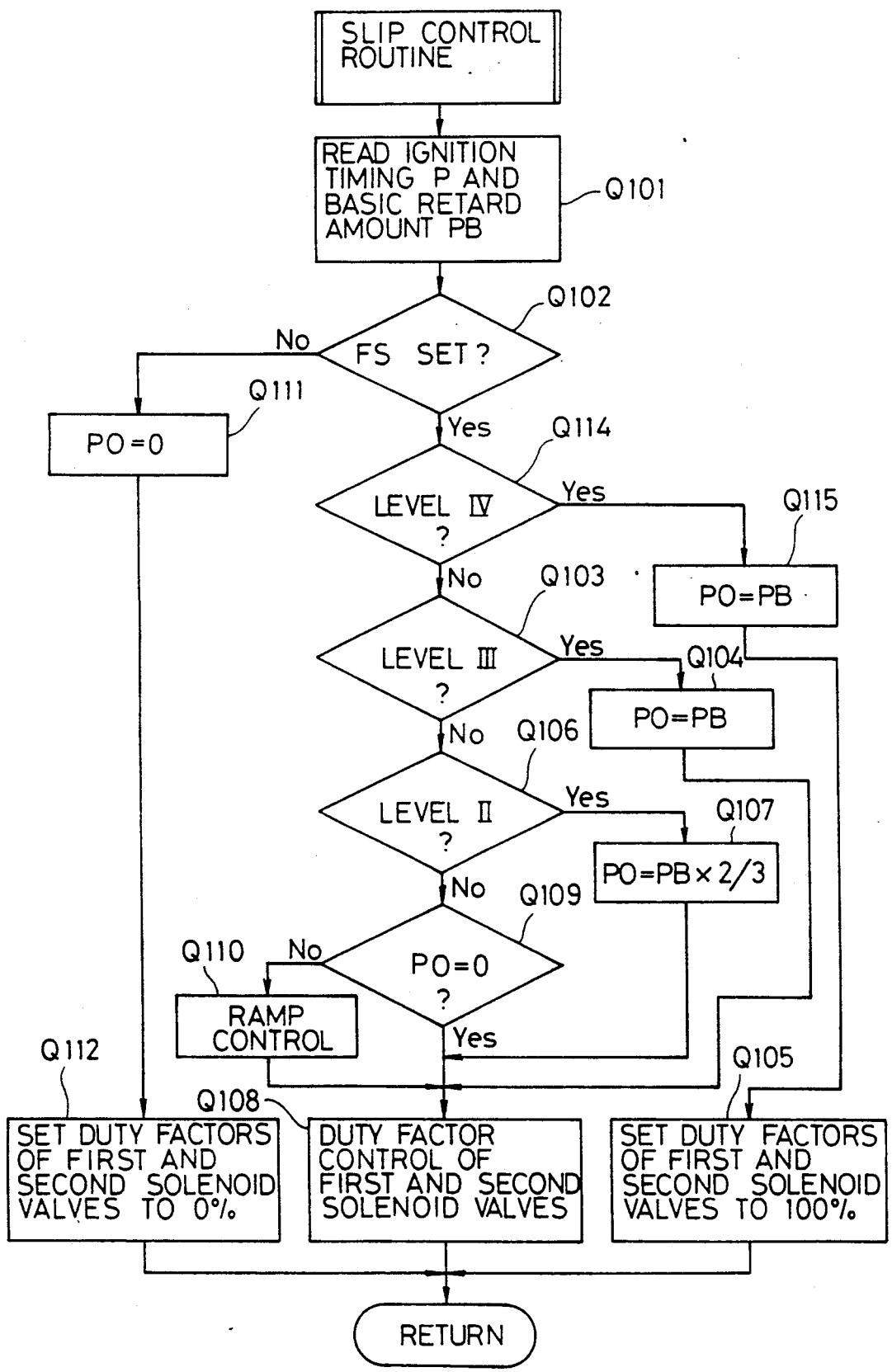
FIG. 59 is a flowchart showing a modification of the slip control routine of FIG. 31.

FIG. 59 shows a modification of the slip control routine explained with reference to FIG. 31. In this modification, the routine is executed by the ECU 12 after the ignition timing retard level is selected in the select routine of FIGS. 55 to 58, to control the open-/close action of the first and second solenoid valves 90 and 104. In the slip control routine of FIG. 59, like step numbers are used to denote like operations executed in the flowchart of FIG. 31, and description is made only for the operations unique to FIG. 59.

In this modification, if the result of determination in Step Q102 is YES, it is determined in Step Q114 whether or not the selected retard level is the level IV. If YES in Step Q114, the program proceeds to Step Q115, whereupon the basic retard amount PB is set as the target retard amount PO for the ignition timing P. The basic retard amount PB is already read from the map in Step Q101. The program the proceeds from Step Q115 to Step Q105, whereupon the respective duty factors of the first and second solenoid valves 90 and 104 are set to 100%, regardless of the value of the final target driving torque TO. Accordingly, in this case, the throttle value 22 is forcibly brought to the fully-closed position.

When the result of determination in Step Q114 is NO, Step Q103 and its subsequent steps are executed, as in the case of the routine of FIG. 31. In this modification, however, after Step Q104 is executed, Step Q108, not Step Q105 in the routine of FIG. 31, is executed.

Further, when the result of determination in Step Q102 is NO, Steps Q111 and Q112 are successively executed.

In the above-described embodiment, the throttle opening of the throttle value 22 and the ignition timing are controlled so as to bring the driving torque of the engine 2 to the target driving torque. Alternatively, the driving torque of the engine 2 may be regulated by controlling the suction air amount or the fuel supply quantity, or by controlling the compression ratio of the engine 2.

What is claimed is:

1. An apparatus for controlling an output of a vehicle equipped with an internal combustion engine, comprising:

means for calculating a reference driving torque of the engine based upon a vehicle speed;

means for detecting a slippage of driving wheels of the vehicle;

setting means for obtaining correction torques for the reference driving torque, said setting means including a first means for setting an integral correction torque as one of said correction torques based upon an integral value of said detected slippage;

limiter means for restricting said integral correction torque to a value of at least a negative lower limit when said integral correction torque has a negative value, said limiter means including means for reducing an absolute value of said negative lower limit in accordance with an increase of said vehicle speed;

determination means for determining a target driving torque of the engine, said determination means including correction means for obtaining a corrected reference driving torque by subtracting said restricted integral conrrection torque from said reference driving torque, and means for calculating said target driving torque based upon the corrected reference driving torque; and controlling means for controlling an actual driving torque of the engine based upon said target driving torque.

2. an apparatus according to claim 1, wherein said slippage calculating means includes means for calculating a target peripheral speed of the driving wheels, means for detecting an actual peripheral speed of the driving wheels, and means for calculating the slippage of the driving wheels on the basis of a deviation between the target peripheral speed and the actual peripheral speed of the driving wheels.

3. An apparatus according to claim 2, wherein said reference driving torque calculating means includes means for calculating a longitudinal acceleration of the vehicle based upon the vehicle speed, and means for calculating the reference driving torque based upon the longitudinal acceleration.

4. A apparatus according to claim 1, wherein said reference driving torque calculating means includes means for calculating a target peripheral speed of the driving wheels based upon the vehicle speed, and means for calculating the reference driving torque based upon the target peripheral speed.

5. An apparatus according to claim 1 wherein said determination means includes means for deriving a running resistance acting on the vehicle from a road surface on which the vehicle is running, and means for correcting the target driving torque in accordance with the running resistance.

6. An apparatus according to claim 5, wherein said running resistance deriving means includes a map for determining a running resistance in accordance with a gradient of the road surface and the vehicle speed.

7. An apparatus according to claim 1, wherein said first means of said setting means includes means for repeatedly adding a predetermined positive value to said integral correction torque when said slippage is detected as having a positive value, and means for repeatedly adding a predetermined negative value to said integral correction torque when said slippage is detected as having a negative value.

8. An apparatus according to claim 1, wherein said limiter means has a limit range of said integral correction torque, said limit range being defined by said lower limit and an upper limit which is greater than said lower limit and has a value indicating magnitude of torque of at most zero.

9. An apparatus according to claim 1, wherein said setting means further includes second means for setting a proportional correction torque proportional to said detected slippage as one of said correction torques, and wherein said correcting means of said determining means obtains said corrected reference driving torque by subtracting said proportional correction torque and said restricted integral correction torque from said reference driving torque.

10. An apparatus according to claim 9, wherein said limiter means further includes means for reducing said proportional correction torque in accordance with a friction coefficient of a road surface on which the vehicle is running.

11. An apparatus according to claim 9, wherein said setting means further includes a third means for setting a differential correction torque corresponding to a differential value of said detected slippage as one of correction torques, and wherein said correction means of said determining means obtains said corrected reference torque by subtracting said differential correction torque, said proportional correction torque and said restricted integral correction torque from said reference driving torque.

12. An apparatus according to claim 11, wherein said limiter means further includes means for reducing at least one of said proportional and differential correction torques in accordance with the friction coefficient of a road surface on which said vehicle is running.

* * * * *

UNITED STATES PATENT AND TRADEMARK OFFICE
CERTIFICATE OF CORRECTION

PATENT NO.  : 5,183,128
DATED       : February 2, 1993
INVENTOR(S) : Masayoshi Ito, et al It is certified that error appears in the above-indentified patent and that said Letters Patent is hereby corrected as shown below:

In the drawings, Fig. 2 , in the blocks labeled 104 and 90, please change "vale" to --valve --.

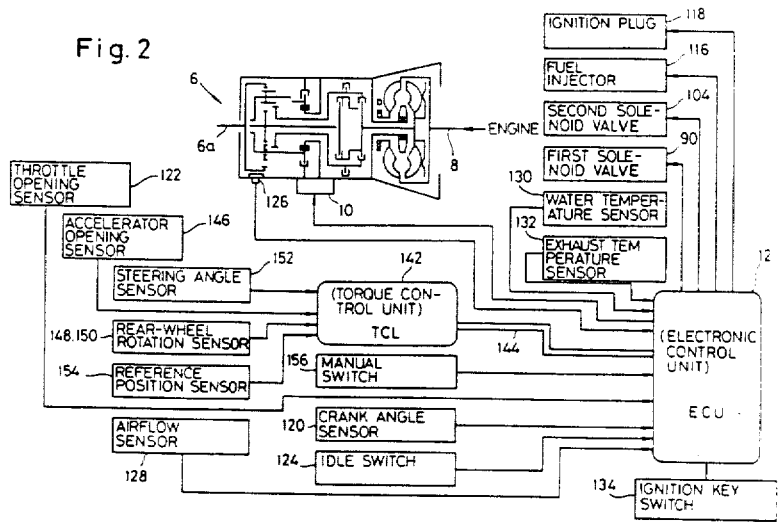

Signed and Sealed this

Twenty-second Day of March, 1994

Attest:

BRUCE LEHMAN

*Attesting Officer*   *Commissioner of Patents and Trademarks*